US009751433B2

(12) United States Patent
Juchniewicz et al.

(10) Patent No.: US 9,751,433 B2
(45) Date of Patent: Sep. 5, 2017

(54) CHILD RESTRAINT SYSTEM WITH USER INTERFACE

(71) Applicant: Thorley Industries LLC, Pittsburgh, PA (US)

(72) Inventors: Richard P. Juchniewicz, Pittsburgh, PA (US); Rochak Chadha, Pittsburgh, PA (US); Justin Cole, Pittsburgh, PA (US); Robert Daley, Pittsburgh, PA (US); Sun Jan Huang, Cincinnati, OH (US); Robert Pike, Oakdale, PA (US); Chad Staller, Verona, PA (US); David Szakelyhidi, Olympia, WA (US); Henry Thorne, West View, PA (US); Parker Trow, Pittsburgh, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 260 days.

(21) Appl. No.: 14/514,280

(22) Filed: Oct. 14, 2014

(65) Prior Publication Data

US 2015/0091348 A1 Apr. 2, 2015

Related U.S. Application Data

(63) Continuation-in-part of application No. 13/315,900, filed on Dec. 9, 2011, now Pat. No. 8,950,809.
(Continued)

(51) Int. Cl.
*B60N 2/28* (2006.01)
*B60R 22/48* (2006.01)
*G01C 9/00* (2006.01)

(52) U.S. Cl.
CPC ......... *B60N 2/2812* (2013.01); *B60N 2/2806* (2013.01); *B60N 2/2821* (2013.01); *B60N 2/2845* (2013.01); *B60N 2/2851* (2013.01); *B60N 2/2857* (2013.01); *B60N 2/2875* (2013.01); *B60N 2/2887* (2013.01);
(Continued)

(58) Field of Classification Search
USPC ................... 297/253, 256.16, 216.11, 250.1
See application file for complete search history.

(56) References Cited

U.S. PATENT DOCUMENTS 3,426,589 A 2/1969 Brendel
4,604,773 A 8/1986 Weber et al.
(Continued)

FOREIGN PATENT DOCUMENTS

KR 10-0320662 B1 3/2002
WO 2006009619 A2 1/2006

*Primary Examiner* — Timothy J Brindley
(74) *Attorney, Agent, or Firm* — The Webb Law Firm

(57) ABSTRACT

A child seat or child restraining system for securing a child to a vehicle seat, and method of installing the car seat are provided. The child seat, which is configured to be secured to a seat of a vehicle, includes: a seat base secured to the seat of the vehicle; a child receiving portion supported by the seat base; and a belt tensioning system incorporated into the seat base. The belt tensioning system is configured to receive a belt that couples the seat base to the seat of the vehicle. The child seat also includes a controller operatively connected to the belt tensioning system and configured to automatically actuate the belt tensioning system. The belt tensioning system may be configured to drive the at least one belt in a pay-in direction to apply tension to the at least one belt.

23 Claims, 46 Drawing Sheets

Related U.S. Application Data

(60) Provisional application No. 61/890,555, filed on Oct. 14, 2013, provisional application No. 61/543,938, filed on Oct. 6, 2011, provisional application No. 61/559,949, filed on Nov. 15, 2011.

(52) U.S. Cl.
CPC ...... *B60R 22/48* (2013.01); *B60N 2002/2815* (2013.01); *B60R 2022/4841* (2013.01); *B60R 2022/4866* (2013.01); *G01C 9/00* (2013.01)

(56) References Cited

U.S. PATENT DOCUMENTS

| | | | |
|---|---|---|---|
| 4,709,960 A | 12/1987 | Launes | |
| 4,807,715 A * | 2/1989 | Nagashima | B60N 2/0248 180/268 |
| 5,058,283 A | 10/1991 | Wise et al. | |
| 5,476,287 A * | 12/1995 | Lichtwardt | B60R 22/02 280/801.2 |
| 5,581,234 A | 12/1996 | Emery et al. | |
| 5,728,953 A | 3/1998 | Beus et al. | |
| 5,779,319 A * | 7/1998 | Merrick | B60R 22/357 297/250.1 |
| 5,810,436 A | 9/1998 | Surot | |
| 5,836,650 A | 11/1998 | Warner, Jr. et al. | |
| 5,839,789 A | 11/1998 | Koledin | |
| 5,890,762 A | 4/1999 | Yoshida | |
| 5,960,523 A | 10/1999 | Husby et al. | |
| 5,996,421 A | 12/1999 | Husby | |
| 6,024,408 A * | 2/2000 | Bello | B60N 2/2806 24/68 CD |
| 6,059,066 A * | 5/2000 | Lary | B60R 22/48 180/268 |
| 6,092,869 A | 7/2000 | Ziv | |
| 6,139,101 A | 10/2000 | Berringer et al. | |
| 6,318,799 B1 | 11/2001 | Greger et al. | |
| 6,322,142 B1 | 11/2001 | Yoshida et al. | |
| 6,347,832 B2 | 2/2002 | Mori | |
| 6,508,510 B2 | 1/2003 | Yamazaki | |
| 6,520,032 B2 | 2/2003 | Resh et al. | |
| 6,522,257 B1 | 2/2003 | Jakob et al. | |
| 6,539,590 B2 | 4/2003 | Ziv | |
| 6,554,318 B2 | 4/2003 | Kohut et al. | |
| 6,554,358 B2 | 4/2003 | Kain | |
| 6,623,032 B2 | 9/2003 | Curtis et al. | |
| 6,739,660 B2 | 5/2004 | Dukes | |
| 6,739,661 B1 | 5/2004 | Dukes | |
| 6,749,260 B2 | 6/2004 | Abel | |
| 6,779,842 B2 | 8/2004 | McNeff | |
| 6,889,146 B2 | 5/2005 | Sullivan et al. | |
| 6,962,394 B2 | 11/2005 | Anthony et al. | |
| 7,004,541 B2 | 2/2006 | Sedlack | |
| 7,021,709 B2 | 4/2006 | Dolan et al. | |
| 7,059,676 B2 | 6/2006 | McNeff | |
| 7,077,475 B2 * | 7/2006 | Boyle | B60N 2/2812 297/250.1 |
| 7,224,270 B2 | 5/2007 | Patterson et al. | |
| 7,272,974 B2 | 9/2007 | Goto | |
| 7,288,009 B2 | 10/2007 | Lawrence et al. | |
| 7,401,834 B2 | 7/2008 | Browne et al. | |
| 7,410,212 B2 | 8/2008 | Lawrence et al. | |
| 7,410,214 B2 | 8/2008 | Hayden et al. | |
| 7,422,283 B2 | 9/2008 | Patterson et al. | |
| 7,439,866 B2 | 10/2008 | Wallner et al. | |
| 7,463,161 B2 | 12/2008 | Griffin et al. | |
| 7,478,875 B2 | 1/2009 | Patterson et al. | |
| 7,618,093 B2 | 11/2009 | Hung-Chung | |
| 7,658,446 B2 | 2/2010 | Meeker et al. | |
| 7,722,118 B2 | 5/2010 | Bapst et al. | |
| 7,735,921 B2 | 6/2010 | Hutchinson et al. | |
| 7,748,782 B2 | 7/2010 | Chen et al. | |
| 7,810,220 B2 | 10/2010 | Anthony et al. | |
| 7,819,472 B2 | 10/2010 | Hutchinson et al. | |
| 7,837,275 B2 | 11/2010 | Woellert et al. | |
| 7,887,129 B2 | 2/2011 | Hei et al. | |
| 8,434,821 B2 * | 5/2013 | Gibree | B60N 2/2806 297/250.1 |
| 8,840,184 B2 * | 9/2014 | Szakelyhidi | B60N 2/2806 297/217.3 |
| 2002/0024205 A1 | 2/2002 | Curtis et al. | |
| 2003/0025369 A1 | 2/2003 | Maciejczyk | |
| 2003/0151281 A1 | 8/2003 | Williams | |
| 2004/0174055 A1 | 9/2004 | Abel | |
| 2005/0006934 A1 | 1/2005 | Rabeony et al. | |
| 2005/0121956 A1 | 6/2005 | Dolan et al. | |
| 2005/0156452 A1 | 7/2005 | Biaud | |
| 2005/0189805 A1 | 9/2005 | Burley et al. | |
| 2005/0275260 A1 | 12/2005 | Patterson et al. | |
| 2006/0181124 A1 | 8/2006 | Kish | |
| 2007/0228787 A1 | 10/2007 | Nakhla | |
| 2007/0296254 A1 | 12/2007 | Kahn | |
| 2008/0061612 A1 | 3/2008 | Crampton | |
| 2008/0246316 A1 | 10/2008 | Carine et al. | |
| 2008/0303325 A1 | 12/2008 | Scholz | |
| 2008/0309493 A1 | 12/2008 | Lee et al. | |
| 2009/0160232 A1 | 6/2009 | Hinze et al. | |
| 2010/0007186 A1 | 1/2010 | Strong et al. | |
| 2010/0013282 A1 | 1/2010 | Balensiefer | |
| 2010/0078978 A1 | 4/2010 | Owens | |
| 2010/0117417 A1 | 5/2010 | Foussianes et al. | |
| 2010/0253498 A1 | 10/2010 | Rork et al. | |
| 2010/0264706 A1 | 10/2010 | Vogt et al. | |
| 2011/0057489 A1 | 3/2011 | Greene | |
| 2011/0074194 A1 | 3/2011 | Weber et al. | |
| 2011/0074195 A1 | 3/2011 | Hei et al. | |
| 2011/0089726 A1 | 4/2011 | Gibree | |
| 2011/0089729 A1 | 4/2011 | Gibree | |
| 2011/0089731 A1 | 4/2011 | Gibree | |
| 2012/0007398 A1 | 1/2012 | Fritz et al. | |
| 2013/0015690 A1 | 1/2013 | Mendis et al. | |
| 2013/0088057 A1 | 4/2013 | Szakelyhidi et al. | |
| 2013/0161110 A1 | 6/2013 | Furst | |

\* cited by examiner

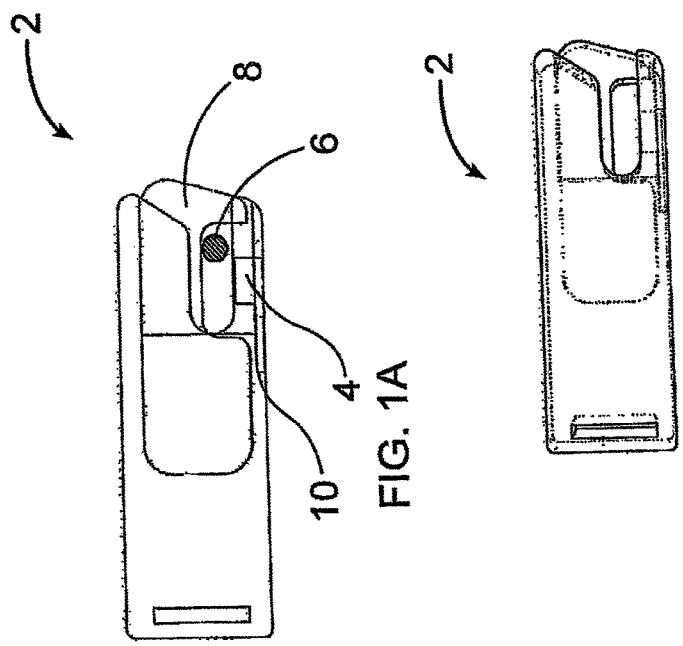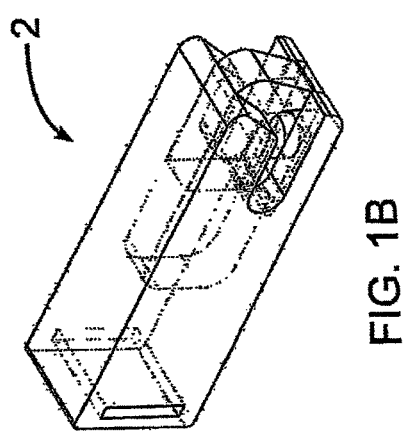

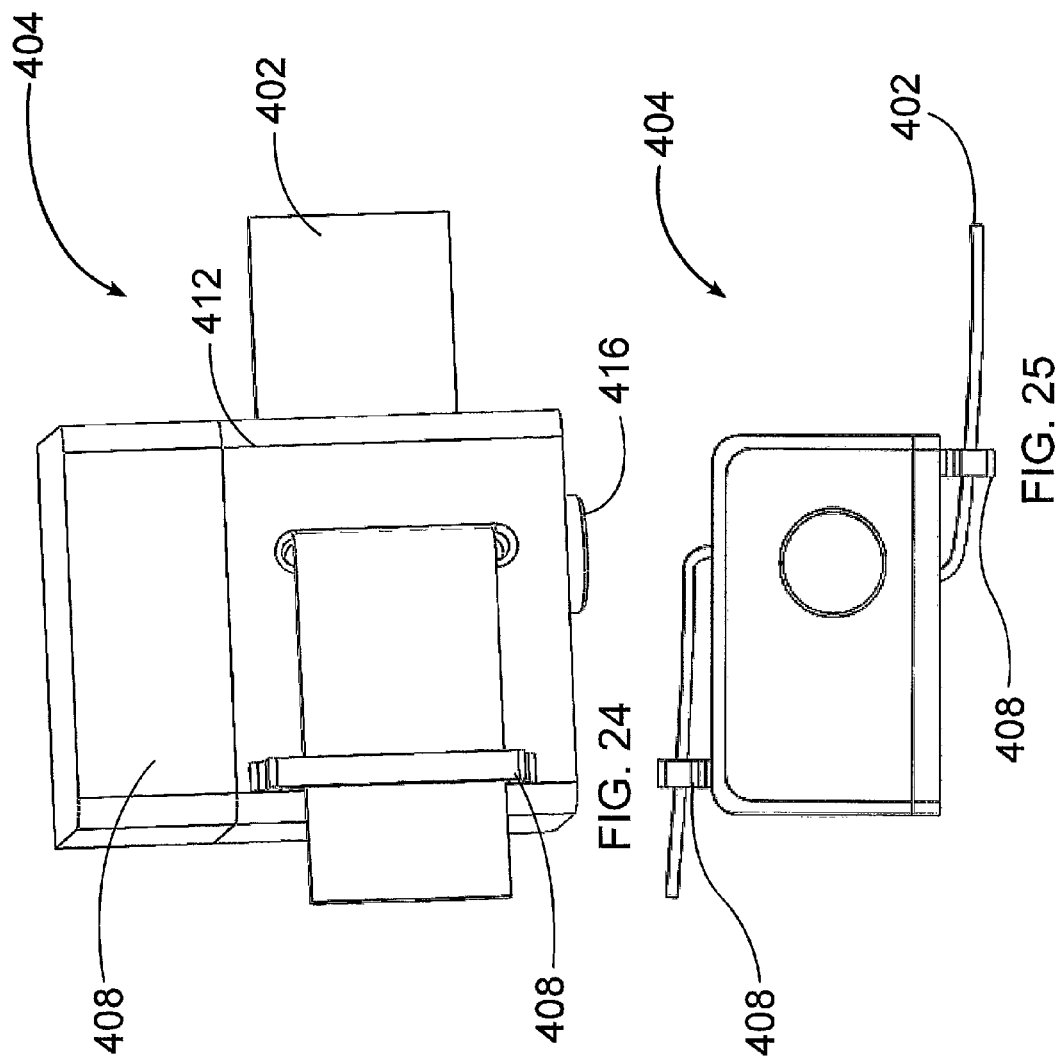

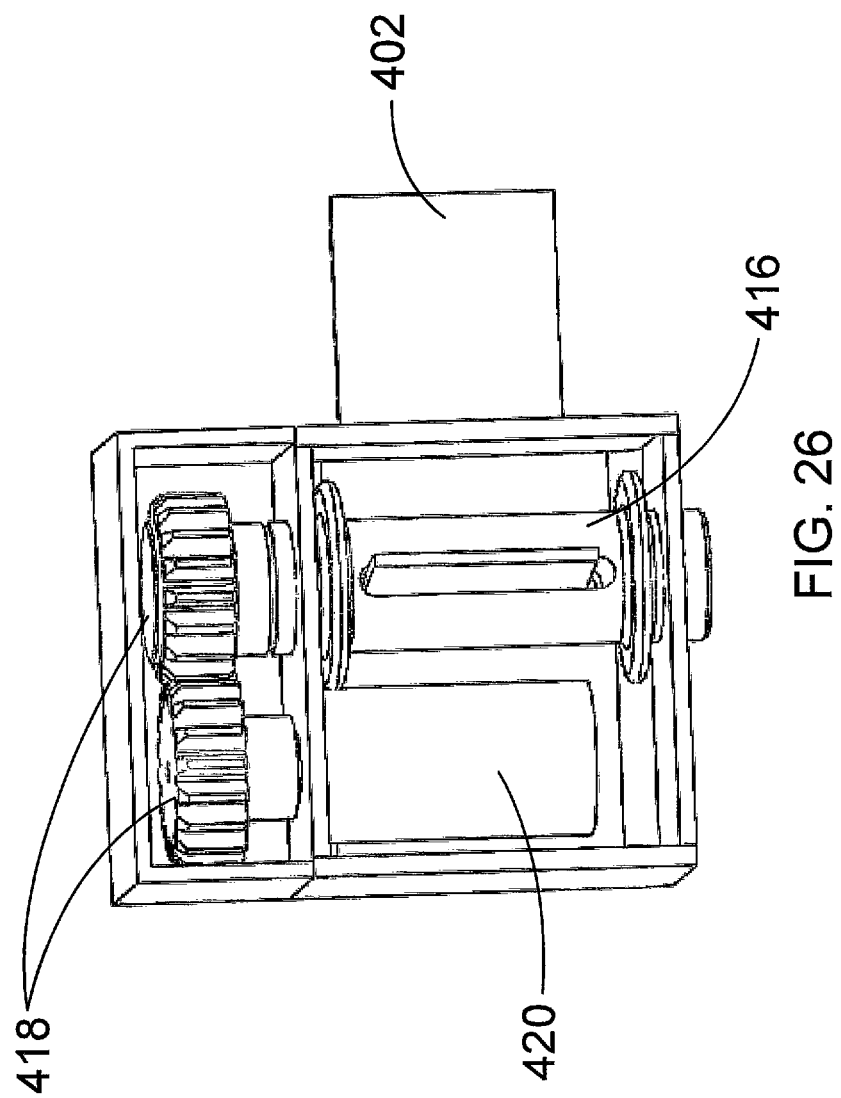

CHILD RESTRAINT SYSTEM WITH USER INTERFACE

CROSS REFERENCE TO RELATED APPLICATIONS

This application claims priority to U.S. Provisional Application No. 61/890,555 filed on Oct. 14, 2013, and is a continuation-in-part of U.S. patent application Ser. No. 13/315,900 filed on Dec. 9, 2011, which claims priority to U.S. Provisional Application Nos. 61/543,938, filed Oct. 6, 2011, and 61/559,949, filed Nov. 15, 2011, each of which are incorporated herein by reference in its entirety.

BACKGROUND OF THE INVENTION

Field of the Invention

The present invention is generally directed to a child car seat or child restraint system (CRS) for use in an automobile and, more particularly, to self-adjusting and automatically installing a CRS.

Description of Related Art

Numerous industry and government guidance documents and standards recommend proper constraints for CRS installation. Aside from CRS manufacturer datasheets, pertinent information regarding standards and guidance can be found in three National Highway Traffic Safety Administration (NHTSA) reports, entitled, "Driver mistakes when installing child seats", "Misuse of Child Restraints", and "Child Restraint Use Survey: LATCH Use and Misuse". Also, Federal Motor Vehicle Safety Standard 225 (FMVSS 225) standards include testing and crashworthiness requirements for a CRS.

In addition, Federal Motor Vehicle Safety Standards state that after the CRS undergoes crash impact testing, the angle between the CRS's back support surface for the child and the vertical should not exceed 70 degrees. To minimize this angle of travel after crash impact and to prevent separation of the child from the CRS, manufacturers state that when installing a CRS in the rear-facing position, the child seat should be reclined at least 30 degrees from vertical and up to 45 degrees from vertical when the car is parked on a level surface. Because vehicle seats are at varying angles, it has become standard for most child restraint manufacturers to provide a means to level the child restraint seat in relation to the vehicle seat angle, in order to achieve this optimal CRS seat back angle range. Existing devices for leveling include mechanical legs, screw mechanisms, levers, spacers, platforms, and other non-automated means. All of these devices are hand actuated. There have also been a few limited attempts at a motorized CRS recliner. In relaying the angle of the seat to the user, there are numerous mechanical devices currently in use, including bubble floats, rolling balls, and other sight windows or pendulum indicators. Some electro-mechanical based angle feedback indicators are also currently in existence.

Modern child restraint systems can be connected to the vehicle by the vehicle seat belt or by the Lower Anchors and Tethers for CHildren (LATCH) system, which is integrated with the CRS, having specialized connectors and belts. It is required that either the LATCH system belt or the vehicle seat belt connect the CRS tight enough that it cannot move more than one inch (25 mm) side to side and front to back in relation to the vehicle seat to which it is attached. Many manufacturers use a simple belt cinch, while others rely on cranks and lever arms, or other mechanical means to assist a user in tightening. There are even a few devices that use motor actuated mechanisms to tighten the belt. As for determination of torque, there have been mechanical devices described, but only a few electro-mechanical means of feedback.

Feedback regarding the connection between the CRS infant carrier seat and its base and then to the vehicle have also been disclosed, however, this connection has been determined within the CRS latches themselves, but in the vehicle or infant carrier seat housing or in the vehicle seat belt or latch anchor points.

A 2009 NHTSA study entitled Drivers' Mistakes When Installing Child Seats (DOT HS 811 234) mentioned that approximately 73% of child restraints were installed incorrectly. It also states that in 72% of these installs, the user assumed that they had correctly installed the CRS, yet it was wrong.

Accordingly, a need exists for a CRS installation system that can be more effectively achieved by automation, with less user error or inconvenience and greater safety.

SUMMARY OF THE INVENTION

A child seat or child restraining system (CRS) for securing a child to a seat of a vehicle and a method of securing a child to a seat of a vehicle are provided. The disclosed child seat and methods are intended to address various shortcomings and problems of known child seats or child restraint systems. Particularly, the disclosed child seat is intended to provide a safe and secure seating arrangement for the child that can be easily installed by a user.

In one embodiment, a child seat configured to be secured to a seat of a vehicle is provided. The child seat includes: a seat base secured to the seat of the vehicle; a child receiving portion supported by the seat base; and a belt tensioning system incorporated into the seat base for receiving at least one belt that couples the seat base to the seat of the vehicle. The child seat also includes a controller operatively connected to the belt tensioning system and configured to automatically actuate the belt tensioning system.

In a further embodiment, the child seat includes at least one sensor connected to or associated with the child seat and operatively connected to the controller. The controller is configured to actuate the belt tensioning system to increase tension of the at least one belt if the tension of the at least one belt is determined to be below a threshold value. Similarly, the controller may be configured to stop the belt tensioning system if the tension of the at least one belt exceeds a threshold value.

In embodiments, the belt tensioning system is operable in a non-backdriveable state in which belt payout is prevented and in a backdriveable state in which belt payout is permitted. Further, the belt tensioning system may be selectively operable in a non-backdriveable state. The belt tensioning system may include one or more of the following structural elements: at least one drive system; a spindle connected to the at least one belt and rotatable in the pay-in direction or in a payout direction; and a clutch configured to transfer torque generated by the drive system to the spindle to drive the spindle in the pay-in direction. The at least one drive system may be one or more electric motors, one or more hydraulic motors, or combinations thereof.

In further embodiments, the clutch may be configured to transition between an engaged position, in which the clutch is engaged to the spindle allowing the drive system to drive the spindle in the pay-in direction, and a disengaged position, in which the clutch disengages from the spindle, thereby allowing the spindle to rotate free from the drive system in either the pay-in direction or the payout direction. The belt tensioning system may also include a clutch motor. The clutch motor is configured to transition the clutch between the engaged position and the disengaged position. The belt tensioning system may also include a ratchet and pawl mechanism with a pawl configured to selectively engage the spindle to prevent rotation of the spindle in the payout direction.

In another embodiment, the belt tensioning system comprises a first drive system coupled to a first belt extending from one side of the seat base and a second drive system coupled to a second belt extending from a second side of the seat base. Alternatively, the belt tensioning system may include a single drive system selectively coupled to a first belt extending from one side of the seat base and a second belt extending from the other side of the seat base. The single drive system may be transitionable from a first position in which the single drive system is configured to drive the first belt and a second position in which the single drive system is configured to drive the second belt.

In embodiments, the belt tensioning system may include a belt retractor configured to apply a preload to the at least one belt prior to application of a full torque of the belt tensioning system. In addition, the at least one belt includes at least one connector configured to releasably connect to a corresponding anchor system on the seat of the vehicle. The child receiving portion of the child seat may be a rear-facing infant carrier, a forward facing infant carrier, a forward facing convertible child seat, a rear facing convertible child seat, a combination seat, or a booster seat.

The child seat may also include a battery for supplying power to the belt tensioning system and controller and a battery monitor for determining a power level of the battery. Optionally, the battery monitor is configured to prevent the controller from installing the seat base to the seat of the vehicle when the power level is below a predetermined level.

In another embodiment the child seat may also include at least one user interface device. Further, the controller may be configured to provide installation instructions via the user interface device and may select a specific installation instruction based on feedback from the at least one sensor or a user. The user interface device may be integrally connected to the child seat. Alternatively, the user interface device may be remote from the child seat and configured to wirelessly receive data from the seat. For example, the user interface device may be a dedicated mobile electronic device, a multi-purpose electronic device, a smartphone, a computer, a laptop computer, or a tablet computer.

In embodiments, a leveling system may be incorporated into the child seat for leveling the child receiving portion relative to the seat of the vehicle. Optionally, the leveling system may include a telescoping foot and an automated drive system coupled to the telescoping foot. The drive system may be configured to retract or extend the telescoping foot to adjust the level. The leveling system may also have a manual adjustment mechanism.

In another embodiment, a method for securing a child to a vehicle seat is provided. The method includes: providing a child seat comprising a seat base, a child receiving portion supported by the seat base, at least one sensor, and a controller; and actuating at least one of a leveling system and a belt tensioning system operatively connected to the controller. The method may also include providing at least one of installation instructions and installation status via at least one user interface device connected to the child seat.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

FIGS. 1A-1C provide several views of a LATCH device that incorporates a system for the confirmation of belt latching in accordance with the present invention;

FIG. 24 is a perspective view of the latch and tensioner mechanism of FIG. 23;

FIG. 25 is a bottom view of the latch and tensioner mechanism of FIG. 23;

FIG. 26 is a cross sectional view of the latch and tensioner mechanism of FIG. 23 in which a motor, gear train, and spindle are visible;

DETAILED DESCRIPTION

Figure 2A:
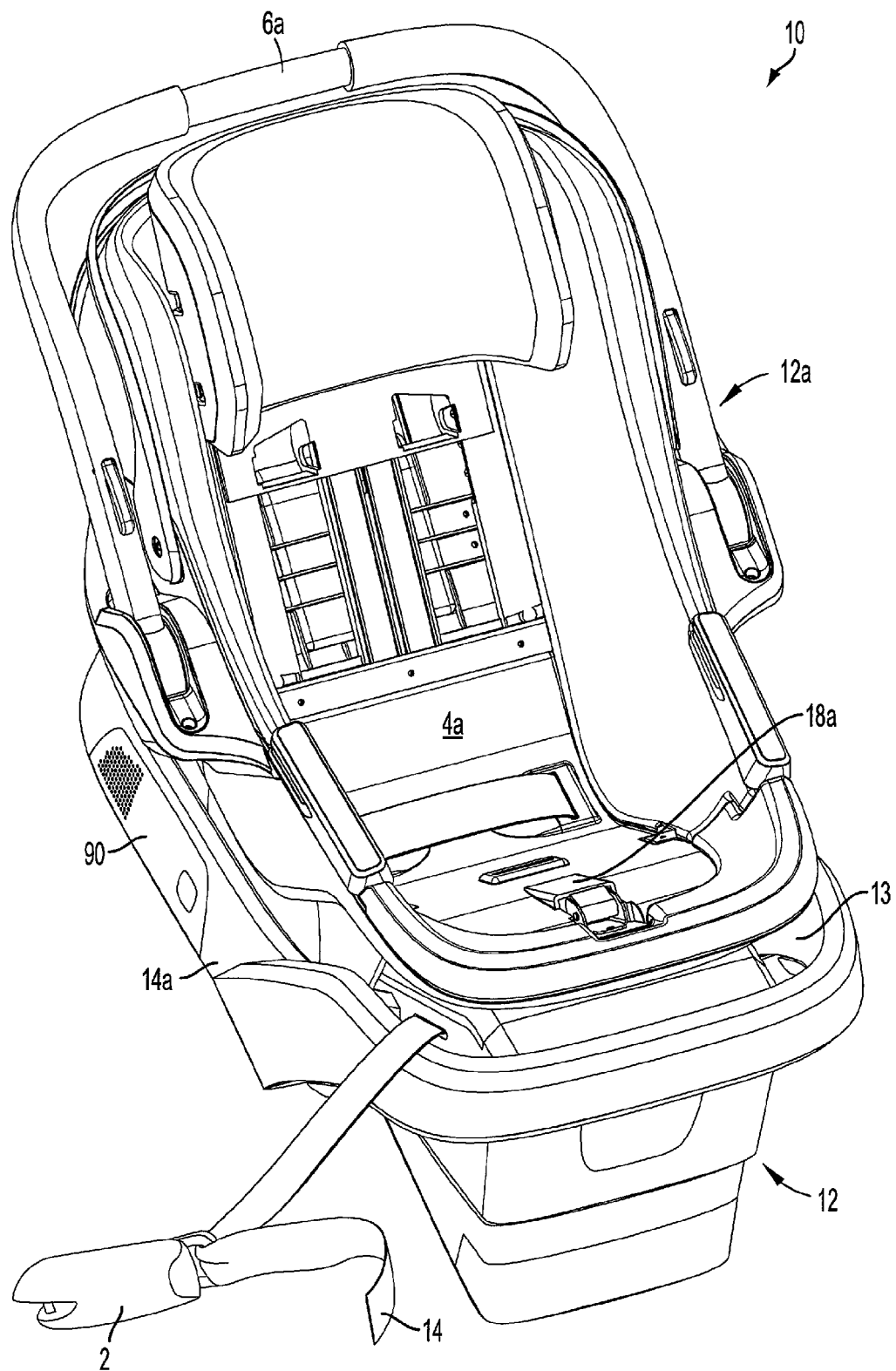
FIG. 2A is a perspective view of another embodiment of a child car seat, according to the principles of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to the Figures, a CRS with automated installation embodying various aspects of the present invention is illustrated. It will be readily apparent to those skilled in the art, however, that the CRS illustrated in the Figures represents but one of a wide variety of structures, configurations and modes of operation of child restraints that fall within the scope of the present invention. For instance, the aspects of the present invention discussed herein may be incorporated into rear-facing infant carriers, forward-facing and rear-facing convertible child seats, combination seats, and booster seats and for use with lap/shoulder belts and the LATCH system described below.

The CRS, according to the present invention, is firmly attached to a vehicle seat by at least one belt. In one embodiment, the CRS is configured for use with the LATCH system, which has a European equivalent in the ISOFIX system. ISOFIX is International Organisation for Standardisation standard ISO 13216, which specifies the anchoring system for Group 1 child safety seats. With reference to FIGS. 1A-1C, connectors 2 adapted for use with a LATCH system are illustrated. The connectors 2 incorporate a sensor 4 to detect the presence of the connection point, always a metal bar 6, within the engagement "jaws" 8 of the connectors 2. The connectors 2 may include a fastening loop (not shown) for connecting the connector 2 with a belt 14 of the CRS. The sensor 4 may be an optical interrupt switch, contact switch, miniaturized metal detecting circuit, or other similar device. A wire lead 10 transmits a signal from the sensors 4 to a controller (not shown) provided on the CRS indicating that the connector 2 is attached to the bar 6 of the LATCH system. Alternatively, the CRS could be attached to the vehicle seat through other standardized CRS vehicle connection points such as a seat belt.

Figure 2B:
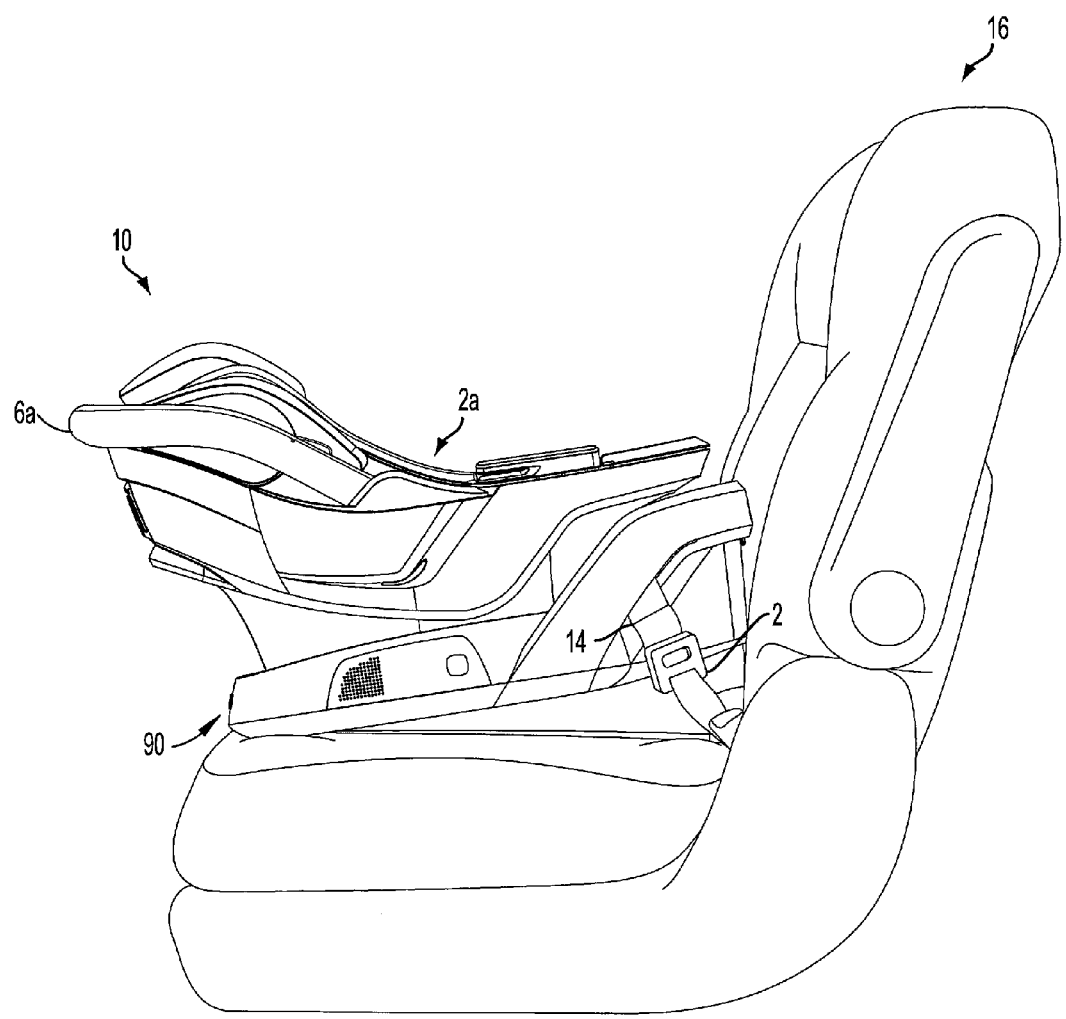
FIG. 2B is a perspective view of the child car seat of FIG. 2A attached to a seat of a vehicle.

With reference to FIGS. 2A and 2B, an embodiment of a CRS 10 designed to provide a safe and secure seating location for an infant or small child is illustrated. The CRS 10 includes a child receiving portion 12a and a seat base 12. The child receiving portion 12a includes a padded interior region 4a and a strap or harness for securing the infant or child thereto. The child receiving portion 12a may also include a handle 6a or similar structure for carrying the child receiving portion 2a if it is not attached to the seat base 12. The exterior of the child receiving portion 2a may include a hard rigid housing. The child receiving portion 2a is configured to engage the seat base 12 to create a secure, yet releasable connection therewith. In an alternate embodiment, the child receiving portion 2a is fixed to the seat base 12. The seat base 12 includes a rigid housing 14a formed from plastic or similar high strength material. The seat base 12 includes an upper portion 13, which corresponds in shape to the child receiving portion 12a and is configured to securely and fixedly receive the child receiving portion 12a therein. The seat base 12 may also include various mechanical lock mechanisms 18a and electrical sensors for ensuring that the child receiving portion 12a is securely engaged with the seat base 12. The seat base 12 may further include at least one control center or user interface 90, such as a computer or other multimedia interface for providing functionality for controlling installation and release of the seat base 12 from the vehicle seat 16. For example, as will be described in greater detail below, the interface 90 could be used to provide instructions or status updates concerning the CRS 10 system to the user and may be interactive. The interface 90 may be any sort of visual display, including, an LED screen, LCD screen, or touch screen, as well as other tactile or audio interfaces.

With reference to FIGS. 3A through 17, another embodiment of a seat base, referred to hereinafter as an infant carrier base 12, is illustrated. The base 12 is a cradle shaped structure adapted to receive and hold the child receiving portion or infant carrier, a belt 14 for anchoring the base 12 to the vehicle seat 16, and a leveling mechanism 20 that levels the base 12 relative to the vehicle seat 16 thereby ensuring that the infant carrier is held at a level orientation.

Figure 3A:
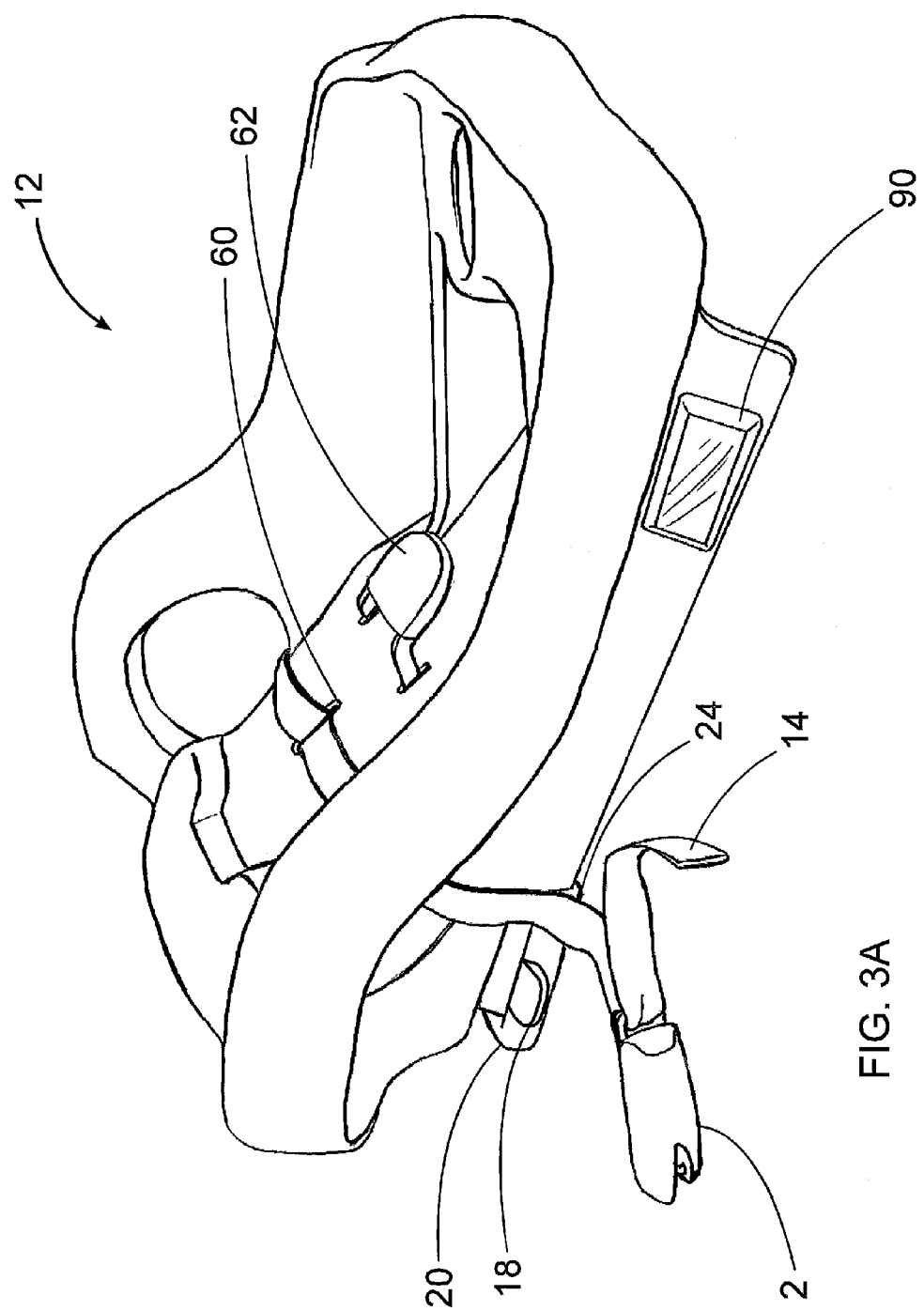
FIG. 3A is a perspective view of a carrier base and LATCH device embodying various features of a CRS according to the present invention.

As shown in FIG. 3A, the belt 14 extends from the connectors 2 located on either side of the CRS through holes located on the side of the base structure, and to a tensioning mechanism 60. The leveling mechanism 20 extends from the lower portion of the base 12 to counteract the slope (theta) of a vehicle seat. A foot 24 is located at the base of the leveling mechanism 20. A height adjust manual release 18 extends from the base of the foot allowing a user to adjust the height manually. Optionally, the tensioning mechanism 60 is a motorized tensioning device for automatically adjusting the tension of the belt 14. In the case of an automated tensioning mechanism, the base 12 may further comprise a manual release 62 extending from the base 12 allowing a user to release the belt 14 from the automated mechanism and to adjust tension manually using an overdrive crank 78 (shown in FIG. 11). The base 12 further comprises a user interface having a control center 90 such as a visual display for displaying visual data for a user. Relevant data includes, for example, an indicator light informing the user of whether the seat is level, whether the base is securely anchored to the vehicle seat by the connectors, and whether a harness securing the child to the infant carrier is securely in place. The control center may also include input devices allowing a user to input data regarding the child to be secured to the CRS.

Automatic Leveling System

With reference to FIGS. 3 through 8, as described above, a CRS of the present invention includes a system for automatically leveling the CRS, such as either the seat base or the child receiving portion, and providing angle feedback to a user. According to one embodiment of the automated leveling system, shown in FIGS. 3 through 5, the leveling mechanism 20 comprises a foot 24 extending from the carrier base 12. The foot 24 extends in a downward direction rotating around a rotational joint 22. The advantage of the rotational joint 22 is that there is the ability to achieve a greater amount of motion of the foot 24 with a smaller amount of motion of a drive mechanism. In this way, the challenge of extending the foot beyond the height of the seat base is effectively mitigated.

Figure 3B:
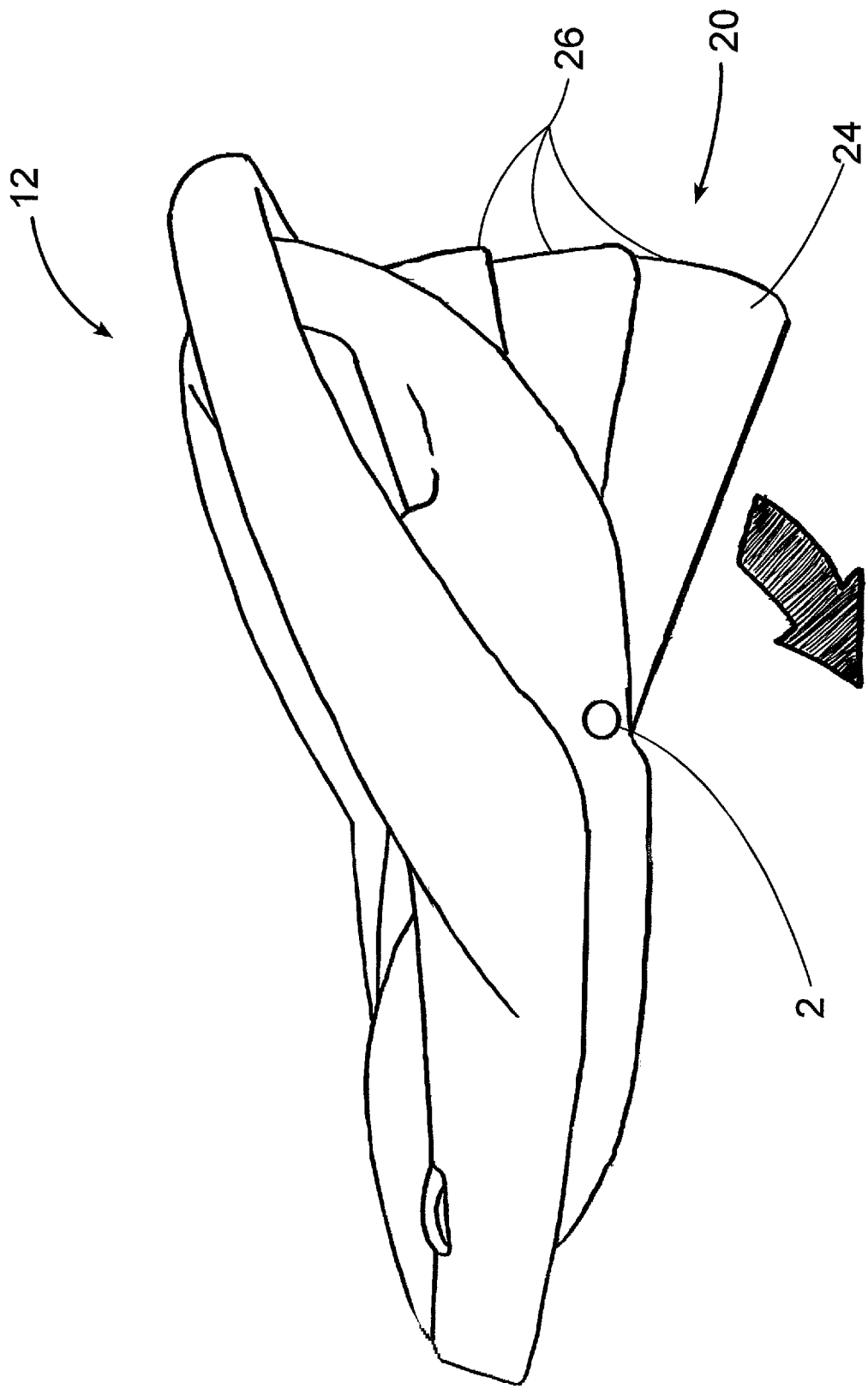
FIG. 3B is a side view of the carrier base of FIG. 3A with an elevating foot which rotates around a central pivot point in the extended position.
Figure 4:
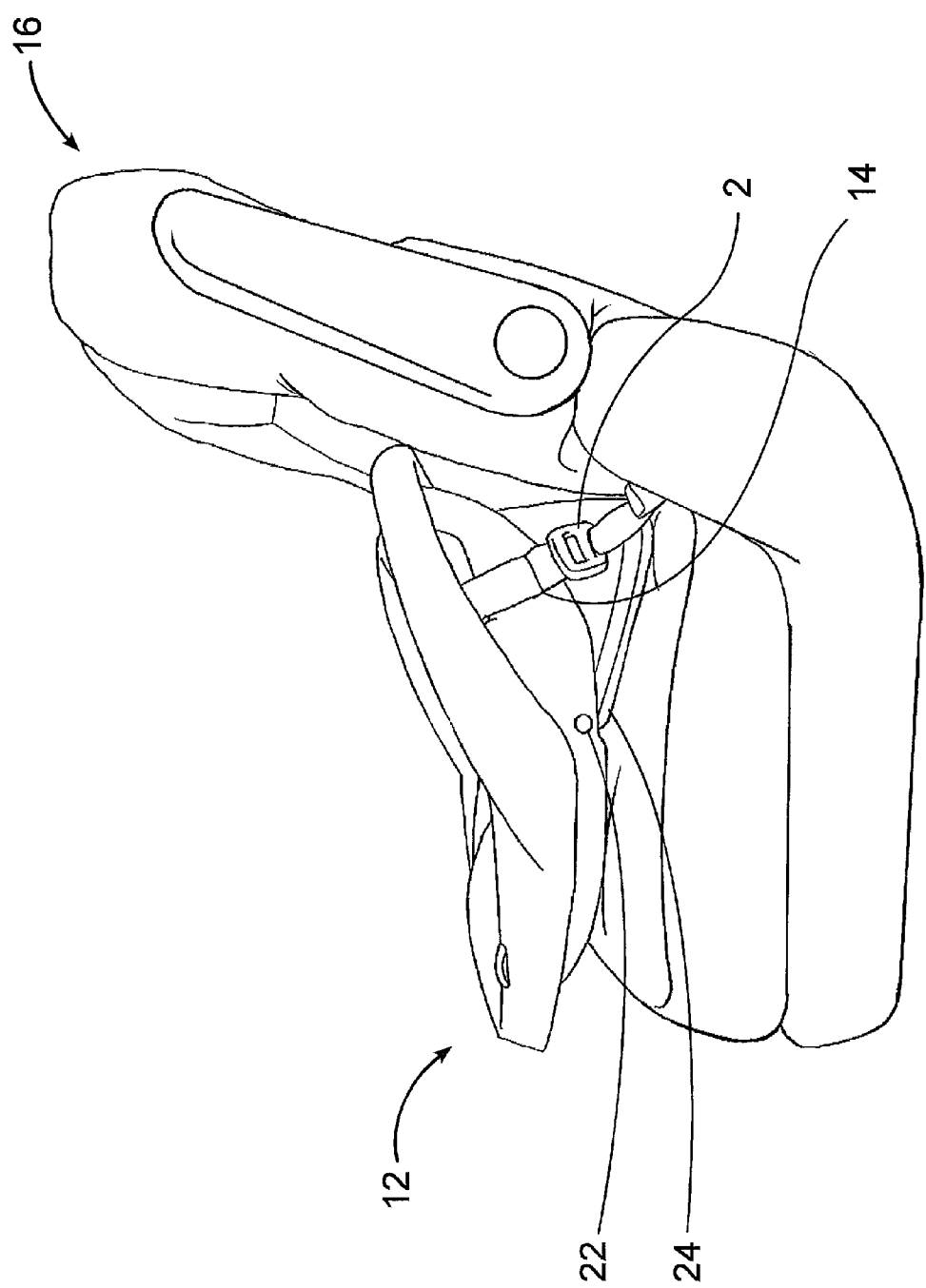
FIG. 4 is a side view of the carrier base with the elevating foot in the extended position of FIG. 3 installed in a vehicle seat.
Figure 5:
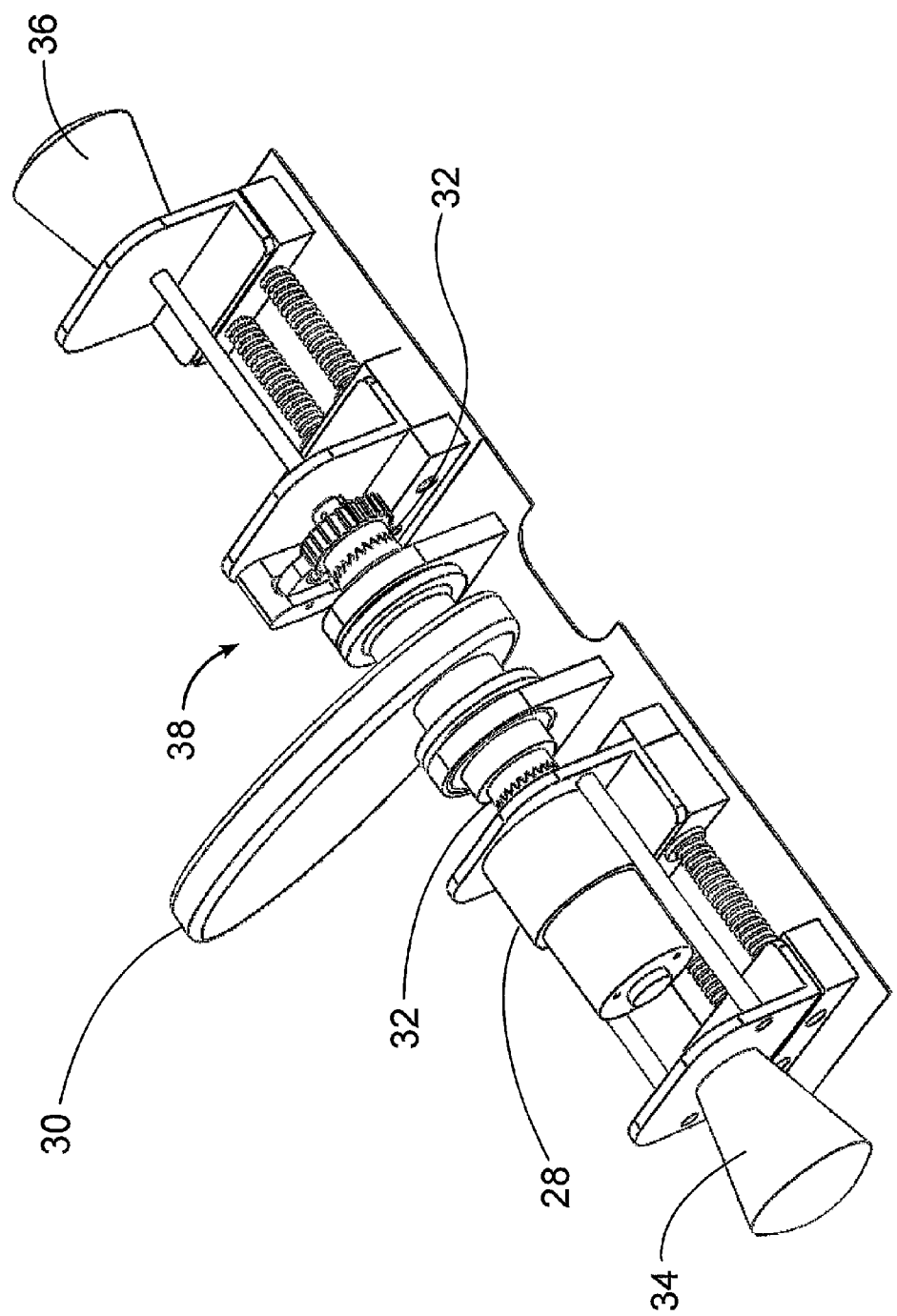
FIG. 5 is a bottom-side perspective view of a leveling mechanism for use with the CRS in accordance with the present invention with a motor and cam assembly for driving the elevating foot to an extended position.

As depicted in FIG. 3, the foot 24 extends from the lower portion of the infant carrier base 12 in a telescoping arrangement in which a plurality of elevating sections 26 are nested within one another when the foot 24 is in a closed position. As the foot extends downward, rotating around the rotation joint 22, the nested sections 26 disengage from one another. FIG. 4 depicts the base 12 with the foot 24 in the extended position installed in a vehicle seat 16. Optionally, as shown in FIG. 5, the leveling mechanism 20 includes a motor 28 for driving the expansion of the telescoping foot 24. The leveling mechanism including the motor is housed in the interior of the seat base 12.

In examples, with specific reference to FIGS. 40-43, the telescoping foot 24 includes a plurality of nested segments, such as an inner segment 26a, a middle segment 26ba, and an outer segment 26c. The telescoping foot 24 is configured with an expansion mechanism to ensure that the segments 26a, 26b, and 26c expand in a constant, fluid manner, rather than in a disjointed fashion.

Each foot segment 26a, 26b, and 26c includes a slot 186a. The slots 186a are configured to receive a drive pin 188a which aligns and maintains the segments 26a, 26b, and 26c in a fixed angle array. As the inner foot 26a is extended either by manual means or by an automated drive system, the drive pin 188a is driven from one end of the slots 186a toward the end of the slot 186a nearest the rotational joint 22 of the telescoping foot 24. More specifically, the drive pin 188a is directed toward the rotational joint 22 because the opening on the left side of the foot segments 26a, 26b, and 26c gets progressively smaller as the telescoping foot 24 transitions to the expanded position, while the opening to the right side of the foot 24 (nearer the rotational joint 22) become larger to accept the moving drive pin 188a. Since the slots 186a are arranged in a fixed array, the movement of the drive pin 186a keeps the slots 188a aligned resulting in proportional, fluid, and continual extension of the foot segments 26a, 26b, and 26c With reference to FIGS. 42 and 43, each foot segment 26a, 26b, and 26c is provided with a j-shaped flange 190a extending outward from an edge of the foot segments 26a, 26b, and 26c. When the foot segment 26a, 26b, and 26c is in its fully extended position, the j-shaped flange 190a of adjacent foot segments overlap. The overlap limits forward extension of the segments 26a, 26b, and 26c, thereby preventing the segments 26a, 26b, and 26c from over-extending and creating gaps between respective segments. Thus, the j-shaped flanges 190a interlock to indicate that the telescoping foot 24 is fully extended and that no further forward motion is possible.

FIG. 5 depicts one embodiment of the leveling mechanism having a motor for automated leveling. The mechanism comprises the motor 28 engaged with a cam 30 by a Hirth coupling 32. The motor 28 used to power the cam 30 may be electrical or any other type, such as hydraulic. A Hirth coupling is a mechanical connection used to connect two pieces of a shaft together and characterized by teeth that mesh together on the end faces of each half of the shaft. As the motor 28 drives the cam 30, the cam 30 rotates thereby exerting force on the telescoping foot 24 causing the foot 24 to extend and the nested sections 26 of the foot to disengage. In addition to the cam mechanism, a screw jack mechanism, rack and pinion mechanism, scissor lift mechanism, or other type of linear motion mechanism may also be used to provide means of leveling the height via a rotational joint with a motor. In addition, rotary motion mechanisms to adjust height could also be used. Rotary motion mechanisms include a gearing mechanism, sprocket and chain mechanism, pulley and belt mechanism, or direct drive with a rotary motor.

It is desirable that the height of the infant carrier base be adjustable without a motor as well, in case the user is unable or unwilling to use the automated system. Manual release may be accomplished by a release knob which disengages the cam from the motor. As shown in FIG. 5, the leveling mechanism 20 further comprises a manual release knob 34 and manual overdrive knob 36. The manual release knob 34 allows a user to disengage the motor 28 from the cam 30, thereby preventing the motor from supporting the cam 30, causing the foot 24 to return to the retracted position. Once the motor 28 is disengaged, a user can rotate the manual overdrive knob 36 to manually manipulate the height of the foot 24. Height may also be adjusted through other mechanical mechanisms such as, for example, a turn crank that actuates a spindle comprising part of a drive train or with a slip clutch mechanism.

Figure 37:
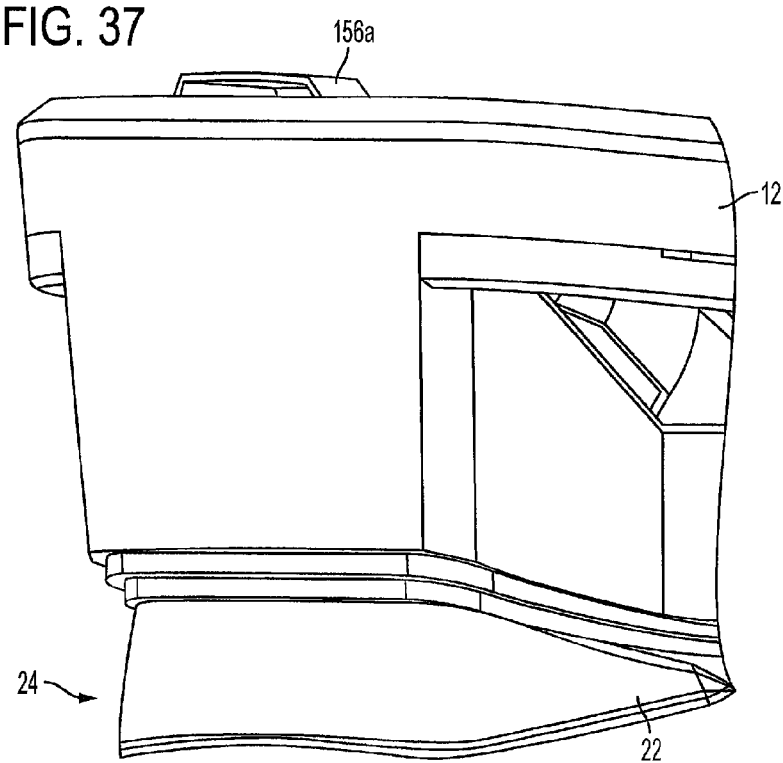
FIG. 37 is perspective view of a telescoping foot portion of an embodiment of a child car seat.
Figure 38:
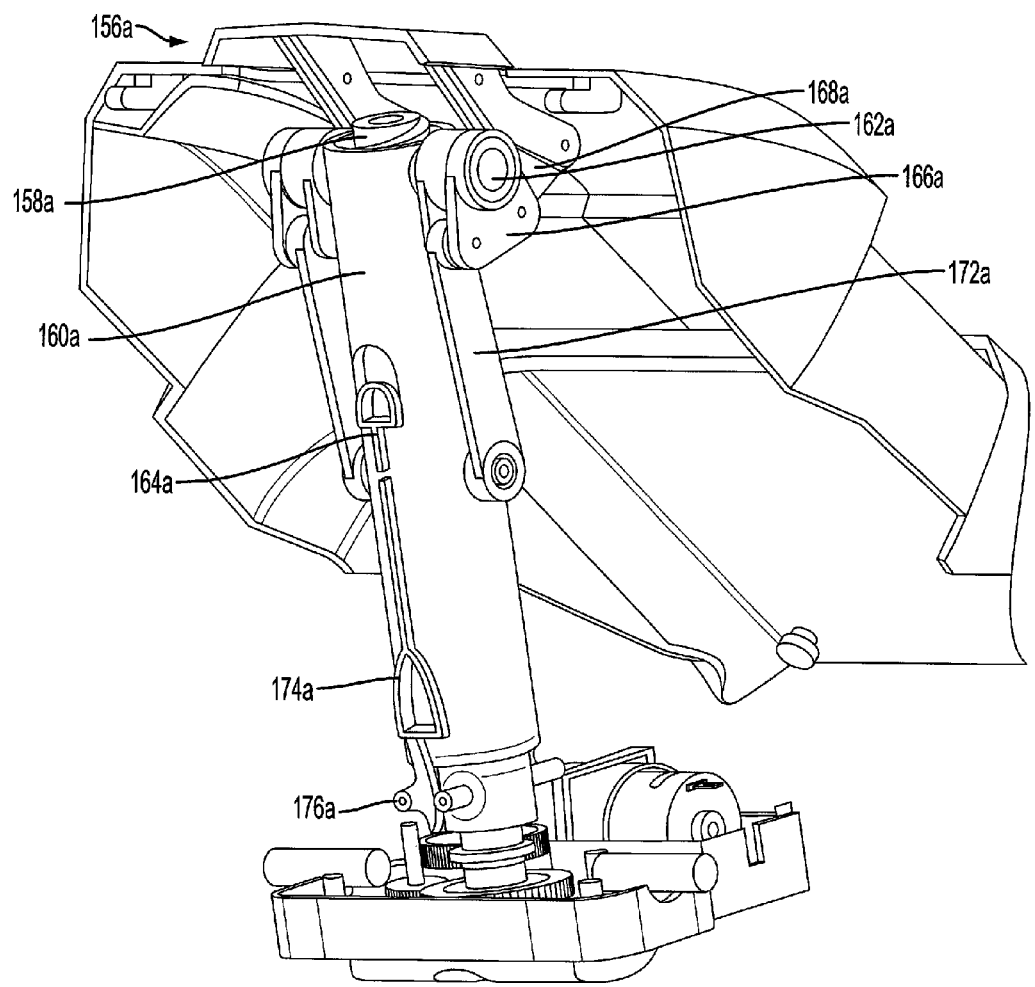
FIG. 38 is a perspective view of the telescoping foot portion of FIG. 37 with the external housing removed therefrom.
Figure 39:
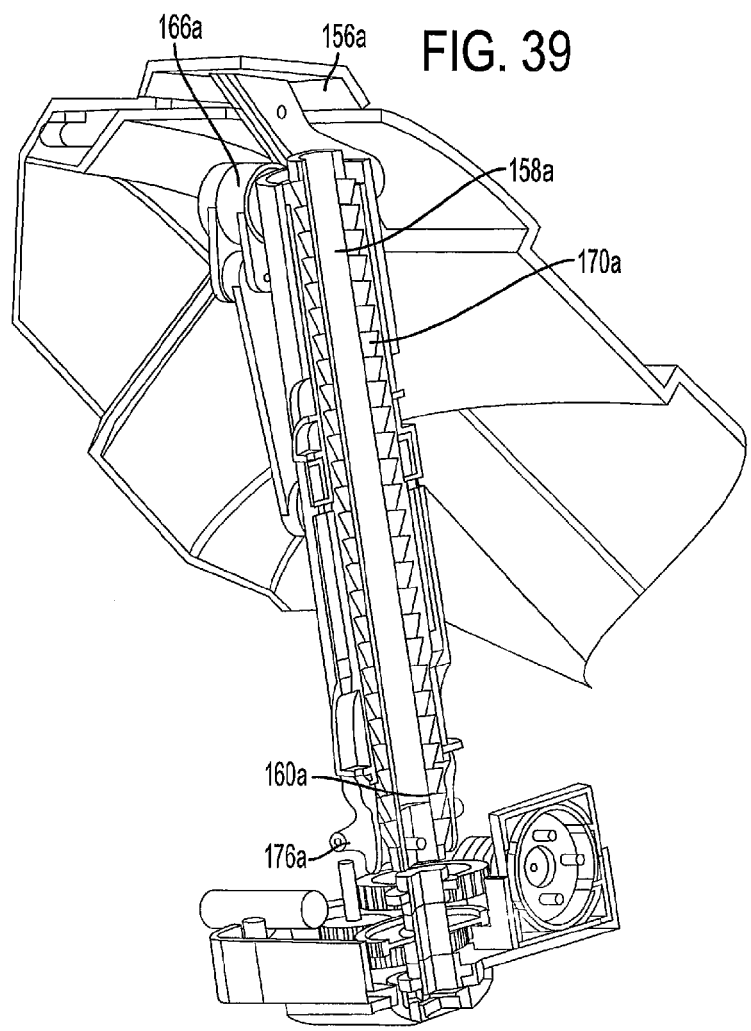
FIG. 39 is a perspective cut away view of the leveler assembly of the telescoping foot portion of FIG. 37.
Figure 40:
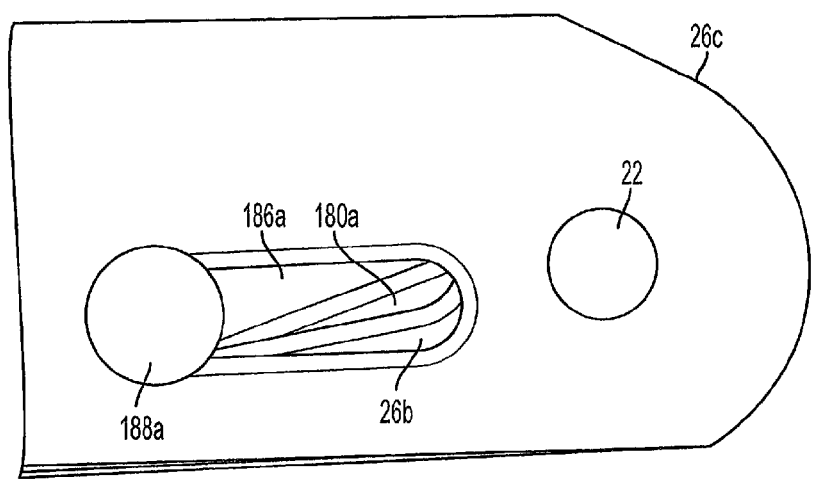
FIG. 40 is a schematic drawing of the telescoping foot portion of FIG. 37 in the retracted position.
Figure 41:
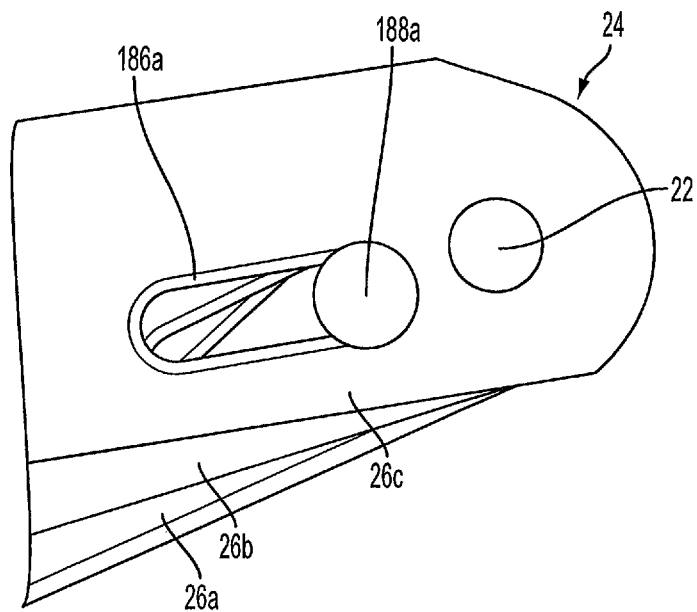
FIG. 41 is a schematic drawing of the telescoping foot portion of FIG. 37, in the extended position.
Figure 42:
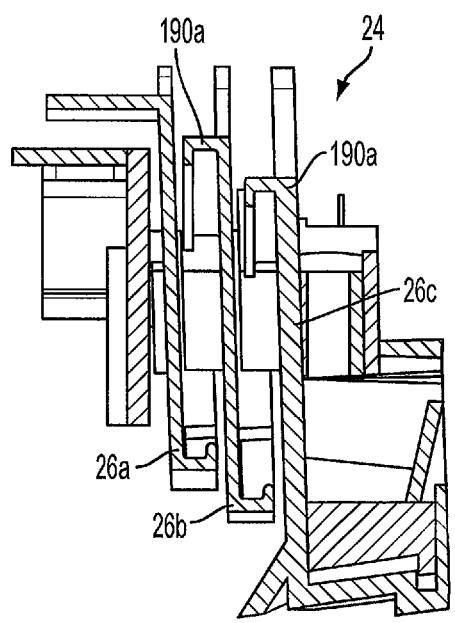
FIG. 42 is a cross sectional view of the telescoping foot of FIG. 37 in a partially extended position.
Figure 43:
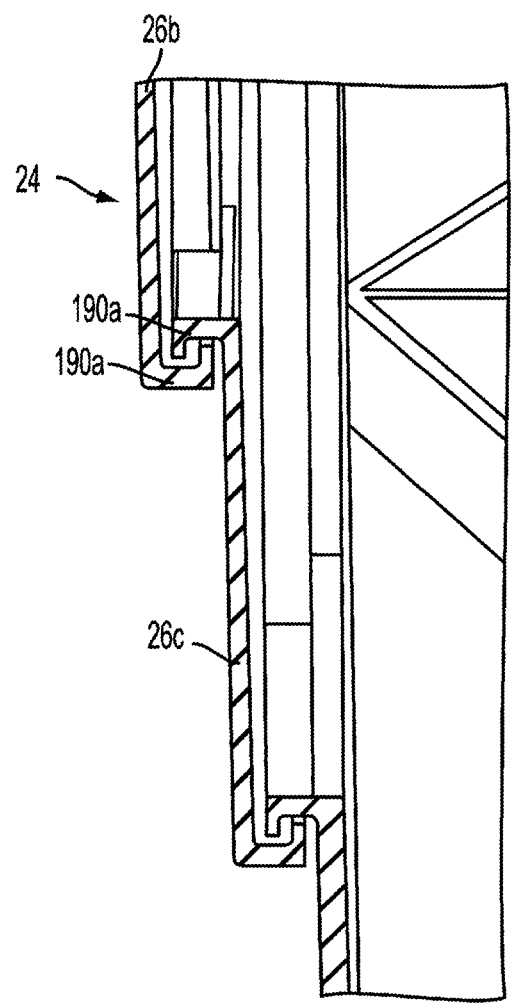
FIG. 43 is a cross sectional view of the telescoping foot of FIG. 37, in the fully extended position.

In other embodiments, with specific reference to FIGS. 37-39, the manual adjustment mechanism includes a manual-adjust release handle 156a positioned on the top of the seat base 12, above the telescoping foot 24. Lifting the handle 156a decouples a leveler screw 158a and a leveler nut 160a, allowing the user to move an upper portion 13 of the seat base 12 to a desired height. Releasing the handle 156a locks the telescoping foot 24 in place.

In certain embodiments, the manual adjustment mechanism also includes a rocker linkage 162a that connects the handle 156a to a sleeve 164a enclosing the leveler screw 158a. In this configuration, the release handle 156a acts as a rocker crank 166a, translating the user's pull into compressive force on an upper link member 168a to rotate the crank 166a. As the crank 166a pivots, it pulls up on a lower link member 172a to raise the leveler screw sleeve 164a relative to the screw 158a. The sleeve 164a slides over the leveler screw 158a, thereby driving a cam 174a into a slit located on the vertically constrained leveler nut 160a. As the nut 160a dilates to allow the leveler sleeve 164a to rise, it decouples from the leveler screw 158a. When the manual adjust handle 156a is released, tension springs 176a pull the leveler nut 160a closed and return the system to the base state. It is noted that, in some embodiments, the thread profile 170a of the leveler screw 158a supports the screw 158a when the telescoping foot 152a is compressed by the tensioned belt 22a. However, the screw profile 170a allows the leveler screw 158a to be manually pulled out without expanding the leveler nut 160a. This unique thread shape also ensures the screw profile 170a and nut 160a fully engage when the leveler nut 160a is released, regardless of their alignment.

It is desirable that the height adjustment system is not backdriveable so that, in the event of a crash, the forces are not transferred through the drive train of the actuating mechanism. In view of this concern, the leveling mechanism 20 further comprises a locking mechanism 38 with a ratchet, and pawl for securing the cam 30 in place once the desired height is reached (shown in FIG. 5).

Figure 6:
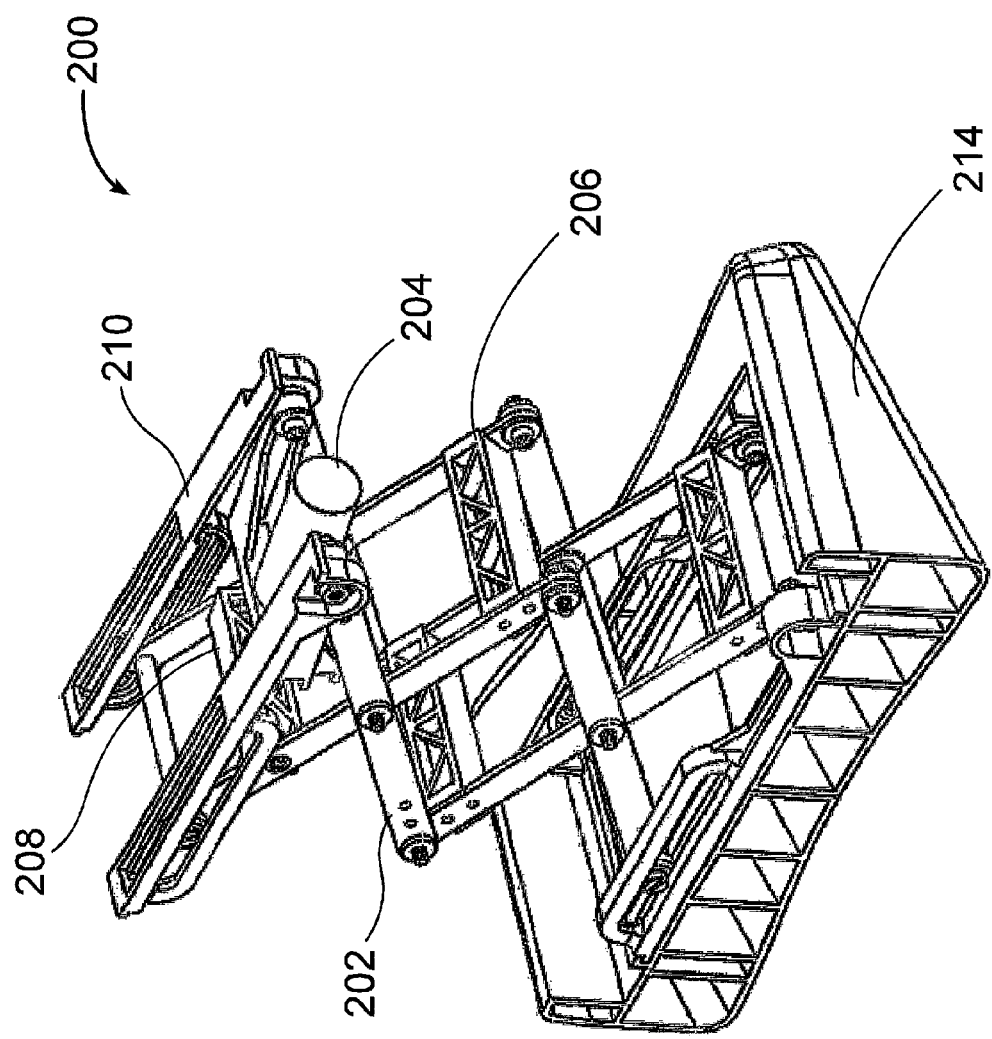
FIG. 6 is a perspective view of a leveling foot with a linear motion mechanism according to another embodiment of the present invention having a scissor mechanism for providing automated leveling and angle feedback.
Figure 7:
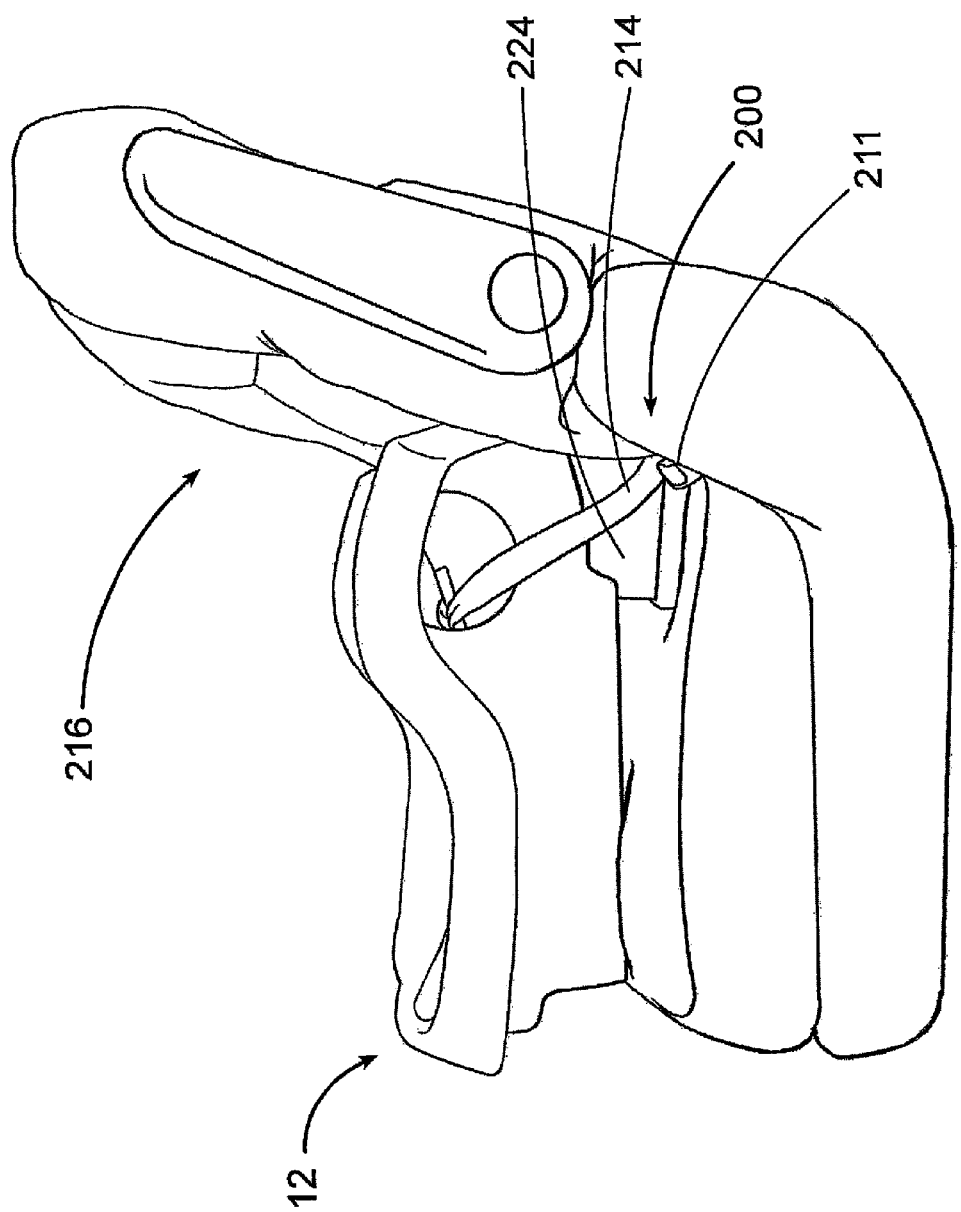
FIG. 7 is a side view of a linear motion leveling mechanism with a foot extending from the carrier base installed in a vehicle seat.

Alternatively, as shown in FIGS. 6 and 7, the CRS may include a liner extension mechanism 200 to adjust the height of the base 12. A liner extension mechanism relies on motorized leg(s), which can be raised or lowered to achieve the required optimal angle. As with the rotational adjustment mechanism, the extendable foot is driven by a motor. The motor used to power the legs may be of any type, electrical or other, such as hydraulic. The motorized legs may extend and contract by means of a screw jack mechanism, scissor jack, cable and pulley, chain, hydraulic/pneumatic piston, or other type of mechanical mechanism. As illustrated in FIG. 6, in one embodiment of the automated leveling system with linear extension mechanism, a scissor jack mechanism is utilized. The scissor jack comprises scissor legs 202, a motor and screw 204 for driving the movement of the legs 202, a stabilization bridge 206 extending between corresponding scissor legs 202, and a screw collar 208 engaged with the motor. The internal base of the CRS is mounted to the scissor legs 202 by mounting rails 210. FIG. 7 is a perspective view of the base 12 installed in a vehicle seat 216. The foot 224 is in the extended position. The CRS is attached to the vehicle seat 216 by connectors 211 attached to a connector belt 214.

For either the linear motion or rotational leveling mechanisms, it is desirable for the range of adjustment to exceed the height of the base. In this case, a telescoping or nesting covering is necessary to cover the mechanics throughout the entire range of extension. Furthermore, the rotational joint and linear elevation devices described above should not be construed as limiting the present invention as other mechanisms may be utilized to elevate and level the CRS. Further, the embodiments and examples above related to leveling mechanisms are not limited to leveling the seat base but may also be used for leveling the child receiving portion of the CRS.

Figure 8:
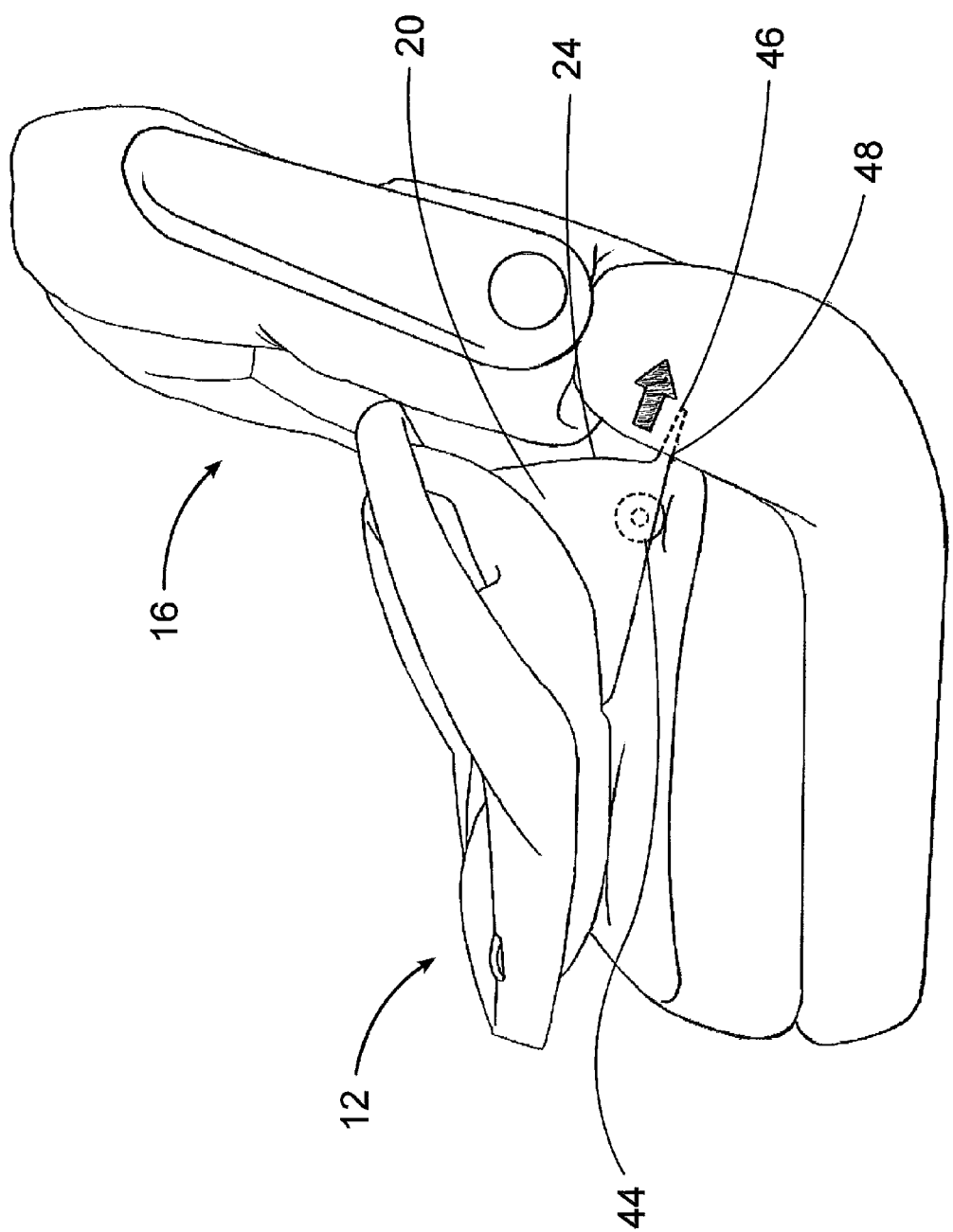
FIG. 8 is a side view of the carrier base of FIG. 2 installed in a vehicle seat having a roller attached to the foot and a lip extension that fits between the vehicle seat cushion and back for easier installation.

The interaction between the CRS foot and base and the vehicle seat is very important. In order to prevent the CRS leg or base from becoming jammed during the installation process, the portion of the CRS that interfaces with the seat may be shaped in a way to facilitate sliding the CRS into the correct position. According to one embodiment, as shown in FIG. 8, this is accomplished with wheels 44 for rolling the base to the desired location on the vehicle seat 16. A lip extension mechanism 46 extends from the foot 24. When the base 12 is installed, the lip extension mechanism 46 fits between the vehicle seat cushions and the back of the vehicle seat. A sensor 48 on the lip extension mechanism 46 records whether the CRS is in the proper position. Alternatively, a ski like plastic contour on the bottom of the CRS would be effective for sliding the CRS to the desired position. In addition to use with the fully integrated CRS system described herein, the automated leveling system and tensioning mechanism are applicable to various formats of child restraint systems. These formats include, but are not limited to, rear-facing infant carriers, forward-facing and rear-facing convertible child seats, combination seats, booster seats and those for use with vehicle lap/shoulder belts. These child restraint systems may or may not contain a separate base component and a removably coupled child receiving portion.

Belt Tensioning System

In another embodiment, the automated CRS of the present invention includes an integrated mechanism for automatic tightening of at least one belt. FIGS. 9 through 14 depict an embodiment of the tensioning mechanism 60 or belt tensioning system. The belt 14 extends from the connectors 2 to the CRS. The belt 14 is wound through and secured in place by the tensioning mechanism 60.

Figure 9:
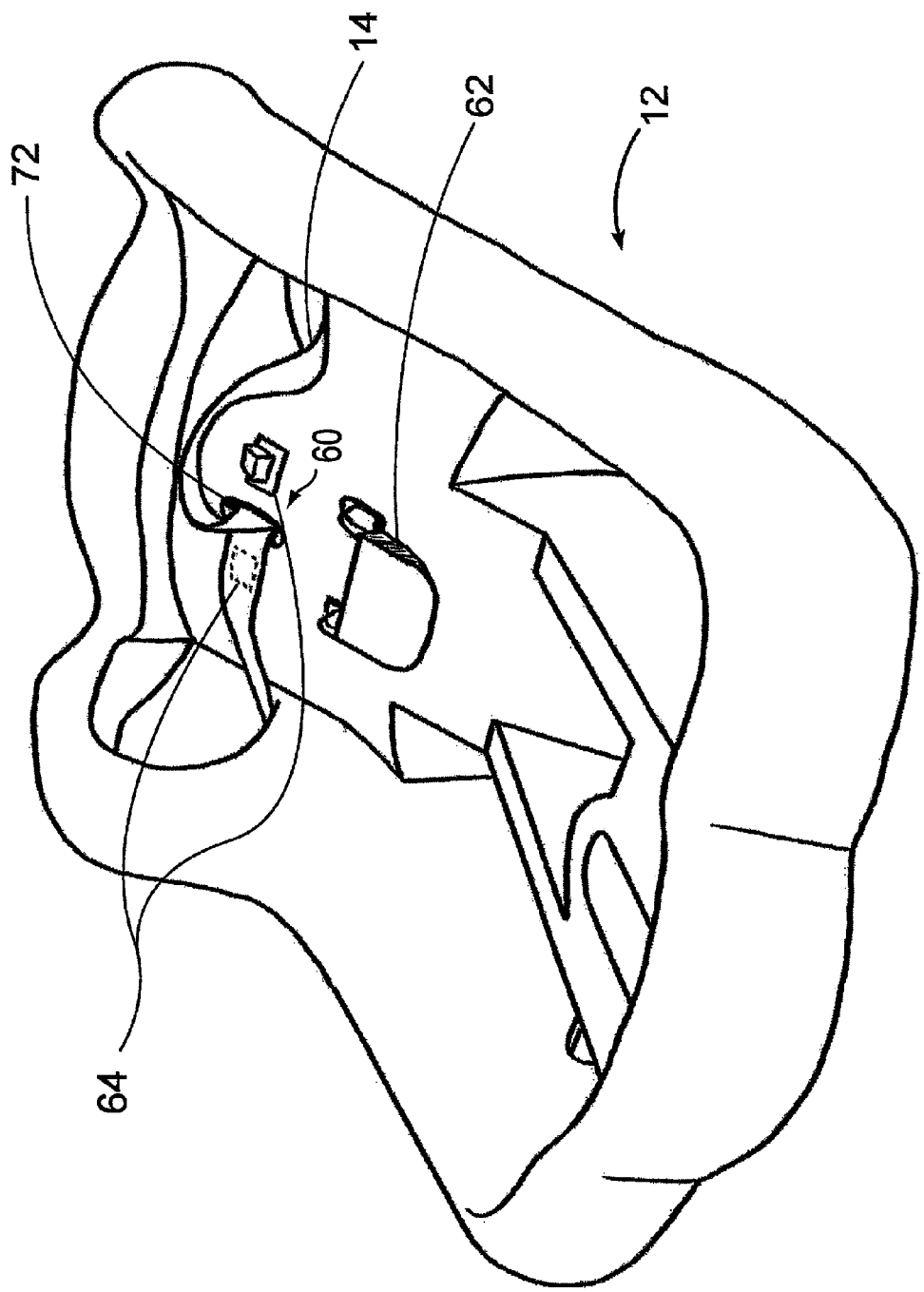
FIG. 9 is a perspective view of the carrier base of FIG. 2 with a belt for attaching the base to a vehicle seat and a tension detection sensor for measuring the tension on the belt.
Figure 30:
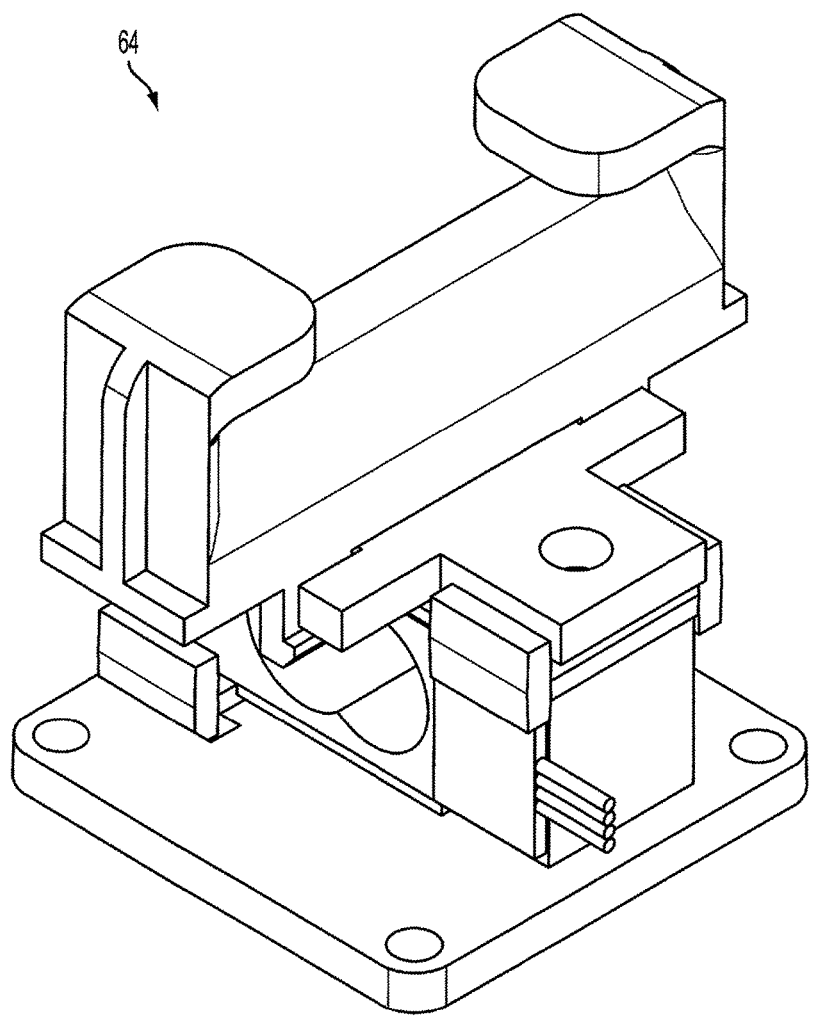
FIG. 30 is a perspective view of an embodiment of a tension sensor for the belt tensioning system of FIG. 29.

As shown in FIG. 9, the tensioning mechanism 60 includes one or more tension detection sensors 64 located on the exterior of the carrier base 12 for measuring the tension of the belt 14 against the base 12 to ensure that the base is firmly attached to the vehicle seat. The belt 14 enters the tensioning mechanism 60 through a slot 72 located on the exterior of the carrier base 12. The manual release 62 is also located on the top of the base 12. A tension detection sensor is an electro-mechanical device for determining belt tension feedback. For instance, it is possible to mount tension sensors 64, such as pressure sensors, spring sensors, strain gauge(s), or other load cell(s) to various support members of the CRS in order to measure forces which can be directly related to the tension of the connection belts. These gauges or load cells can be mounted to the support structures of the belt tightening mechanism, such that strains or loads on these members might be correlated to the tension of the belts as shown in FIG. 9. Alternatively, the gauges or load cells may also be mounted on the shaft of the belt tightening motor to relate torque deformation to belt tension. Alternatively, the gauges or load cells may also be mounted in the "legs" or other load bearing areas of the heightening mechanism or support structures, in order to determine forces related back to belt tension. The feedback from these torque and/or tension sensors is used to indicate to the CRS controller when the belt tightening motor/mechanism should be stopped due to reaching desired tension. Any combination of these measurement techniques can be used in concert to more accurately or robustly provide belt tension feedback. An exemplary tension sensor is depicted in FIG. 30.

Figure 10:
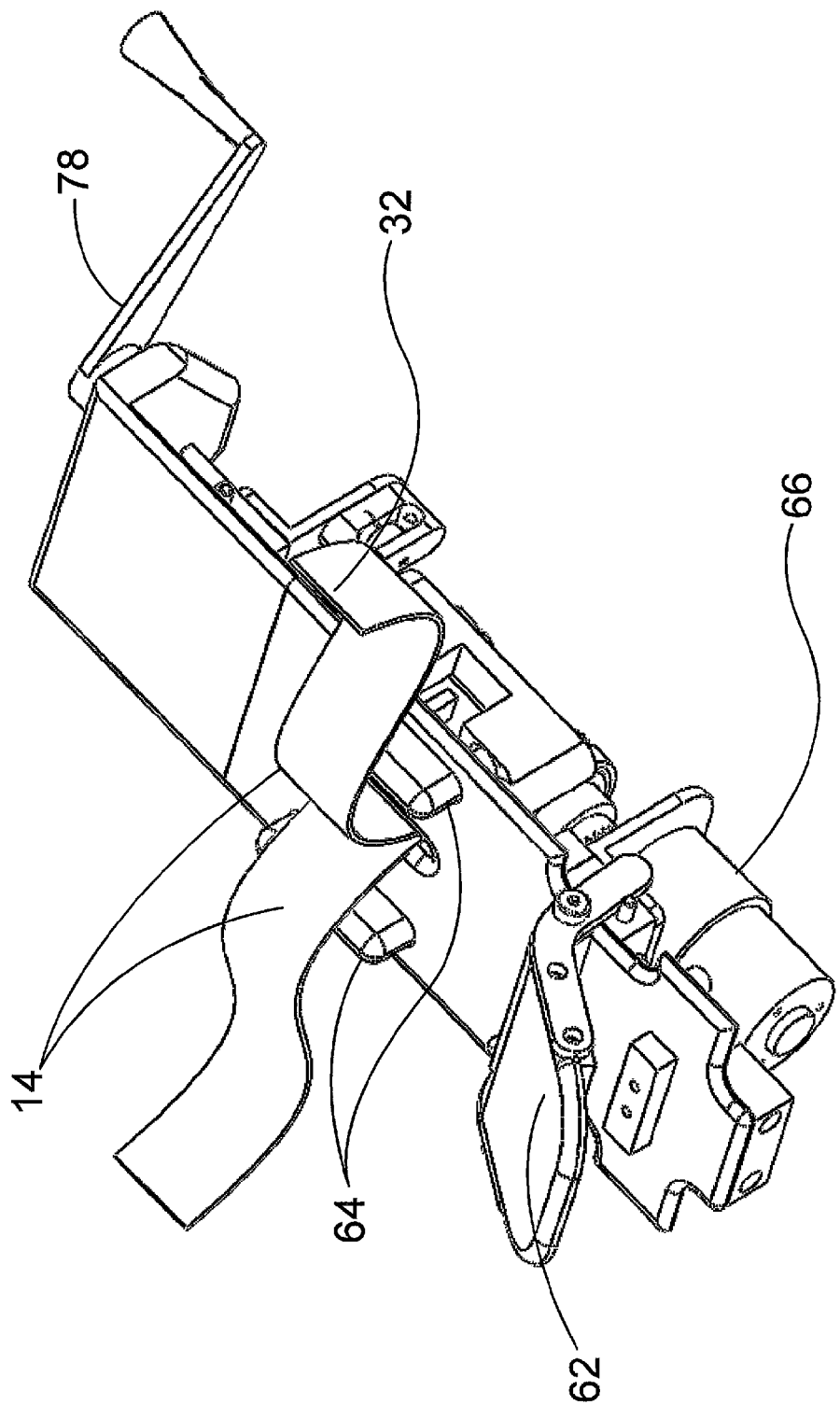
FIG. 10 is a top-side perspective view of a tensioning mechanism according to the present invention for automatically increasing the tension on a belt.
Figure 11:
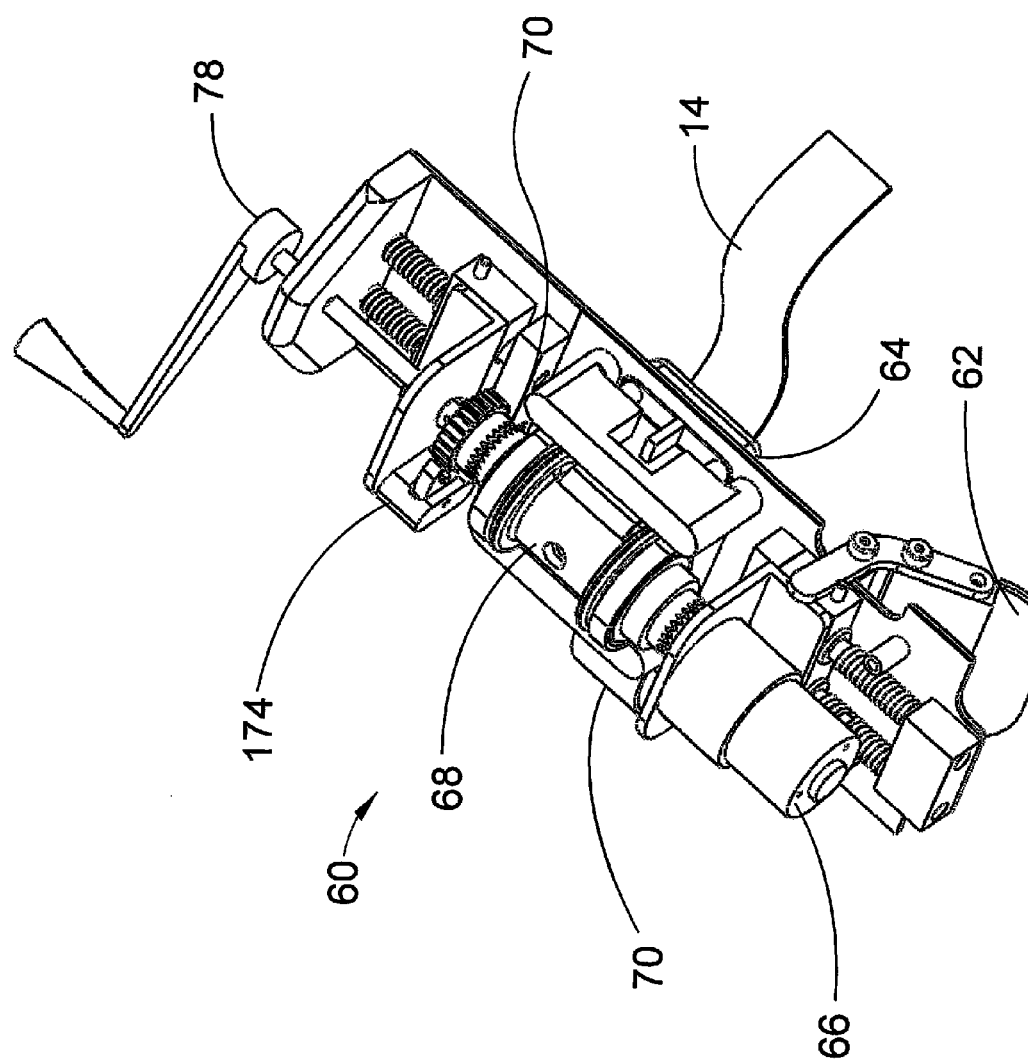
FIG. 11 is a bottom-side perspective view of the tensioning mechanism of FIG. 10 showing the belt wound around a belt tightening spindle and a latching mechanism consisting of a pawl and ratchet for preventing "backdriving" of the belt.

FIGS. 10 and 11 are top-side view and bottom-side perspective views of the tensioning mechanism 60. The mechanism 60 is located inside the carrier base 12. The tensioning mechanism 60 comprises a motor 66 which rotates a belt tightening spindle 68. The motor 66 is engagingly connected to the tightening spindle 68 by a Hirth coupling 70. In use, the belt 14 enters the tensioning mechanism 60 through a slot 72 in the base 12 located above the tensioning mechanism. Where the motor is controlled by a driver interfaced with the automatic control system of the CRS, the motor control is configured to monitor electrical current draw. The measurement can be used to determine the torque on the motor which is directly related to tension on the belt. Additionally, the measurement can be used to detect increase in current draw, indicating obstructions to the associated motor mechanism. Alternatively, the tension sensors 64 are used to monitor the tension of the belt 14.

Figure 12:
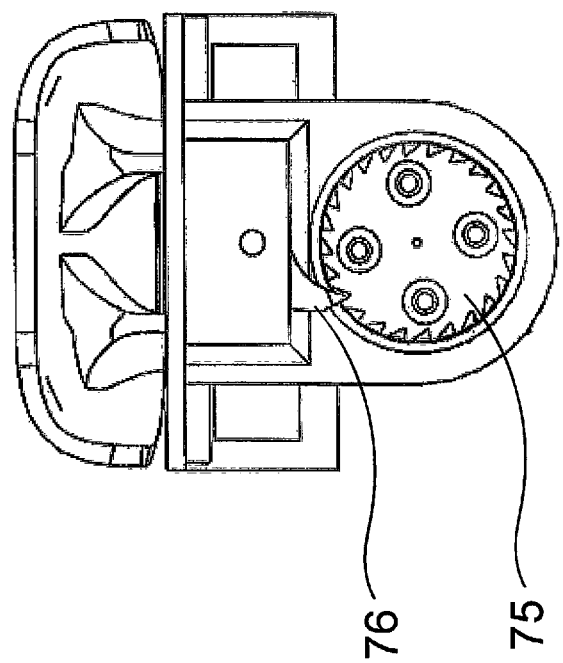
FIG. 12 is a side view of the pawl and ratchet mechanism of FIG. 11.

One challenge in designing the belt tightening mechanism is that ideally the tightening mechanism should not be required to withstand crash forces to achieve appropriate safety standards. Having to account for crash forces would add significant cost and complexity to the design of the drive system. Instead, configuring the drive system as a non-backdriveable system satisfies necessary safety levels without the added complexity of needing to configure the mechanism to withstand crash forces. Although there are many such non-backdriveable drive mechanisms, the preferred embodiment according to the present invention uses a motor 66 to operate a locking mechanism 74 comprising a ratchet 75 and pawl 76 (shown in FIG. 12). Alternatively, a motor could pull a friction-based mechanism similar to existing belt tensioning mechanisms that are common in the art. As shown in FIG. 11, the locking mechanism 74 is located between the spindle 68 and a manual overdrive crank 78. FIG. 12 depicts a more detailed view of the ratchet and pawl mechanism in which the belt tightening ratchet 75 is contacted by the spring loaded pawl 76. The pawl 76 prevents the ratchet 75 from rotating in a backwards direction.

When the drive mechanism is non-backdriveable, the system must be designed to allow for release of tension in some other manner so that the CRS may be removed from the vehicle seat. The belt tightening mechanism in FIGS. 10 and 11 can be manually disengaged in order to allow the user to uninstall the CRS. In this embodiment, a manual belt release latch 62 is located on one end of the tightening mechanism 60. Once the release latch 62 is engaged, a user can manually adjust tension using a manual overdrive crank 78 located on the other end of the tightening mechanism.

Figure 13:
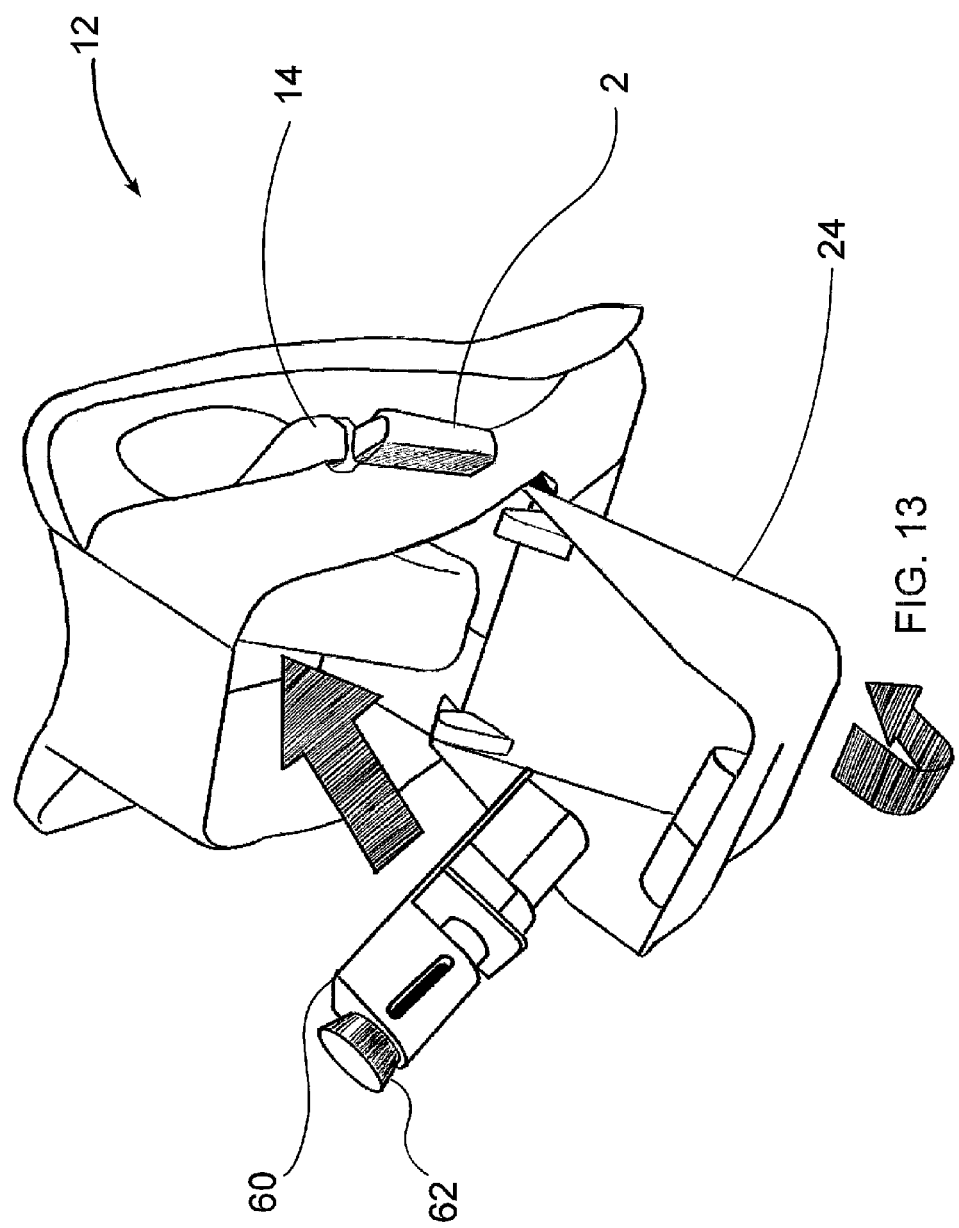
FIG. 13 is a perspective view of the bottom of the carrier base of FIG. 2 with a foot of the leveling mechanism in the open position, so that the tensioning mechanism is accessible.

As shown in FIG. 13, the motorized belt tightening mechanism 60 is located in the interior of the infant carrier base 12. The tightening mechanism is accessible when the foot 24 of the leveling mechanism 20 is in the open position.

Figure 14:
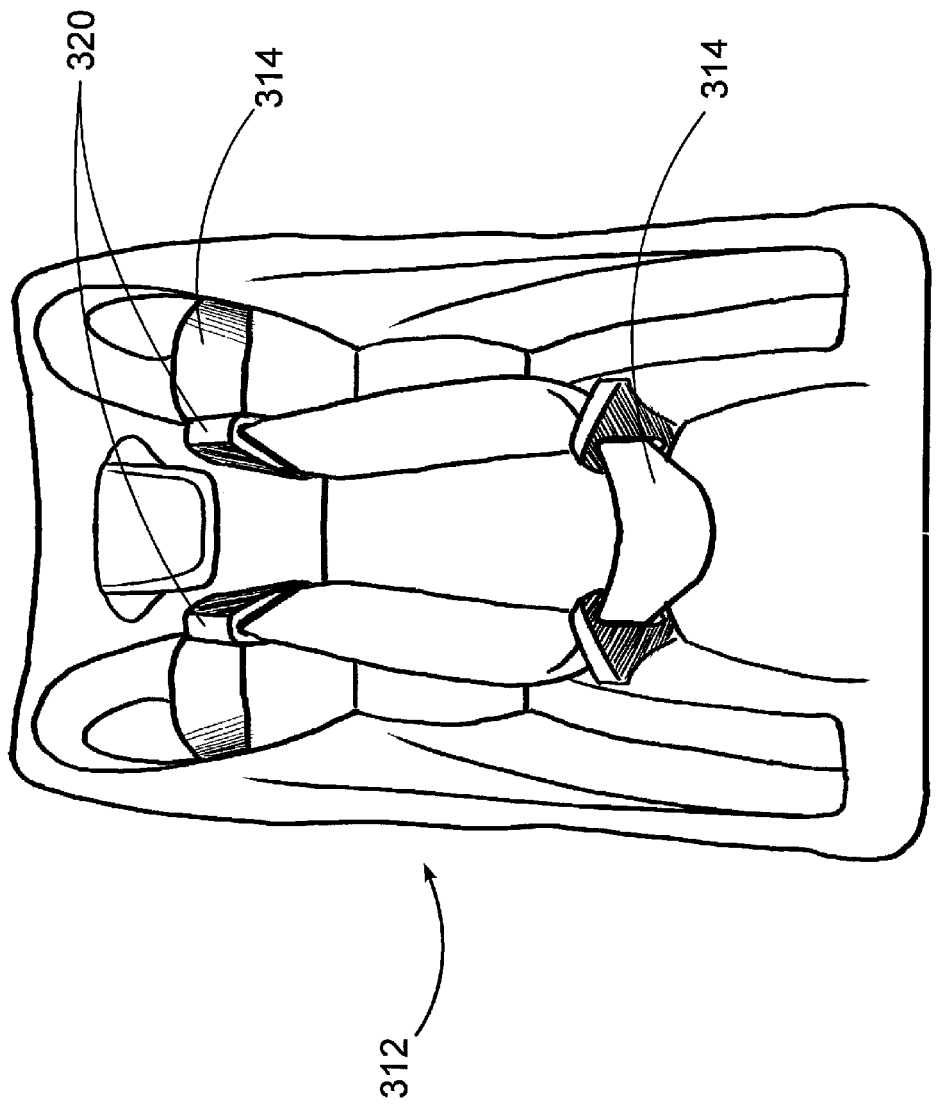
FIG. 14 is a perspective view of another embodiment of a carrier base with a belt in an improved routing configuration.

With reference to FIG. 14 another embodiment of a seat base of a child carrier is illustrated in which a belt 312 is held in a "routing orientation." The routing design allows the belt 314 to exert forces in both the downward and backward directions thereby more firmly attaching the base 312 to the vehicle seat. As shown in FIG. 14, the belt 314 is attached to the carrier base by four loop holders 320 causing the belt to form a U-shaped curve.

Figure 29:
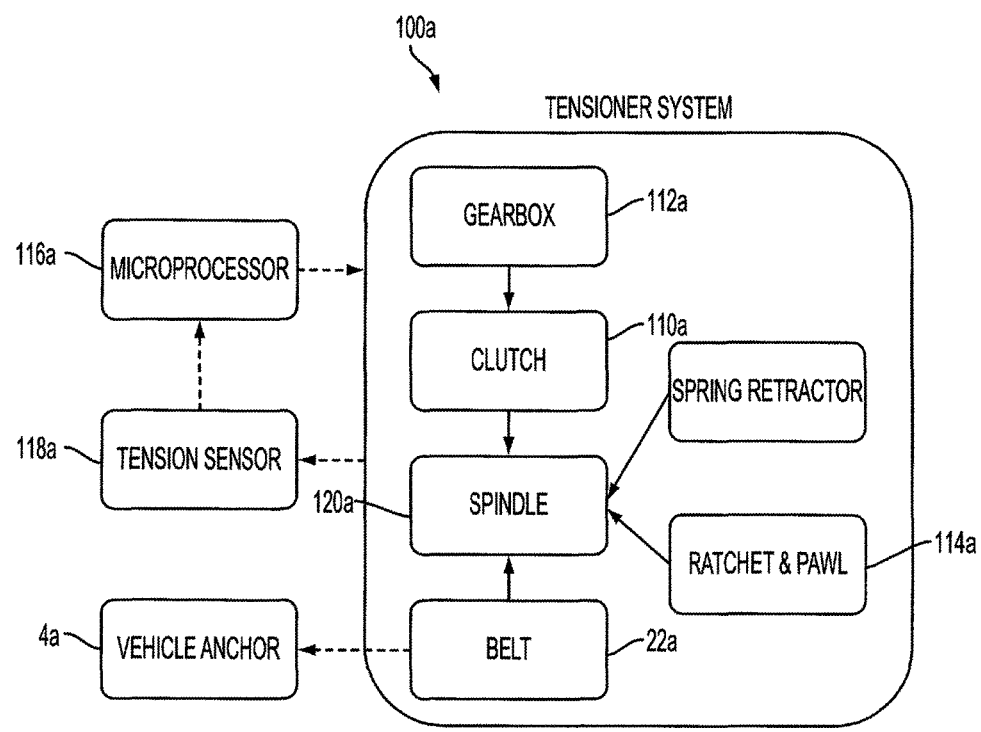
FIG. 29 is a schematic drawing of an embodiment of a belt tensioning system for a child car seat.

With reference to FIG. 29, a schematic view of another preferred embodiment of a belt tensioning system 100*a* is illustrated. The belt tensioning system 100*a* is configured as a substantially automated system in which a clutch 110*a*, gearbox 112*a*, and ratchet and pawl mechanism 114*a* are controlled by a controller 116*a*, such as a microprocessor. This allows the system to be both automatically and manually reversible and adjustable.

Figure 31:
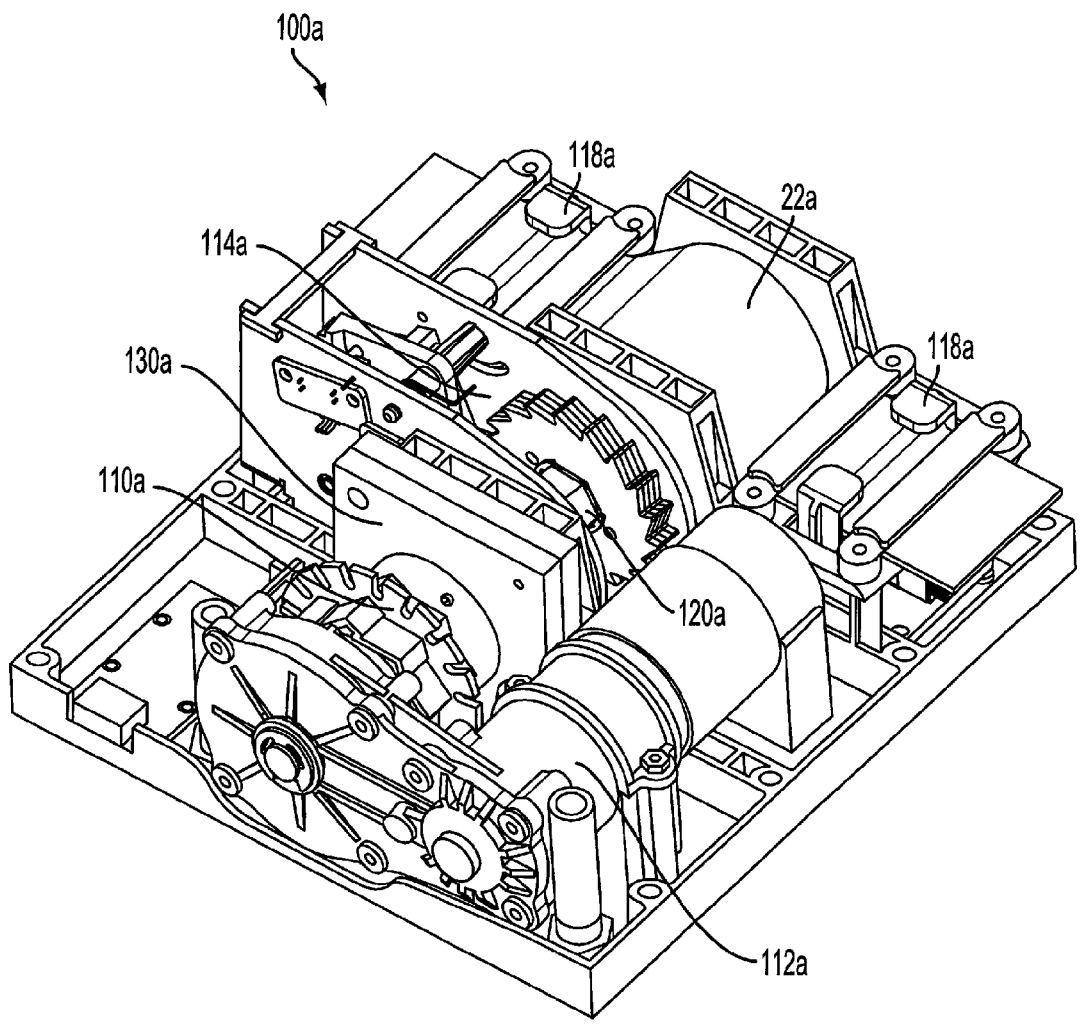
FIG. 31 is a perspective view of a belt tensioning module of a child car seat.
Figure 32:
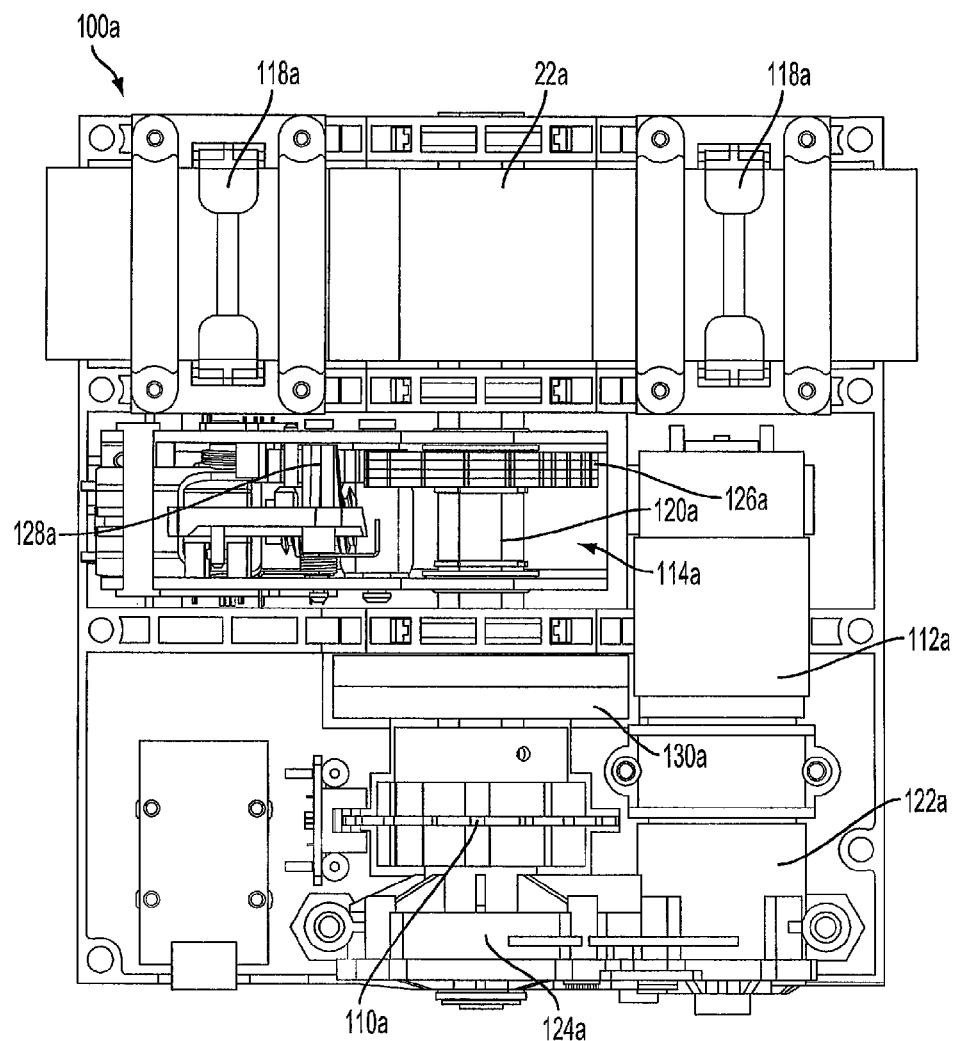
FIG. 32 is a top view of the belt tensioning module of FIG. 31.
Figure 33:
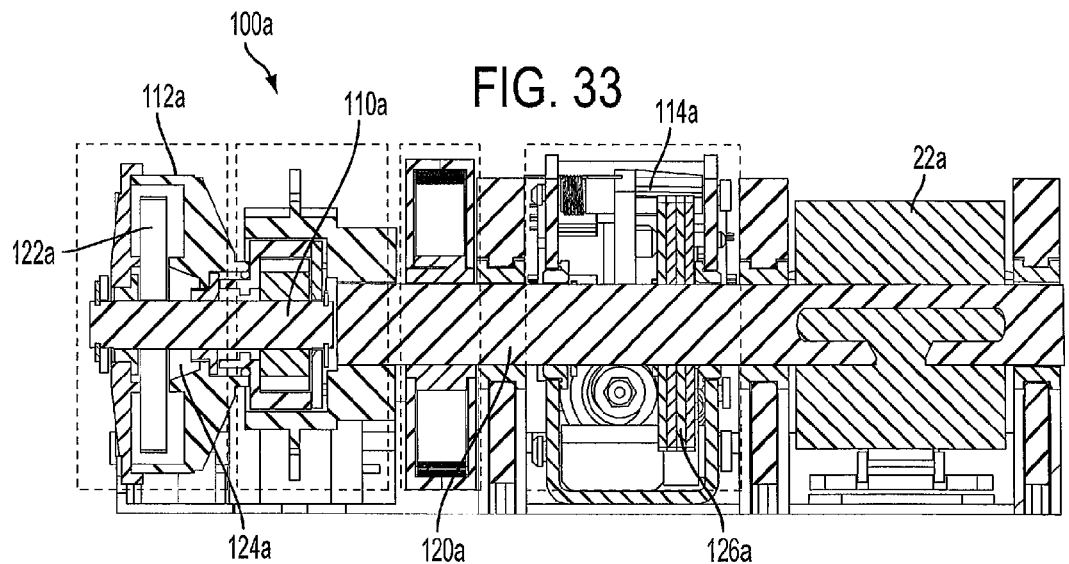
FIG. 33 is a top cross sectional view of the belt tensioning module of FIG. 31.

With reference to FIGS. 31-33, a perspective view of the gearbox 112*a* and clutch 110*a* of the belt tensioning system 100*a* are illustrated. The gearbox 112*a* and clutch 110*a* are configured to drive a spindle 120*a*, such as a hexagonal spindle. The belt 22*a* is wrapped around the spindle 120*a*, such that rotation of the spindle 120*a* in the pay-in direction winds the belt 22*a* about the spindle 120*a*. Once a desired tension is obtained, the clutch 110*a* may be disengaged from the spindle 120*a*, thereby allowing the spindle 120*a* to freely rotate in either the pay-in or payout direction. The belt tensioning system 100*a* may also include a ratchet and pawl mechanism 114*a*. When engaged to the spindle 120*a*, the ratchet and pawl mechanism 114a prevents payout of the belt 22a. The ratchet and pawl mechanism 114a may be electromechanically driven and automatically controlled based on instructions received from the controller 116a or may be user operated manually. Various views of the belt tensioning system 100a, including the gearbox 112a, clutch 110a, spindle 120a, ratchet and pawl mechanism 114a, and belt 22a are depicted in FIGS. 31-33. These subassemblies of this embodiment of a belt tensioning system 100a will now be described in detail.

The belt tensioning system 100a includes the at least one belt 22a. For example, the belt 22a may be formed from a woven material, such as nylon tubular webbing, steel cable, or any other suitable material. The belt 22a may be the seat belt attached to the vehicle seat or may be part of the LATCH system, such that it terminates at one end on the rotating spindle 120a and terminates at the other end at a connector 2, as is depicted in FIGS. 1A-C, 2A and 2B. The connector 2 is configured to engage the LATCH system of the vehicle seat 16.

Figure 34:
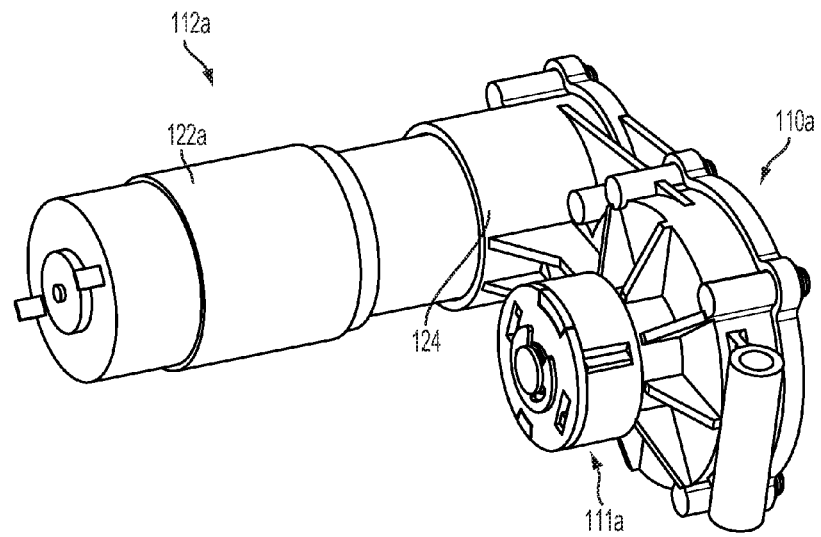
FIG. 34 is a perspective view of gearbox and clutch of the belt tensioning module of FIG. 31.

The gearbox 112a is the primary source of torque used to tension the belt 22a by turning the spindle 120a. The gearbox 112a includes a motor 122a, such as an electric motor, mechanically coupled to a gear reduction 124a. Rotational output of the gearbox 112a is transferred through the clutch 110a before being applied to the spindle 120a. The clutch 110a, positioned between the gearbox 112a and spindle 120a, may be any type of standard mechanical clutch for selectively engaging gears of driveshaft or gearbox 112a. The clutch 110a is configured to transition between an engaged position and a disengaged position. The disengaged position occurs when the gearbox 112a is disengaged from the load on the spindle 120a, allowing the spindle 120a to rotate freely. The engaged position occurs when the gearbox 112a is engaged to the spindle 120a, allowing torque from the gearbox 112a to apply tension on the belt 22a via rotation of the spindle 120a in the backward or pay-in direction only. A perspective view showing the gearbox 112a and clutch 110a, removed from the belt tensioning system 100a, is depicted in FIG. 34.

The clutch 110a may be controlled by an electromechanical mechanism, referred to hereinafter as a clutch motor 111a. In one embodiment, driving the clutch motor 111a in a forward direction engages the clutch 110a to the spindle 120a. Driving the clutch motor 111a in the opposite direction disengages the clutch 110a. Alternatively, transition between the engaged and disengaged positions may be achieved using multiple motors or a manually actuated mechanism, such as a handle or crank.

With continued reference to FIGS. 31-33, the ratchet and pawl mechanism 114a of the belt tensioning system 100a includes a gear 126a coupled to the spindle 120a. A pawl 128a is configured to selectively engage the gear 126a to permit forward movement of the gear 126a and to restrict backward movement. More specifically, the ratchet and pawl mechanism 114a is transitionable between an engaged state and a disengaged state. In the engaged state, the ratchet and pawl mechanism 114a only allows rotation of the spindle 120a in the pay-in direction and locks when the spindle 120a is rotated in the payout direction. In the disengaged state, the ratchet and pawl mechanism 114a allows free motion of the spindle 120a in either rotational direction. The ratchet and pawl mechanism 114a is designed to take significantly higher payout loads compared to the clutch 110a and gearbox 112a. Therefore, the ratchet and pawl mechanism 114a is capable of absorbing loads, such as loads caused during hard stops, high speed turns, or vehicle collisions, that the clutch 110a and gearbox 112a are not designed to counteract. In addition, the ratchet and pawl mechanism 114a remains engaged when power is not available and does not require power for maintaining belt tension and position.

Figure 35:
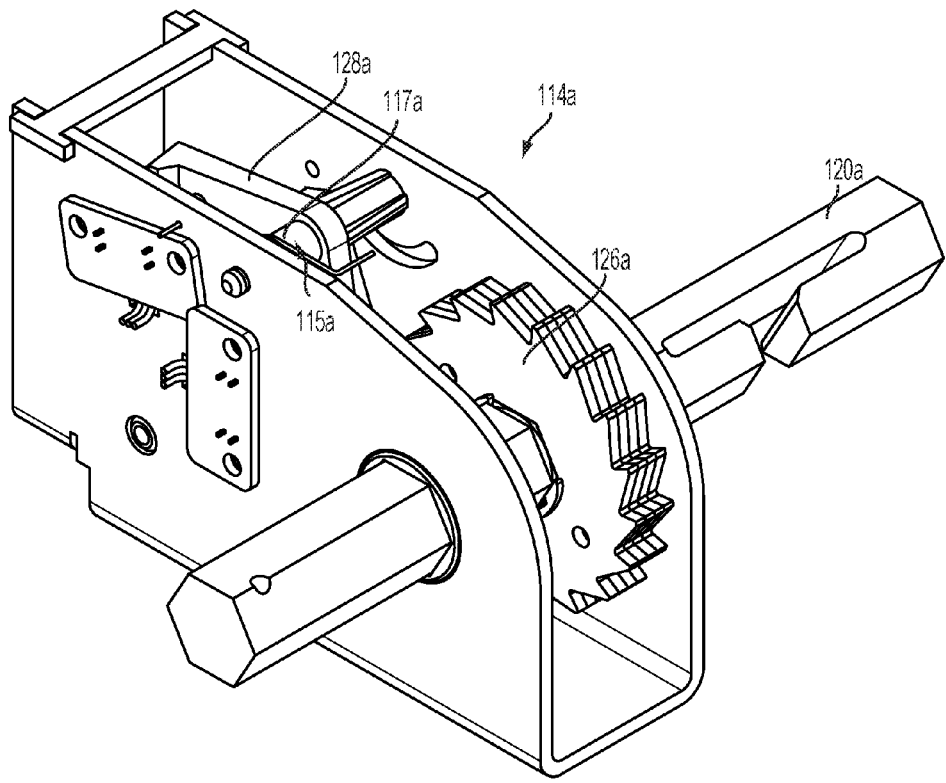
FIG. 35 is a perspective of the ratchet and pawl mechanism of the belt tensioning module of FIG. 31.

As described above, the ratchet and pawl mechanism 114a may be automatically controlled by an electromechanical drive mechanism. In that case, the ratchet and pawl mechanism 114a may include a manual override mechanism 115a that can be used to manually release the pawl 128a to allow belt 22a payout in the event of a power failure. However, in order to prevent a user from manually releasing the pawl 128a at an unsafe time, such as when the child receiving portion 2a is attached to the seat base 12a, the manual override mechanism 115a includes a clutch, referred to hereinafter as an override clutch 117a. The override clutch 117a disengages the manual override mechanism 115a from the pawl 128a to prevent operation of the manual override mechanism 115a at such unsafe times. When the child receiving portion 2a is removed from the seat base 12a, the override clutch 117a is reengaged with the pawl 128a, thereby allowing the manual override mechanism 115a to manually release the pawl 128a to allow belt 22a payout. The override clutch 117a ensures that the ratchet and pawl mechanism 114a cannot become disengaged while the seat base 12a is occupied, even in the case of power failure. An exemplary embodiment of the ratchet and pawl mechanism 114a removed from the tensioning system 100a is depicted in FIG. 35.

The spindle 120a is the main load bearing member of the belt tensioning system 100a. The belt 22a terminates at and wraps around the distal most portion of the spindle 120a. Moving in a proximal direction along the spindle 120a, the gear 126a of the ratchet and pawl mechanism 114a is also fixed to the spindle 120a. A portion of a belt retractor 130a configured to apply a limited and predetermined retracting torque to the spindle 120a is fixed to the spindle adjacent the ratchet gear 126a. Finally, a second half of the clutch 110a is fixed to the spindle adjacent to the gearbox 112a. The spindle 120a is supported by bushings, or bearings, facilitating only a rotational motion thereto.

With continued reference to FIGS. 31-33, the belt retractor 130a applies a unidirectional torque to the spindle 120a. The unidirectional torque is applied in the pay-in direction, in which the belt 22a is pulled back onto the spindle 120a. The belt retractor 130a allows for faster tensioning of the belt by the applying a preload before the gearbox 112a applies full torque to the spindle 120a. This preload, applied in the same direction as the torque from the gearbox 112a, places slight tension on the belt 22a before full tensioning by torque from the gearbox 112a is applied. Applying a preload to the belt 22a prior to the full torque of the gearbox 112a, ensures that any slack from the system 100a is removed prior to full tensioning, thereby preventing the slack from damaging the gearbox 112a.

Figure 36:
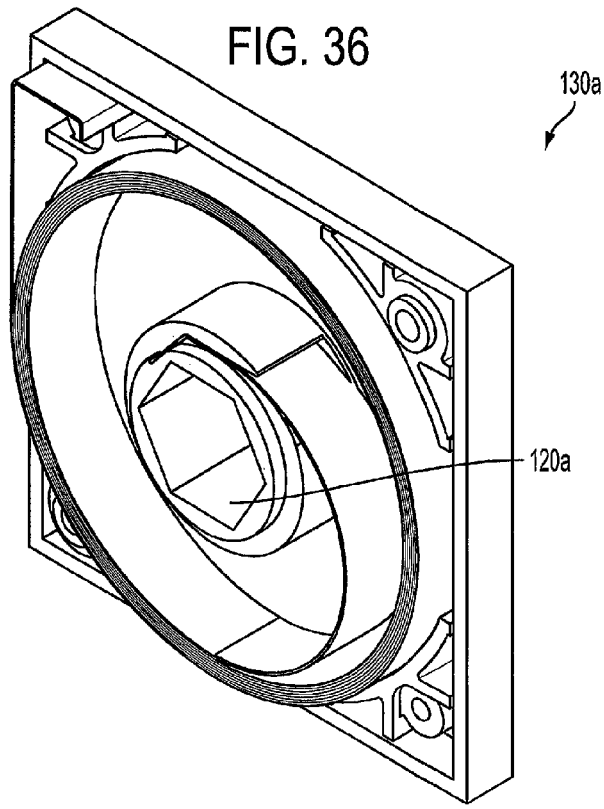
FIG. 36 is a perspective of the belt retractor of the belt tensioning module of FIG. 31.

The belt retractor 130a also increases the power efficiency of the belt tensioning system 100a by redirecting energy provided when a user pays out the belts 22a, and using the energy as a preload for the belts 22a in the pay in direction. The belt retractor 130a may also be used for calibration of the load cells for more accurate tensioning. An exemplary belt retractor 130a for use with the tensioning system 100a is depicted in FIG. 36.

Having described the elements of the belt tensioning system 100a, the system functionality of this embodiment of the tensioning system will now be described in detail. Generally, the belt tensioning system 100a is configured to apply tension to the belt 22a that anchors the seat base 12a to the vehicle seat 16 (shown, for example, in FIG. 2B). Thus, in a simplest embodiment, the belt tensioning system 100a has two states. In the first state, the belt payout state, the clutch 110a is disengaged from the gearbox 112a, and the spindle 120a and ratchet and pawl mechanism 114a are disengaged. In this configuration, the belt 22a freely payouts from the seat base 12a when pulled by a user. In the second operation state, the clutch 110a engages the gearbox 112a to the spindle 120a allowing transfer of torque to the spindle 120a to drive the belt 22a in the pay-in direction to increase tension. It is noted that in this pay-in state, the ratchet and pawl mechanism 114a may be engaged or disengaged. Beneficially, engagement between the ratchet and pawl mechanism 114a and the spindle 120a prevents reverse direction (e.g. payout direction) loads from damaging the clutch 110a or gearbox 112a. Once tension in the belt 22a reaches a threshold level, operation of the gearbox 112a ceases and the gearbox 112a is disengaged from the spindle 120a by the clutch 110a. The ratchet and pawl mechanism 114a is then engaged to the spindle 120a to maintain the desired belt 22a tension.

In other embodiments, the belt tensioning system 100a may have four or more separate operational states. In the first state, referred to as a belt payout state, the clutch 110a is disengaged and the pawl 128a is disengaged from the ratchet gear 126a. In this state, torque applied by the belt retractor 130a freely pulls on the belt 22a to remove any slack therefrom. In the payout state the user can freely pull the belt 22a out, provided that the pulling force is greater than the belt retractor 130a force.

In a second operational state, referred to as a free tensioning state, the clutch 110a is engaged, but the pawl 128a is disengaged from the ratchet gear 126a. In this state, the belt 22a can be brought up to a specified tension without the effects of an engaged ratchet system (acoustics, drag, etc.). As a result of the directionality of the clutch 110a, the belt 22a cannot be paid out so long as the clutch 110a is engaged. However, as discussed above, the clutch 110a is not designed to take high loads. Accordingly, this state is not preferred for any long term use other than installation.

In the third operation state, referred to as a pawl and ratchet tensioning state, the clutch 110a is engaged and the pawl 128a is engaged to the ratchet gear 126a. This state is similar to the free tensioning state, except that now the pawl 128a is engaged with the ratchet gear 128a. In this state, the directionality of the clutch 110a is in the same direction as the ratchet and pawl mechanism 114a. Therefore, if the clutch 110a ceases turning, the pawl 128a will prevent the spindle 120a from reversing direction (e.g. paying out the belt). However, in this state, problematic effects of the ratchet and pawl mechanism 114a, such as noise and drag, are introduced to the system.

In the fourth state, referred to as a rest state, the clutch 110a is disengaged, while the pawl 128a is engaged to the ratchet gear 128a. This state has been found to be useful right after the tensioning of belt 22a begins. More specifically, this state allows for a fast transition to the belt payout state by simply disengaging the pawl 126a from the ratchet gear 128a. It is also safer for the ratchet and pawl mechanism 114a because it insures that the clutch 110a is not left engaged where it could take damage from high loading. Instead, the ratchet and pawl mechanism 114a absorbs any high levels of loading.

CRS Drive Mechanism

A further challenge in the design of the drive mechanism is that the LATCH restraints connect on both the left and right sides of the CRS. Driving a single spindle fixedly attached to the CRS, for example, does not guarantee equal tension in both sides for all vehicle seat geometries. This may be acceptable for some cases, particularly if the attachment anchor points are well defined such as in the ISOFIX standard. In another embodiment, each side is motorized and tightened separately. This embodiment works particularly well for CRS systems that can be mounted forward or rear-facing which often are designed with independently adjustable tethers. A third embodiment uses a single drive system that is not fixedly attached to the CRS. Instead, the drive system is mounted in such a way that it freely slides laterally between a set of end points or pivots in such a way that tension between the sides is equalized. The slideable mechanism is preferred due to the limited space available for the drive system. The drive system should be configured so as not to change the location of the child's center of gravity, nor to infringe on the child's space.

Tensioning and Leveling Operating Routines

The functions of the leveling mechanism and tensioning mechanisms are directed according to an automated installation process. The automated installation process is controlled by a CRS controller comprising a microprocessor and associated electronics. The controller may be integrated into the CRS or self-contained and attachable to the CRS externally. The CRS controller may be wired or wirelessly interfaced with the various sensors disclosed. Some, or the entire control algorithm, may also be realized with discrete analog components in lieu of a digital microcontroller where possible.

Microcontroller and Sensor System

Figure 15A:
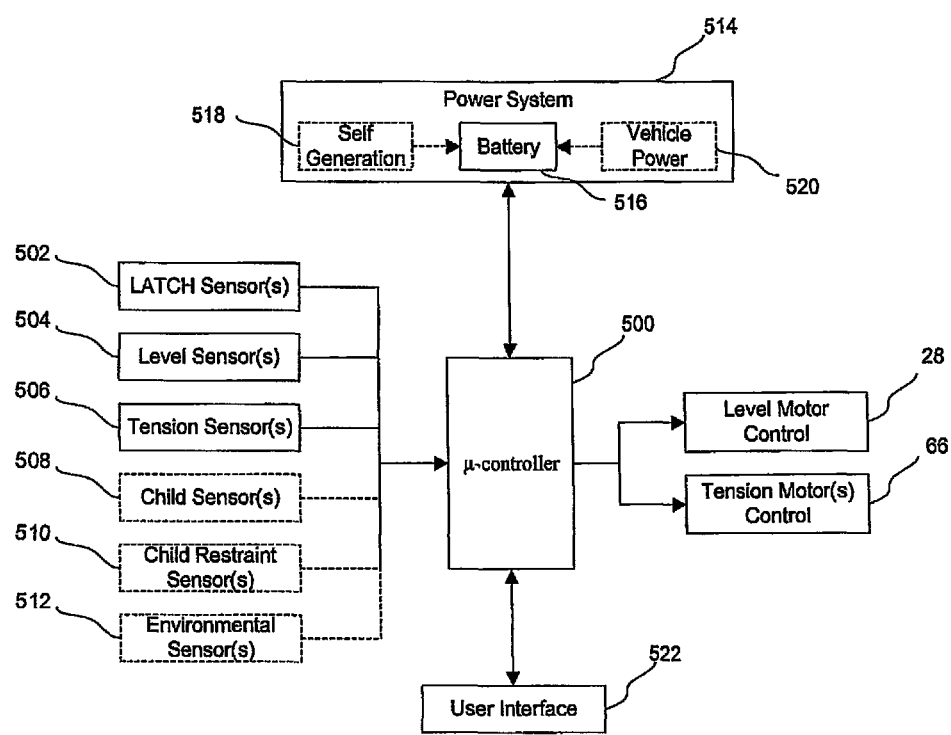
FIG. 15A is a block diagram of the electronic components of the CRS showing the relationship between the components and the microcontroller.

FIG. 15A is a block diagram of the microcontroller, sensors, and additional electronic components of a CRS according one embodiment of the present invention. As depicted in FIG. 15A, the microcontroller 500 receives input from latch sensors 502, level sensors 504, and tension sensors 506. Additional data may also be received from child sensors 508 located on the infant carrier including a child restraint sensor 510 and other environmental sensors 510 located throughout the CRS. The controller 500 receives power from a power system 514 such as a battery 516. Optionally, the controller 500 also receives power from a generator 518 responsive to the motion of the vehicle or from the vehicle itself through a power adapter connected to the vehicle's power outlet 520. The controller 500 may manage how power is stored and distributed to the electronic components of the CRS. Similarly the microcontroller 500 may reduce power consumption by turning sensors and motors on and off at appropriate times. The controller 500 is also in connection with the user interface 522. The controller 500 receives input from a user, such as the weight and age of the child, via the user interface 522. Based on the input data, the installation and monitoring functions of the CRS may be adapted to better correspond to the size and age of the child to be secured. The CRS may also rely on input data to signal to the user how the CRS should be positioned and secured (e.g. front facing or backwards facing, secured using the LATCH system or a seat belt). Similarly, the controller 500 manages when and how data is displayed to a user on the user interface 522. The microcontroller 500 also manages when the leveling and tensioning motors 28, 66 are turned on and off according to an installation algorithm described in greater detail below.

Car Seat Installation Methods

In a NHTSA study and manufacturer literature, it is recommended that a vehicle be parked on level ground before installing a CRS. The automated leveling mechanism of the present invention approximates being parked on level ground by determining the slope of the vehicle. This angle is in reference to a known "level" ground, which would be a plane perpendicular to gravity. Since this reference point can be determined, it is unnecessary for the vehicle to be parked on a level surface during installation, as the control algorithm will compensate for an un-level ground surface by incorporating the degrees from actual level during leveling control. Feedback of the CRS angle is achieved by a single or multiple axis accelerometer(s), or other like sensor, with the ability to indicate its angle with respect to Earth's gravity, providing a graduated electrical analog or digital signal. This signal has sufficient resolution in order to make informed control decisions related to feedback of CRS angle. Ideally, a seat back angle between 30 and 45 degrees in respect to level ground should be achieved when the CRS is placed in a rear-facing position.

Figure 15B:
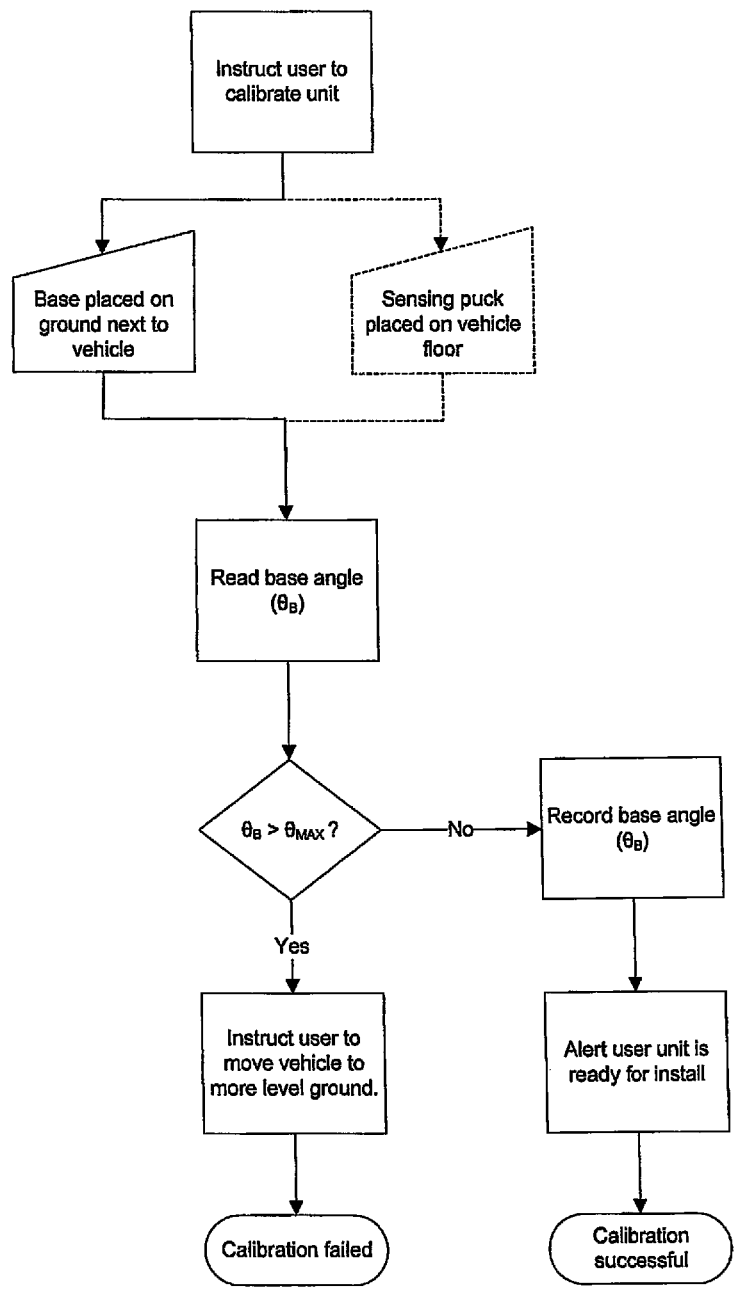
FIG. 15B is a flow chart describing the algorithm for calibrating a CRS according to the present invention.

The installation process begins with a calibration cycle. FIG. 15B is a flow chart depicting a calibration cycle as adapted for use with one embodiment of the CRS carrier. First, the user is instructed to place the CRS on the ground in a specific orientation parallel to the major axis of the vehicle. The angle of the ground relative to gravity is measured by the accelerometer.

A second option for determining the base angle is to have a reference puck that is independently moveable from the CRS but able to communicate via wires or wireless communication. This puck can be placed on a level surface such as the ground or the vehicle floor during the installation calibration portion. The puck should be designed in such a way that the intended orientation of the puck during this calibration process is readily evident.

A third related option to the puck is to have a foot extending from the CRS adapted to engage with the vehicle floor. The vehicle floor can be assumed to be level as a calibration surface. The relative angle between the foot at the base can be used to determine the reference angle. The leveling and tightening algorithms disclosed here could also be applied to a system without the calibration mechanism by instructing the user to first drive the car to a level pad similar to existing installation instructions.

Once the base angle ($\theta_B$) is determined, the CRS compares $\theta_B$ to a maximum angle ($\theta_{Max}$). The maximum angle is a preset value which represents the maximum slope on which a vehicle can be parked before it is unsafe to install the CRS. If the maximum angle is too great, the CRS instructs the user to move to more level ground before installing the CRS. If the slope is not greater than the maximum value ($\theta_B < \theta_{Max}$), the base angle ($\theta_B$) is recorded for use during installation. Then the user is alerted that the device is ready for install. At that point, the user places the carrier base on the vehicle seat, secures the connection belt to the LATCH system or other attachment mechanism such as a seat belt system, and begins the installation process by pressing an activation button located on the user interface.

Figure 15C:
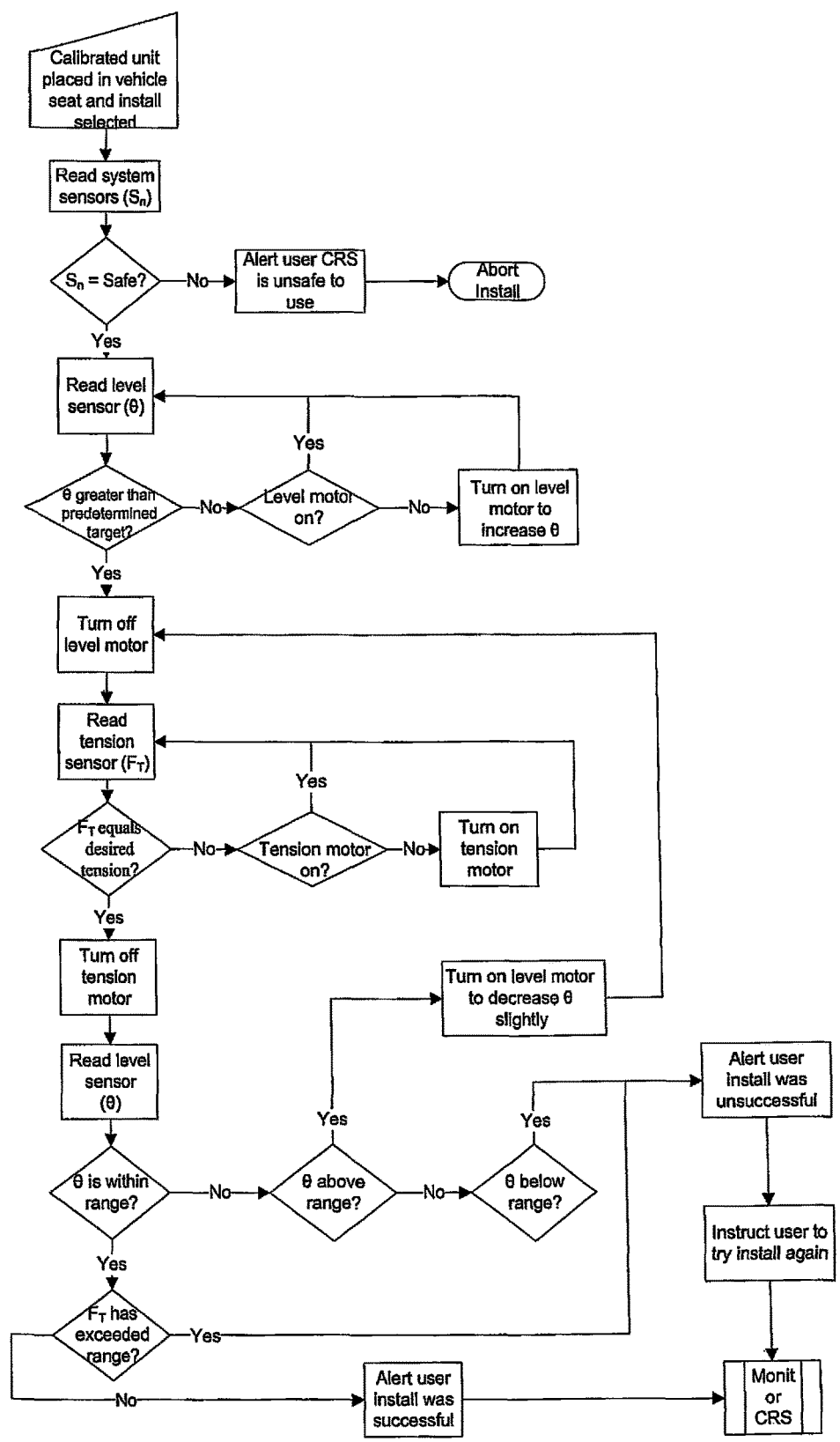
FIG. 15C is a flow chart describing the installation, leveling, and tensioning algorithm as used by a CRS according to the present invention.

One embodiment of the installation algorithm, as shown schematically in FIG. 15C, utilizes an iterative process in which foot elevation and tension are modified in small increments to arrive at a desired angle and belt tension level. FIG. 15C is a flow chart depicting this iterative process.

As described above, before the installation process is started, the CRS must be calibrated to determine the angle ($\theta_B$) of the ground on which the vehicle is parked. After calibration, a plurality of system sensors are read to ensure that the CRS is safe for use. This unique feature in the automated install process allows the system to prevent installation of a CRS that may not be safe. For example, since materials degrade (e.g., polymer hysteresis) over time, each CRS is given an expiration date at the time of manufacture. If the current date exceeds the expiration date, the CRS controller can either warn the user or prevent installation according to a predefined set of rules. Similarly, after a CRS is in a crash, even if there is no externally visible damage, internal damage may mean the seat is unsafe. By either monitoring an accelerometer in the X-Y plane or by use of a mechanical fuse that permanently deforms when subjected to a force in excess of a predetermined amount, the CRS controller can determine when the seat should no longer be used. In this case, the CRS system either warns the user or prevents installation entirely. Similarly, the CRS may alert the user that the vehicle is parked on such a steep grade (beyond twenty two (22) degrees) that it would be unsafe to install the CRS.

Optionally, at this point, the CRS control system can simplify the installation process by soliciting metadata from the user such as the child's age, height, or weight, or the vehicle in which the seat is being installed in order to recommend that the seat be installed forward facing or rear-facing, where the shoulder straps need to be positioned, or the safest place to install the seat in this model of vehicle. Alternatively, the height or the weight of the child may be determined by sensors associated with the car seat.

If sensors indicate that the device is safe ($S_n$=yes) then the automated system moves forward to the next installation step. At this point, a sensor reads the angle θ. θ is the angle of the device in relation to actual level (e.g., a level perpendicular to gravitational force). The sensor is preferably a three axis accelerometer capable of measuring this orientation.

If θ is less than a calculated level, and the leveling motor is not already engaged, a signal is sent to the motor to turn on. Turning on the motor increases the height of the foot thereby increasing θ. The calculated level is equal to the calibration angle $\theta_B$ plus a predetermined overshoot value. The overshoot value means that the motor will continue to run elevating the base beyond the level position. Once θ equals the calculated level, the level motor is turned off.

After the level motor is turned off, the tension of the belt ($F_T$) is read by the tension sensor. Possible tension sensors include a strain gauge, a pressure gauge, or other mechanical sensor. In a similar feedback loop to the process for the leveling motor, if $F_T$ is less than the desired tension, the motor will continue to run until the desired tension is reached. Since the tension mechanism is non-backdriveable, if $F_T$ exceeds the desired tension, the installation fails and must be started again. In an iterative process, once the tension motor is turned off, the leveling angle θ is once again measured. If θ is within range (preferably defined as within 5 degrees of $\theta_B$), and $F_T$ has not exceeded the desired tension, the system will alert the user that installation was successful. If θ is above range, the level motor is turned on to decrease θ slightly. Once the level motor is turned off, the tension motor is turned on to increase the tension on the belts to the desired level. If, however, θ is below the desired range, the system will alert the user that installation was unsuccessful.

The iterative leveling algorithm described above is but one of many algorithms in which the leveling sensors and mechanism may be used alone or in combination with the tensioning sensors and mechanism to effectively automatically level the CRS. For example, the leveling mechanism and sensor may independently level the CRS. In this case, a simpler leveling algorithm would be employed in which the height of the elevating foot would be increased until the desired predetermined angle is achieved. The predetermined angle could either be based on a factory set value or an angle determined using the calibration procedure described above and depicted in FIG. 15B. In the case of a factory preset value, it would be necessary for the vehicle to be parked on relatively level ground. As described above, the calibration procedure can be used to install the seat base even when the ground is not level.

Alternatively, the leveling sensor could be used in combination solely with a tensioning mechanism whereby the tension on the belt is continually increased until the leveling sensors determine that the CRS has reached the correct angle. Similarly, the leveling mechanism could continue to increase the elevation of the foot until a predetermined belt tension as measured by the tension sensor is achieved. In that instance, the leveling mechanism is adjusted solely in response to input from the tensioning sensor. It is understood that the present invention could be used with any of these leveling algorithms.

Another possible automatic installation algorithm modifies level and tension independently to place the CRS in the desired orientation. Specifically, an installation process which modifies elevation of the foot and tension either simultaneously or sequentially may be useful in certain situations. For example, CRSs for use with the ISOFIX system, can be designed with the rotational angle adjustment system on top of a fixed frame so that the device can be first tightened and then leveled independently. In this case, the position of the rotational frame has no impact on the tension in the restraint system. Therefore, a simpler installation algorithm of tightening and then adjusting the angle is sufficient. It is preferable to design the LATCH restraints and supporting hardware in such a way as to direct forces both down towards the seat cushion and back toward the seat back.

The threshold values for angle ($\theta$) and belt tension ($F_T$) are based on the recommended NHTSA CRS installation criteria or the recommendation of other scientific boards. For example, NHTSA recommends that the tension in each LATCH belt be 53.5-67 N (12-15 lbf). A controller implemented with a microcontroller may be reprogrammable and thus updateable when the criteria are updated. In addition, the algorithm can be updated by the user based on the user's experience with the CRS. The controller may also be configured to store usage data, with the ability to download and analyze data offline by the manufacturer.

Another common CRS installation failure is when users incorrectly twist the LATCH restraint's webbing while fastening them to the tethers. When the CRS controller detects this state, it can warn the user and prevent installation. One option for detecting that the restraint is twisted is to embed wires in the webbing fabric such as piezo-elements. Because of the cost and complexity of this solution, the preferred embodiment is a combination of mechanical guides that inhibit twisting of the LATCH restraint's webbing and sensors that determine when the LATCH restraints are oriented correctly into the attachment anchor points of the vehicle.

It is further envisioned that the CRS control system be able to determine whether a child is present in the seat. Sensors capable of detecting the child include one or more of a weight sensor in the infant carrier, a sensor for determining whether the harness is buckled, or a heat sensor, visual sensor, or strain gauge, for directly measuring the child. Accordingly, every time the system detects that a child is in the seat, the interface could provide feedback to the caregiver on the readiness and safety of the CRS. Such feedback may include, but is not limited, to confirmation that the seat is at the proper level, that the vehicle based restraint system is at the proper tension, that the infant carrier handle is at the correct position, that the LATCH restraints are not twisted, that the child restraints are at the proper tension, or that the child restraints are at the proper height. If any input is deemed unsafe by the system, the system can alert the caregiver or optionally make adjustments. Additionally the control system may provide feedback on the conditions of the vehicle such as the temperature, and optionally alert if the conditions are deemed unsafe. This process may occur on a rear-facing infant carrier whenever it is detected that the infant carrier has been connected to the base.

It is important that this check be conducted every time a child is placed in the seat since even conditions that were checked during the installation process may change over time. For example, it is very common for a CRS that is installed with the passenger seat belt system to become accidentally detached when the seat belt is unbuckled. The automatic CRS can be configured with a seat belt tension sensor located on the CRS base to warn the user when the seat belt is unbuckled. When installed correctly, the seat belt passes over the seat belt tension sensor and exerts force against the CRS base. When the belt is too loose or unbuckled entirely the tension against the CRS base is decreased. In this case, the CRS warns the user that the CRS is unsafe for use and must be installed again. The arrangement of the seat belt tension sensor is similar to the arrangement of automatic tensioning mechanisms as depicted in FIG. 9.

Another common problem is that the hysteresis of the vehicle seat foam changes over time causing the tension in the LATCH straps and the angle of the CRS to change as well. In this case, the CRS controller could either alert the user or engage one or more of the tension or leveling drive systems to fix the issue.

When the check is conducted when a child is detected, the CRS control system can make recommendations to the user based on metadata, namely predefined rules. For example, if the child is detected to be below a certain weight or certain height, the system can recommend that the seat be installed in a rear-facing orientation. If the total weight exceeds the recommended weight limit for LATCH, the CRS controller can recommend using the vehicle seat belt. If the current date exceeds the expiration date programmed at the factory, a warning can be issued. If the system has detected forces consistent with a crash that may have damaged the CRS, the caregiver can be alerted so that the child is not put in an unsafe seat.

The CRS interface may gather information on the height and weight of the child present. Optical sensors or contact sensors at varying heights can determine the height of a child's shoulders, which can be used to convey feedback to the caregiver on the proper use of the CRS. Optionally, the height of the restraints can be adjusted automatically or by the caregiver with the assistance of a motorized mechanism. Since the recommended height of the system depends not only on the height of the child, but the orientation of the CRS, the CRS can be equipped with sensors including, but not limited to, one or more pressure sensors in the base or an accelerometer to determine whether it is installed forward facing or rear-facing.

Interactive Installation Interface

In some embodiments, the car seat may include at least one interactive user interface 90 (shown in FIGS. 2A and 2B) for guiding a user through the installation process. The user interface may provide instructions to the user through an electronic display or monitor, such as an onboard video display, and may be interactive with the user. The interactive installation interface may use buttons, a touch screen, audio system, or other peripheral accessories for interacting with the user. Instructions may also be provided using a separate electronic accessory, such as a stand-alone video display, audio system, or tactile/haptic device. The electronic accessory may be connected to the CRS 10 via a wired or wireless data connection interface. Alternatively, instructions may be provided from the CRS 10 to a remote electronic device positioned a distance away from the CRS. The remote electronic device may be a dedicated electronic device or a multi-purpose electronic device, such as a personal digital assistant (PDA), smart phone, computer, laptop, or tabletPC. In some embodiments, the remote electronic device and CRS 10 may be elements of a wireless Person Area Network (PAN), Local Area Network (LAN), Wide Area Network (WAN), or the Internet and configured to send data to one another through the network. Data may be transmitted using a wireless communications interface that uses one or more known wireless data transmission protocols including but not limited to cellular, 802.11, Universal Mobile Telecommunications System (UMTS), IEEE 802.11 (Wi-Fi), 802.16 (WiMAX), ultra wideband (UWB), infrared (IR) protocols, Bluetooth™ protocols, and/or wireless universal serial bus (USB) protocols. The CRS 10 may also interact with onboard wireless systems on the vehicle such as heads up display modules or OnStar.

As discussed above, the CRS 10 includes a controller 116a and associated electronics. The CRS controller 116a implements a control algorithm that receives inputs from the sensors and determines if the belts have been appropriately connected and tightened, if the CRS 10 to seat base 12a connection has been made, and if the CRS 10 has been leveled correctly. The information received from the sensors is used to ensure that installation activities are performed in the correct order and at the correct time. The information from the sensors may also be used to determine when is the most appropriate time to display a particular installation instruction to a user and to determine when the user has completed certain required installation tasks.

For example, a routine for installing the CRS to a vehicle seat may include one or more of the following steps. First, the user wakes up the installation system by an activation activity such as pressing a button. Once woken up, the system determines whether it is already installed to the vehicle seat based on data from the sensors. If the CRS is not installed, the system asks the user whether it should begin the installation process, and the user may respond by an affirmation activity, such as pressing a button or making a verbal assertion. The system then shows the user a video of how to attach the restraint belts to the vehicle seat. In certain embodiments, the instruction video can continually loop until the user completes the requested activity (e.g. attaching the belts to the LATCH system). If the belts are not attached within a predetermined amount of time, the system may inquire whether the user needs additional help. Additional help could be provided, such as displaying a more detailed video of the installation activity to be performed.

Once the belts are attached, the CRS uses data from the sensors to determine whether the next installation step must be performed. For example, the sensors may be used to determine whether the tensioning system should be engaged to increase tension on the belts. During tensioning, the interactive interface may display a video or icon showing that installation is ongoing. The CRS may then determine whether the CRS is leveled correctly and, if necessary, activate the leveling system. At the same time, the interactive interface may show an explanation that the system is now leveling the seat base. This cycle of sensing whether a step should be performed, performing the step, and alerting the user via the user interface continues for all steps in the installation process. Once the installation process is complete, the interactive interface shows a final instruction video confirming that installation is completed and describing that the sensors will continue to monitor the CRS to ensure safety even after installation is complete. Such an end of installation confirmation video is provided to inspire confidence in users concerning the safety of the CRS.

Figure 44A:
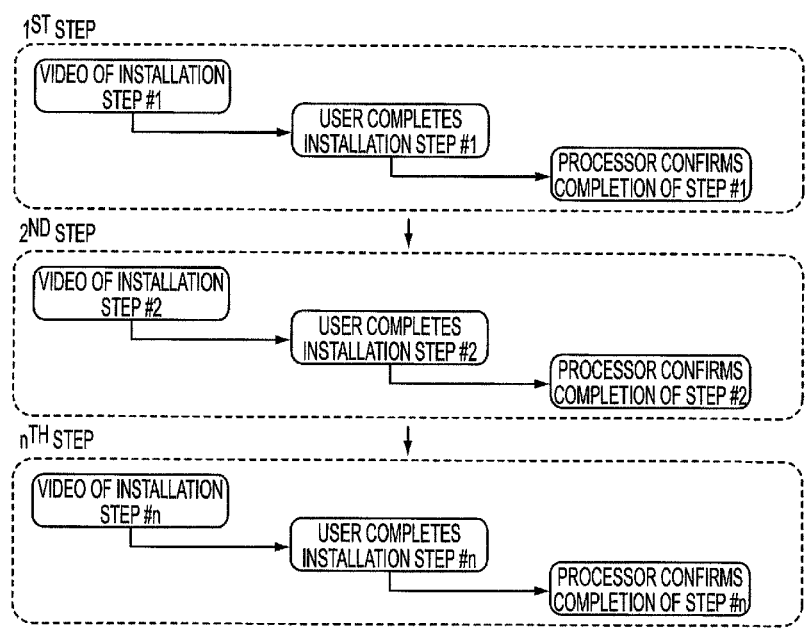
FIG. 44A is a flow chart of a video installation process for a child car seat, according to the principles of the invention.

With reference to FIG. 44A, a schematic diagram showing the installation process and accompanying visual display are depicted. As shown in the diagram, for each installation activity, an installation video telling a user what must be performed is displayed. The user completes the installation step based on the displayed instructions. Once the installation activity is completed, the sensors of the system are used to ensure that the installation activity was performed correctly. If so, then the visual display shows a video for the next installation activity, and the process is repeated. The installation process may also include a manual component. For example, a user may manually advance to the next instruction video by performing an action, such as pressing a button or tapping a portion of a touch screen.

In addition, augmented sensing and response can add additional preparation and safety for an impending crash, where the CRS can proactively respond in a manner to further improve such safety measures. Such measures can include notification from the seat, the vehicle itself, or a communications device, such as a smartphone, or similar device external to the CRS to warn of an impending event. Sensing can include, but is not limited to, car devices that provide information on impending collisions or safety situations through sensing modalities including but not limited to laser radar (Lidar), radar, ultrasonic, computer vision, deceleration, and infrared proximity sensing. The relative velocity between the vehicle with the car seat and another object or objects such as a building, another vehicle, people or animals can be used to trigger a reactive mode in which the car seat can further protect itself through tensioning, rotating and/or moving the seat, actuated mechanisms or shields, an air bag, or other safety devices. Furthermore, if such remote sensing devices as described are not used, then sensors in the car itself, such as in the crumple zone in the front, back or sides of the car, may also be used to trigger such defensive mechanisms. In both cases, reaction times in the few tens or hundreds of milliseconds can provide sufficient time to deploy such safety mechanisms.

Further, local communication devices, such as sensors already in smartphones, may be used to identify safety events and can also be in communication with the CRS and be used to help identify and react to such events. A smartphone using Bluetooth, WiFi, or other communication means can be used to connect and transmit and receive information about the car seat. To avoid false information such as a dropped phone, the software can analyze information to ascertain high speed motion in a vehicle or motion relative to a vehicle before taking or initiating action. In addition, this information can be used to relay such information from the car seat to the smartphone. This may include such information on temperature in the vehicle to provide an alarm about an occupied seat in a high temperature environment. The CRS can also provide a "find me" locating feature in the event of a missing child and seat through communication means such as a cell network, WiFi, or other wireless means. This could be used to locate the seat or the vehicle and perhaps, the child.

In the event of an emergency, a CRS may provide additional tensioning, adjust angle of the seat to minimize impact forces based on relative geometry of vehicle and crash angle, mechanically deploy safety shields or air bags for further protection. (or similar energy absorbing features), send a signal to fire and rescue to 911 or other designated agency (either through the CRS itself or via the car or phone) that may include location, activate motions to help absorb and react to energy from an impact situation, and provide a 'black box' capability in addition to the vehicle information to assist rescue and medical personnel to better understand and diagnose the situation. For example, understanding if there was a concussion risk. This sensed information can also later be used to recreate and accurately simulate events for further analysis of the impact or other event.

Battery/Power Management

Figure 16:
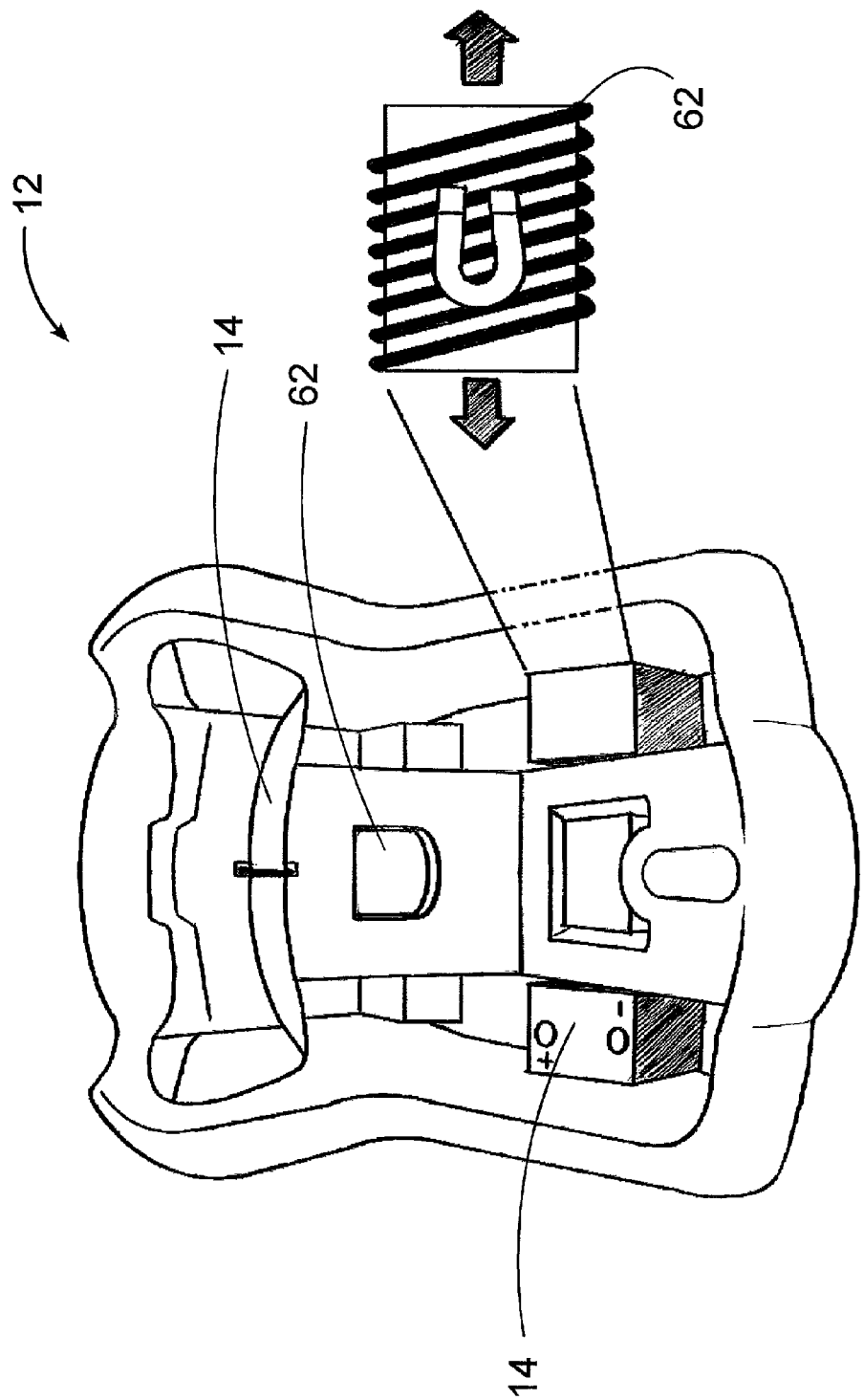
FIG. 16 is a perspective view of the carrier base of FIG. 2 with a battery and a self-generating power mechanism exposed.

One challenge in designing a commercially viable seat with electronics is reducing the burden on the caregiver of maintaining a sufficient battery level. The power providing elements of the CRS are depicted in FIG. 16. In the simplest configuration, the CRS includes a battery 98 for providing power to the motors and plurality of sensors. The battery 98 is located in the interior of the carrier base 12. The battery may be removable from the base and rechargeable. In addition, the CRS could be configured to receive power from the vehicle's power outlet (e.g., a cigarette lighter outlet). In that case, the CRS base would include a socket for receiving the power adapter. Power from the adapter could power the CRS during installation or recharge the battery. According to the embodiment of the CRS depicted in FIG. 16, the CRS base further comprises a self-generating power production mechanism 96 connected to the battery 98 and plurality of CRS sensors. Since the CRS is mounted on a mobile platform (e.g., a motor vehicle), the power production mechanism is subject to forces as the vehicle is driven around. A linear generator is a very simple option for generating electric energy from the motion of the vehicle. A magnet internal to the CRS base can pass through a coil which will generate electricity that can be stored in a battery. Alternatively, other known mechanisms for generating power, such as a pendulum or piezoelectric element, could be used.

The CRS may be configured with a two level system for power consumption. One system is used only for monitoring the system parameters and controlling the user interface. This system is designed to be very low power. The second power system is used to drive the motors in the installation process and, therefore, uses higher amounts of energy. The power source for the first system is preferred to be a battery. The power supply for the second system may be a separate battery or may be an input from the vehicle's power jack. This secondary or backup system guarantees that power is preserved for the user interface.

Figure 44B:
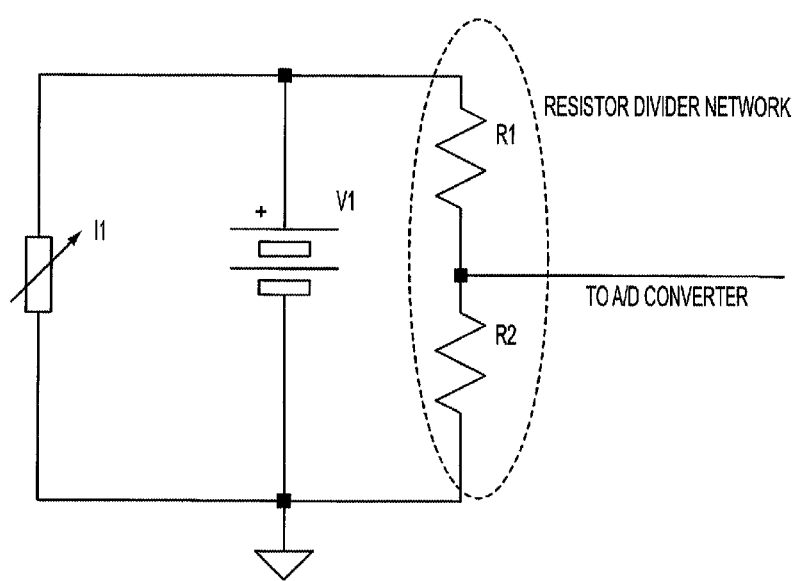
FIG. 44B is a schematic drawing of a circuit for use in a battery monitoring system, according to the principles of the present invention.
Figure 45:
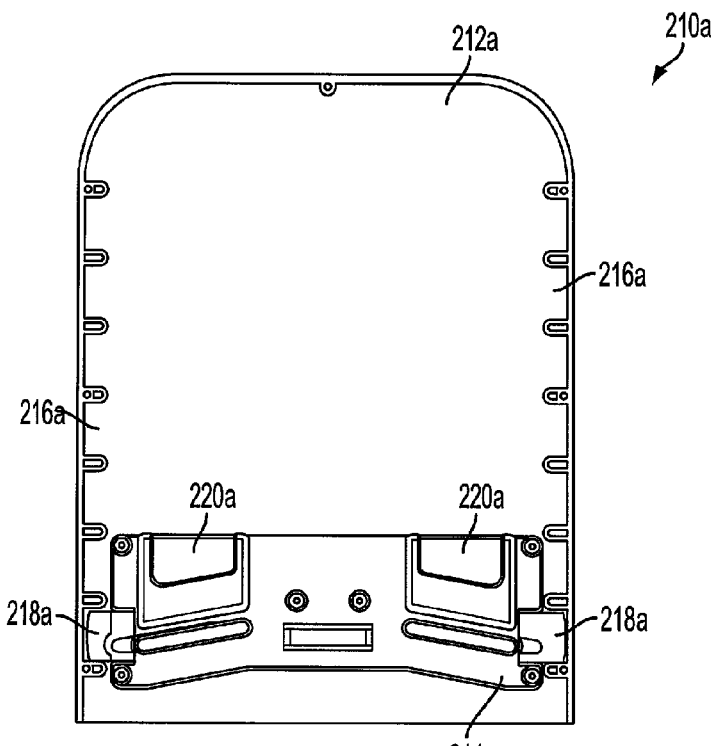
FIG. 45 is a schematic drawing of a harness adjust assembly for use with a child carrier, according to the principles of the invention.
Figure 46:
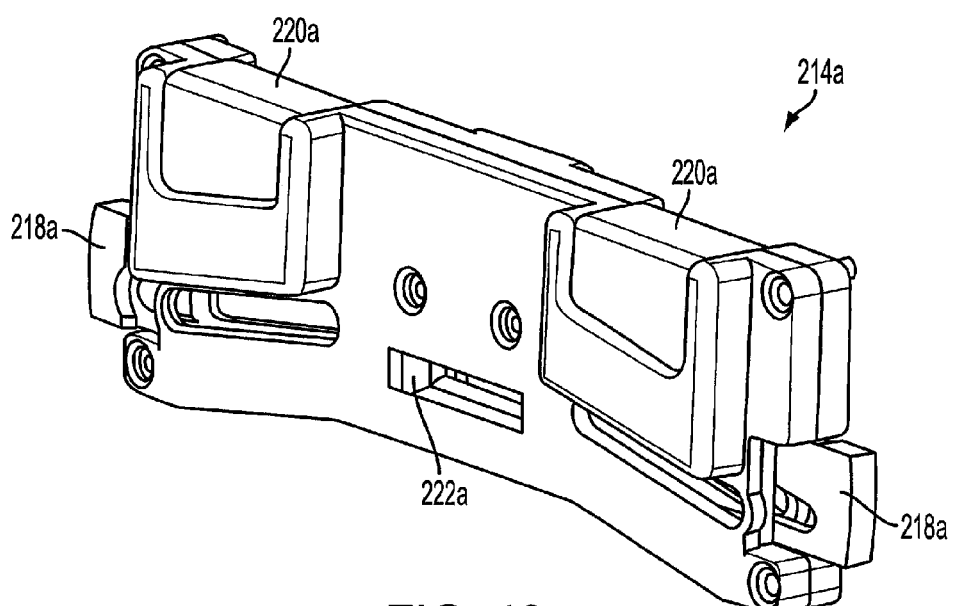
FIG. 46 is a front perspective view of a slider assembly of the harness adjust assembly of FIG. 45.
Figure 47:
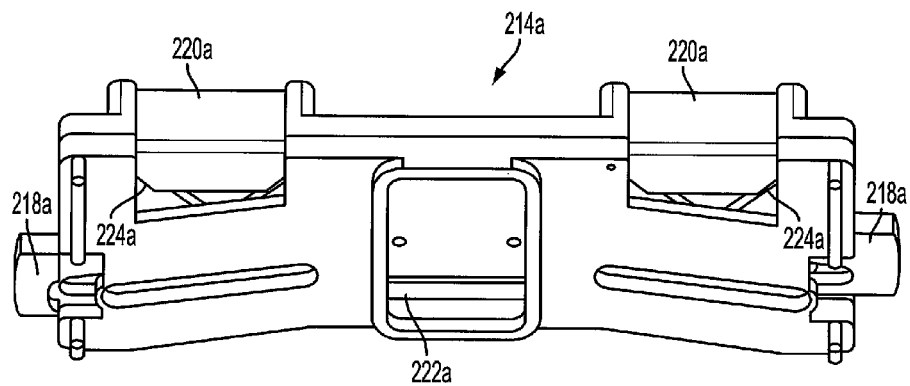
FIG. 47 is a rearward directed perspective view of the slider assembly of FIG. 46.

In one embodiment, a battery monitoring system detects battery level and provides feedback through the user interface to prevent unexpected battery failure. In the event of low power, the system alerts the processor and prevents re-installation of the unit to avert a safety risk. Battery level measurement can be accomplished in several ways. For example, internal battery resistance may be monitored to achieve an accurate prediction of battery life. If the battery cell's internal resistance increases above a baseline value, it can be inferred that the battery is near failure. More specifically, with reference to FIG. 44B, the battery level management system includes a resistance divider network coupled to an A/D converter. A schematic drawing of a circuit for the battery monitoring system is depicted in FIG. 44B. Alternatively, simpler systems that rely on monitoring battery voltage alone may also be used within the scope of the present invention.

Alternative User Interfaces

Figure 17:
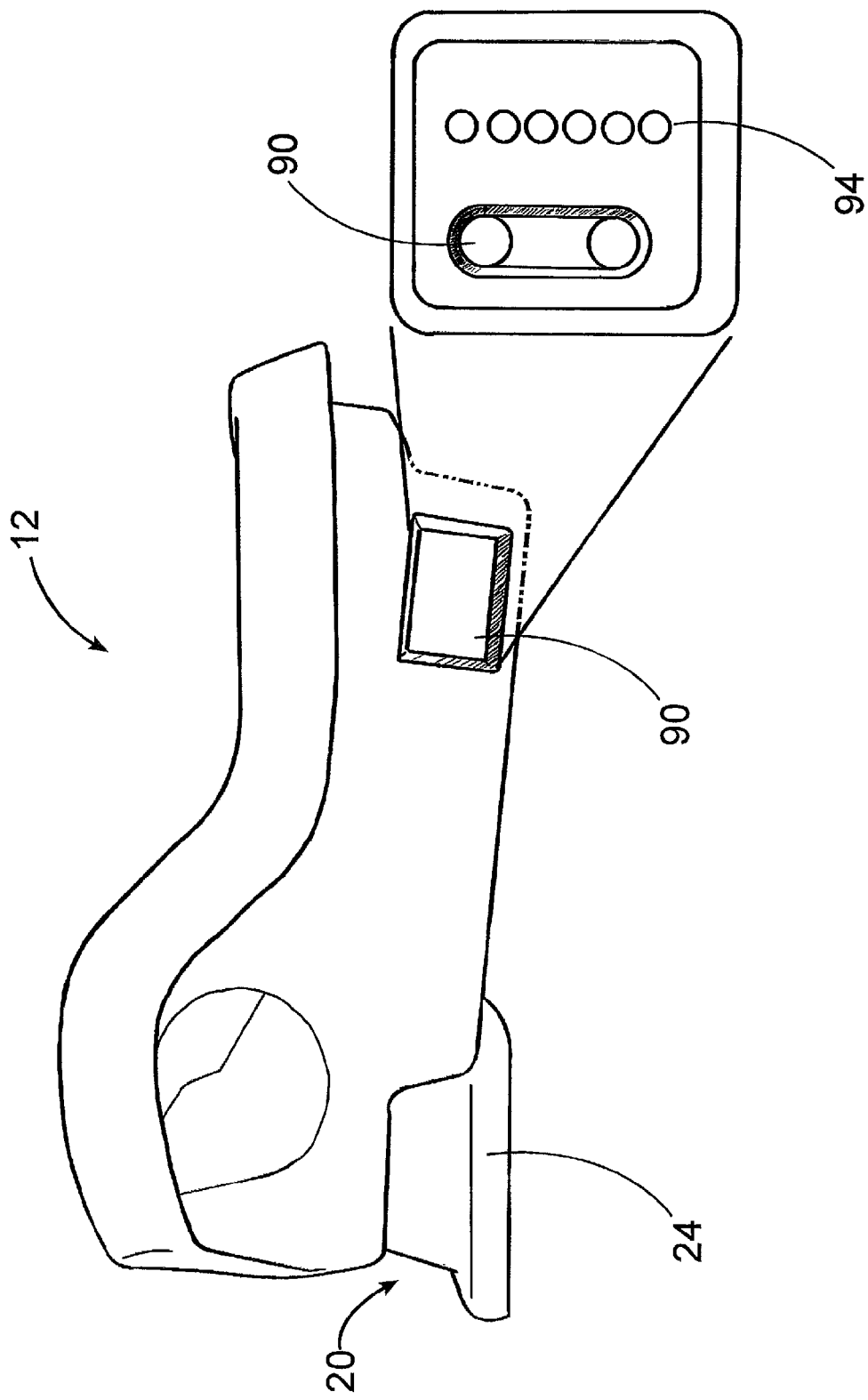
FIG. 17 is a side view of the carrier base of FIG. 2 with a control center of a user interface shown in an enlarged manner.

In other embodiments, the CRS controller includes a user interface to receive user input to trigger the setup and installation procedures. As depicted in FIG. 17, the user interface components are assembled in a discrete package, representing a "control center." The control center 90 is located on the side of the infant carrier base 12. According to one embodiment, the user interface is a visual display including installation control buttons 92 for activating and directing the installation process. Optionally, the interface also includes a keypad, touch screen, voice recognition, remote control, or other inputs. The other inputs allow a user to enter metadata about the child to tailor installation for the characteristics of the specific child (e.g., height, weight, age). The CRS controller may interface, either through a wired connection or wirelessly, with mobile media devices (such as smartphones, laptops, tablet PCs, etc.) for control and feedback.

One unique feature of the CRS system is the ability to continually monitor the CRS and to provide information regarding the safety of the CRS to the user in real time. To accomplish this purpose, the control center 90 further includes safety indicators 94. The indicators provide feedback to the user as to the state of the CRS installation and general safety of the CRS. This data is relayed to the CRS controller and control center from the plurality of sensors located throughout the CRS. The information relayed may include confirmation that connectors are correctly locked to the LATCH system on the vehicle seat, information about the tension on the belt, CRS leveling, and/or conformation that the carrier is correctly attached to the base. According to one embodiment, the feedback is visual, having any form of LEDs. User interface components may also be distributed throughout the CRS at strategic locations (i.e., LEDs indicating proper belt latching placed nearby the latching locations). Alternative feedback indicators include an LCD display, or audible and/or tactile feedback devices.

The CRS controller may also direct reinstallation of the CRS base if monitoring sensors indicate that the installation is no longer correct (e.g., the base is no longer level or the belts have loosened). According to a monitoring and reinstallation algorithm, data is obtained from the level sensor. If the CRS is not level, the elevation of the foot and the tension of the belt are adjusted according to the iterative process described above.

In addition to the control center, the CRS controller may optionally communicate to a user through a wired connection or wirelessly with the vehicle's on board computer in order to integrate the data from the user interface into the vehicle control system or provide it to an external system such as OnStar.

Figure 18:
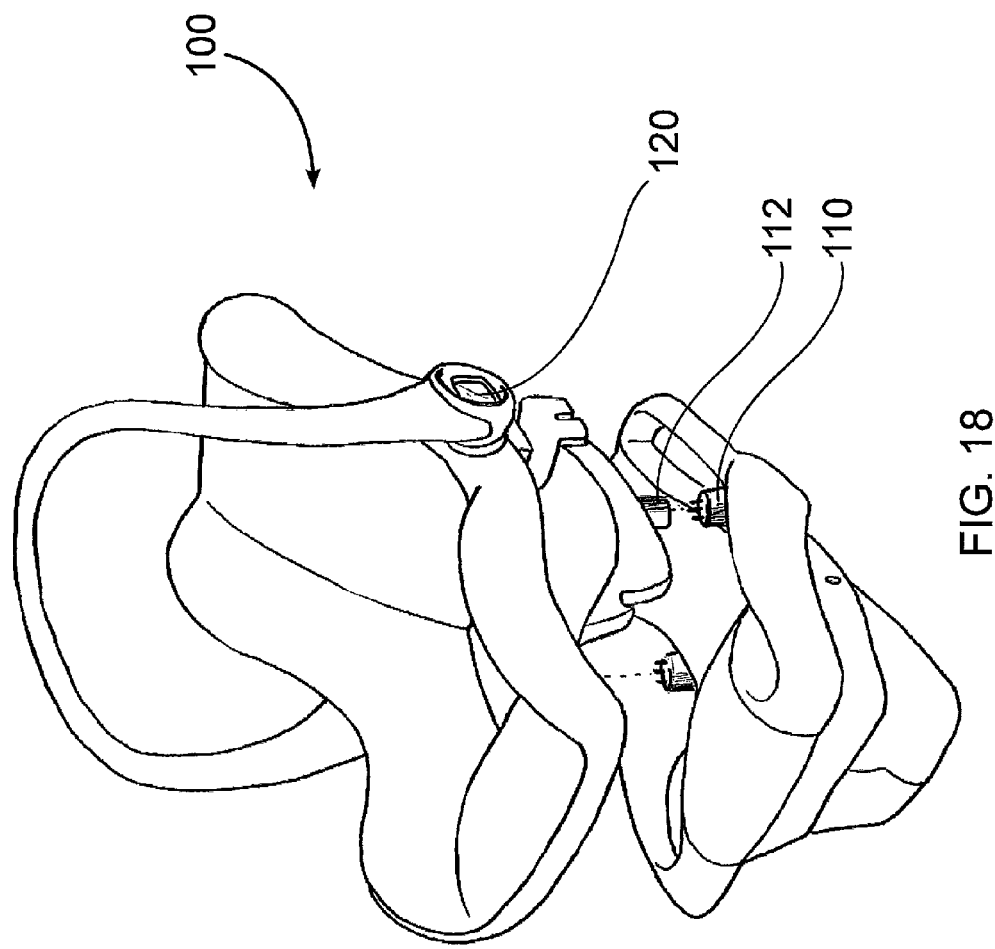
FIG. 18 is a perspective view of the base and carrier according to the present invention with a power connection socket for transferring power and data between the base and carrier.

According to another embodiment of the CRS control center, the control center is situated on the removable infant carrier rather than on the base for increased convenience for the user. In this case, power and communication may be passed from the base to the carrier by means of a common blind mate connector such as a fork and blade connector or set of contact plates. With such a connection, information on the position of the carrier handlebar can be sensed and included in the interface so that the user can be warned if it is not in the manufacturer's recommended use position or transmitted down to the base for additional processing by the control system there. One embodiment of the power connection is depicted in FIG. 18.

Child Receiving Portion/Infant Carrier

Figure 19:
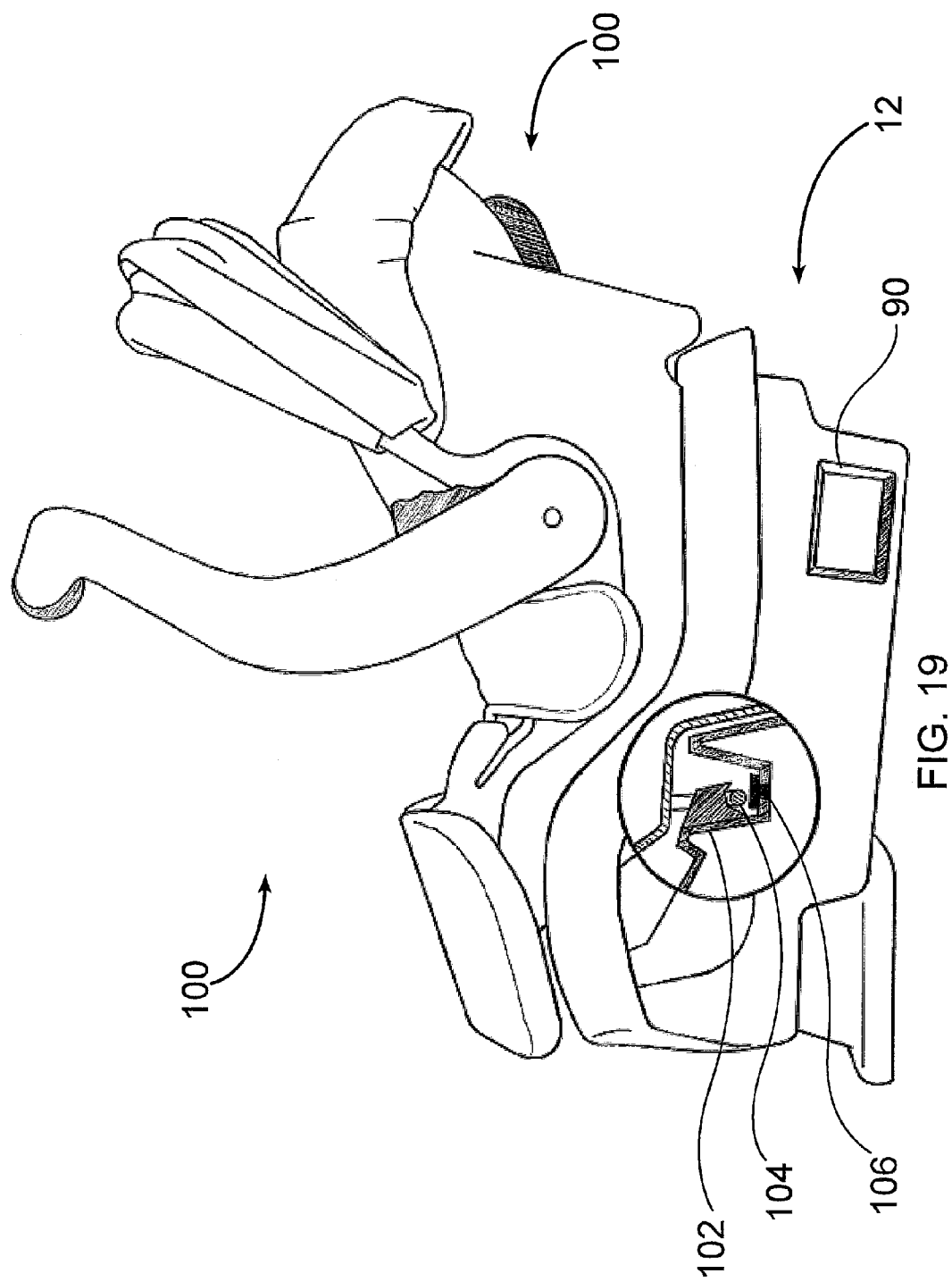
FIG. 19 is a side view of the carrier base of FIG. 2 connected to an infant carrier with an enlarged view of the latch mechanism for connecting the base to the carrier.
Figure 20:
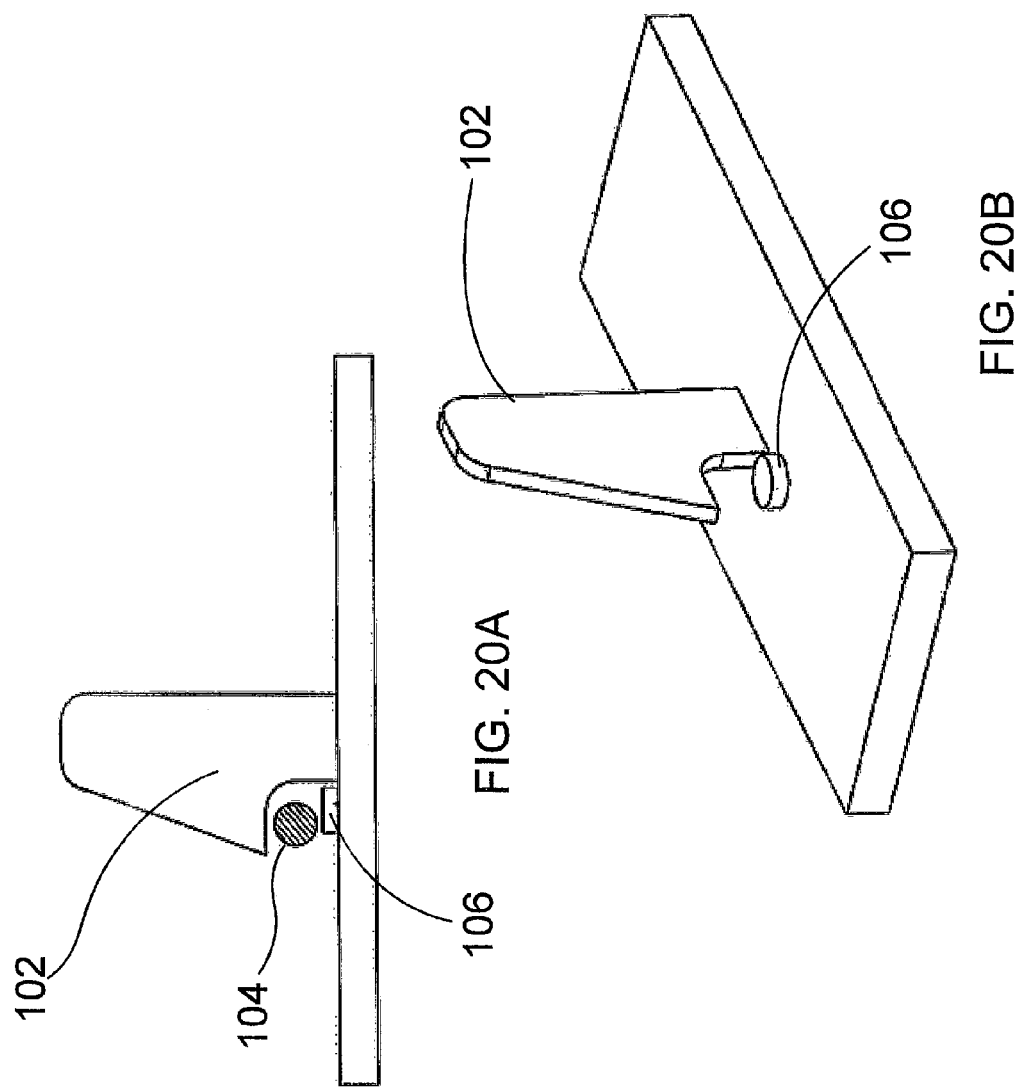
FIGS. 20A and 20B provide side and perspective views, respectively, illustrating the sensor configuration for connecting the CRS to a base in accordance with the present invention.

The CRS further comprises the infant carrier adapted to connect to the carrier base. FIGS. 19, 20A, and 20B are schematic drawings of the latching mechanism for connecting the carrier 100 to the base 12. The latching mechanism comprises a base connector tooth 102 on the base 12 adapted to surround and hold a bar 104 of the carrier 100. FIG. 19 is a schematic drawing of the carrier attached to the base with a partial section view of the latching mechanism. FIGS. 20A and 20B are schematic drawings of the latching mechanism detached from the carrier and base. As shown in each figure, the latch further comprises a metal detector sensor 106 for identifying the presence of the bar from the CRS connector. Based on data from the latch sensor, the control center 90 alerts the user when the carrier 100 and base 12 are correctly connected together. Optionally, the carrier and base are also connected by a power connection. As shown in FIG. 18, the base 12 includes a power socket 110 which connects to a power connector 112 on the infant carrier 100. The connection provides power to sensors and allows data from sensors located on the carrier to pass to the CRS controller and user interface. In the embodiment of the CRS depicted in FIG. 18, the control center 120 is located on the carrier 100.

Figure 21:
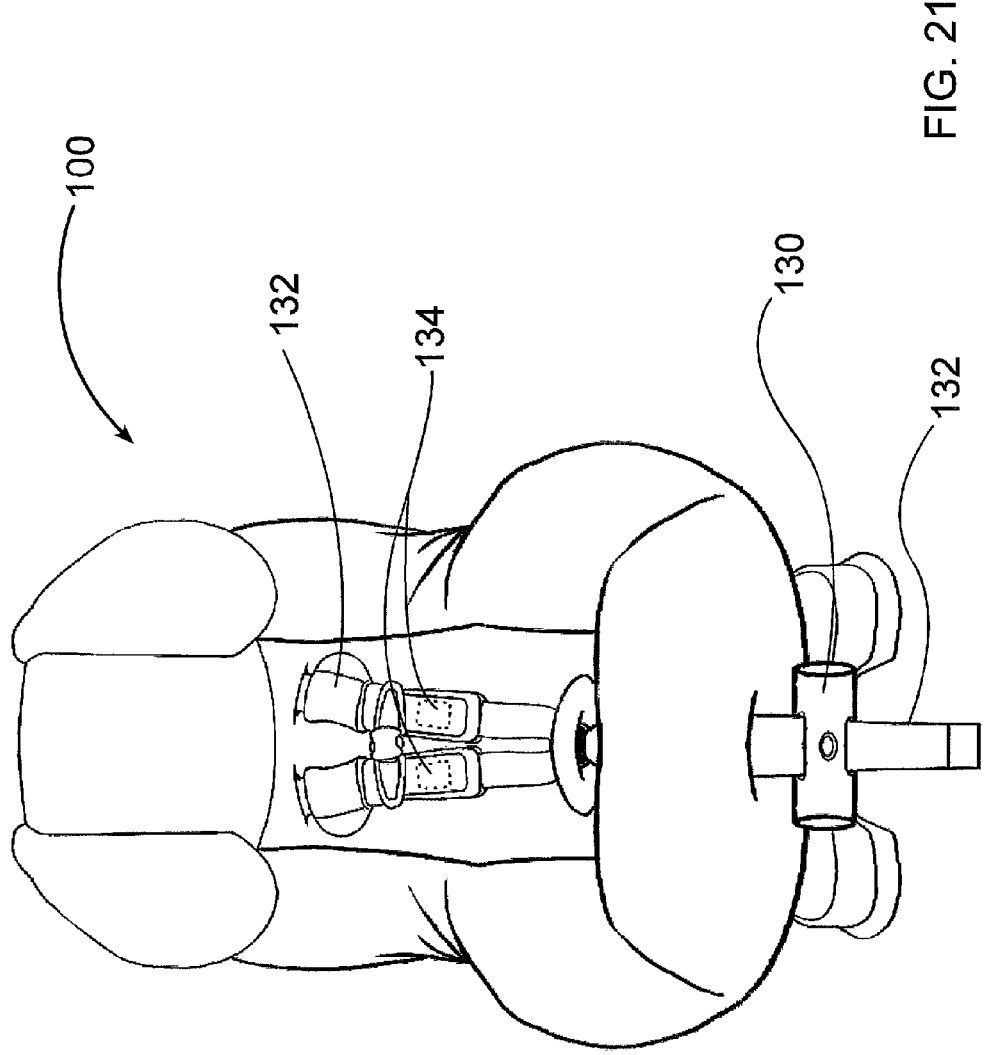
FIG. 21 is a front view of an infant carrier according to the present invention with a motorized mechanism to tighten/loosen a harness and harness tension sensors.

With reference to FIG. 21, another accessory optionally included in the CRS is a restraint accessory comprising a motorized tensioner 130 for the infant harness 132. Harness webbing 132 is wound through a motorized tensioner 130 mechanism to tighten or loosen the harness 132. The harness 132 secures a child within the infant carrier 100. Included on the harness are harness tension sensors 134 to measure the tension against the child. Sensors which can be used for this purpose include strain gauges, pressure gauges, or other types of mechanical sensors.

Figure 22:
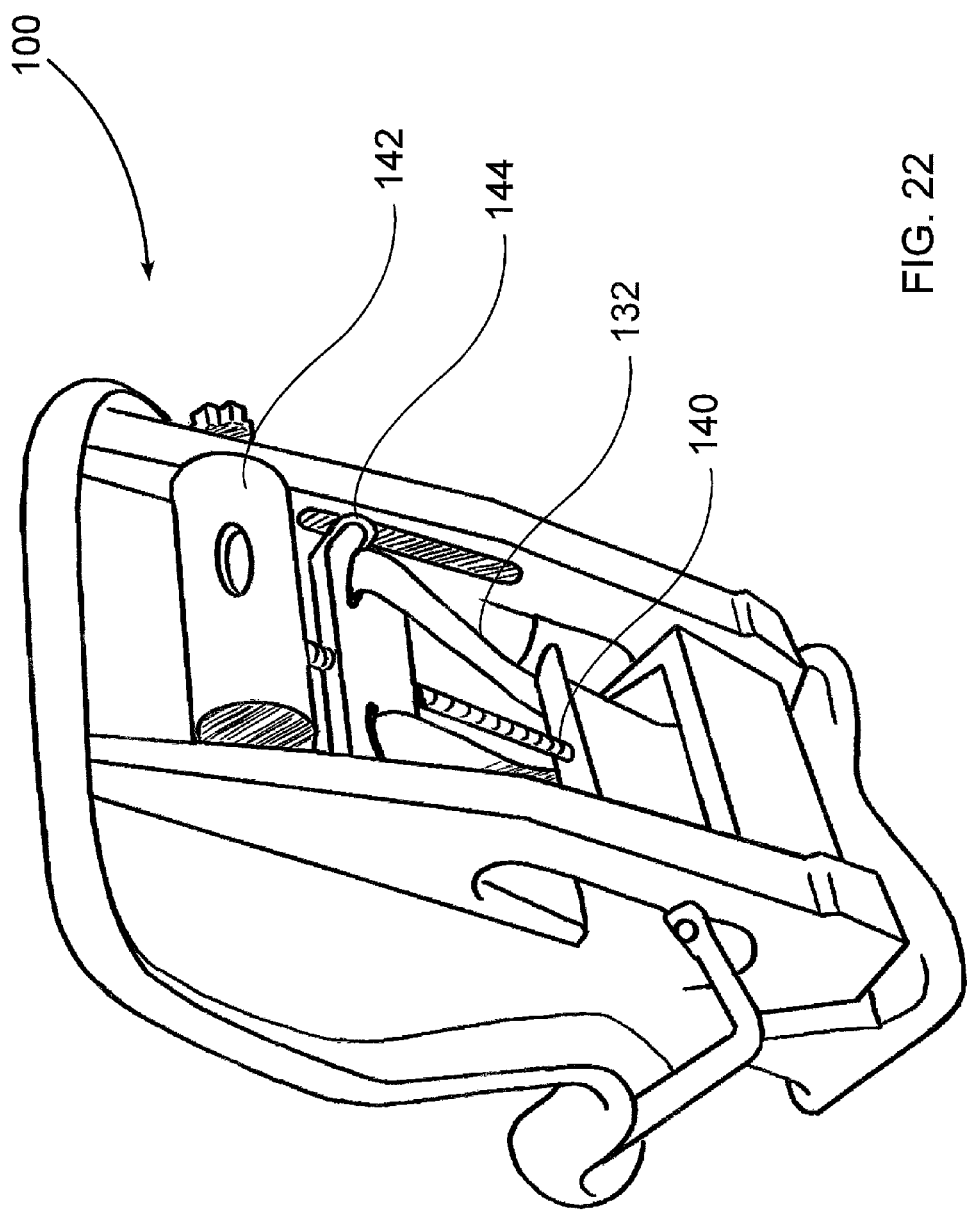
FIG. 22 is a perspective view of the back portion of the carrier of FIG. 21 with a motor mechanism for adjusting the height of a harness.

Another feature optionally included with the infant carrier is an automated height adjustment mechanism. FIG. 22 is a schematic drawing of the back of the infant carrier 100 with a height adjustment mechanism for adjusting the height of the harness 132 based on the size of the child. The carrier comprises a harness height adjust screw 140 attached to a motor mechanism 142 for height adjustment. The harness 132 is wound through the harness guide attached to the screw 140, which is coupled to the motor mechanism 142. The screw 140 is used to adjust the height of the harness by raising or lowering the harness guide and harness 132. A sensor 144 for determining the correct harness position for the child is included on the carrier 100 to measure the height of the child and to determine the correct level for the harness based on that measurement.

With reference to FIGS. 45-49, an adjustable harness 210a for the child receiving portion 2a of the CRS 10 is depicted. The adjustable harness 210a allows the child receiving portion 2a to be easily adjusted for use with different sized children or infants. For example, the adjustable harness 210a is configured to be easily adjustable with only one hand. The one handed front adjust mechanism enables the user to change the harness 210a height quickly and easily from either side of the child receiving portion 2a.

The child receiving portion 2a with a one-handed adjust mechanism includes an indexing plate 212a and a slider assembly 214a. The indexing plate 212a is included in the inner portion of the child receiving portion 2a, below any padding and aesthetic decorations. The indexing plate 212a is rigidly attached to the infant carrier and has channels 216a for receiving tabs 218a extending from the slider assembly 214a. The slider assembly 214a is constrained to uniaxial motion by the indexing plate 212a and a back panel of the child receiving portion 2a.

Figure 48:
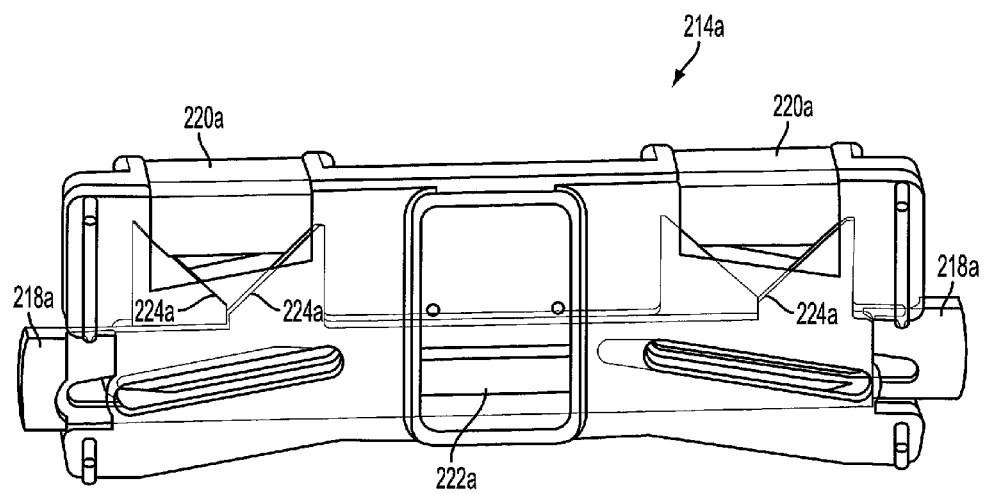
FIG. 48 is a rearward directed perspective view of the slider assembly of FIG. 46, with internal components of the assembly depicted in phantom.
Figure 49:
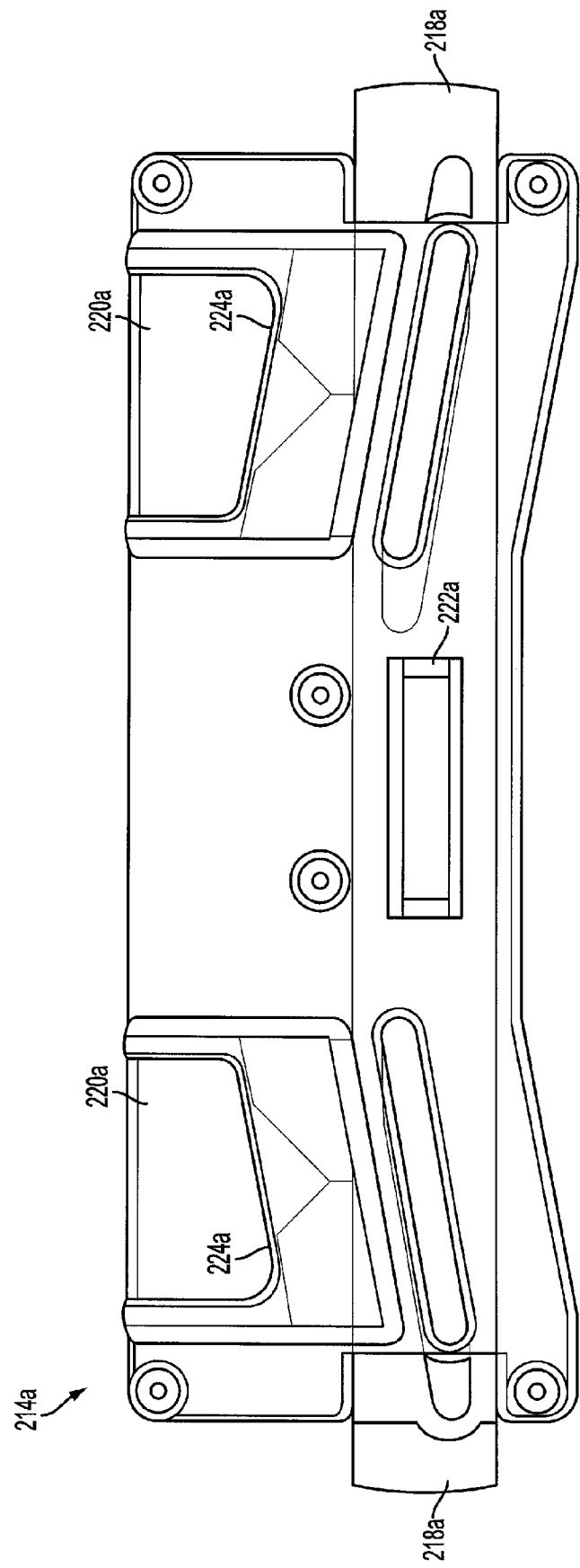
FIG. 49 is a cross sectional view of the slider assembly of FIG. 46.

In use, depressing either of the index release buttons 220a located on the upper edge of the slider assembly 214a causes the lower portion of the button to contact a bearing surface 224a of a slideable bearing. The contact with the bearing surface 224a retracts the indexing tabs 218a extending from both sides of the slider assembly 214a. When the indexing tabs 218a are retracted, the slider assembly 214a is permitted to move in an upward or downward direction relative to the index plate 212a. As is shown in FIGS. 48 and 49, each button 220a bears on both indexing tabs 218a. Additionally, the buttons 220a are linked to depress and release together. Upon release of the either button 220a, a compression spring 222a drives both tabs 218a outward and returns the buttons 220a to their initial raised position. As the tabs 218a extend outward, they are once again received within the indexing channels 216a to lock the slider assembly 214a in place. It is noted that the divisions between the channels 216a and indexing tabs 218a are designed such that the slider assembly 214a cannot stop between index channels 216a. Instead, the slider assembly 214a automatically advances to the nearest channel 216a and the tabs 218a extend outward to be received therein. Thus, the slider assembly 214a always returns to a safe and locked state. The slider assembly 214a does not remain in an unlocked position.

Intelligent Latching Device for Existing CRS

With reference to FIGS. 23 through 28, a variation to the full intelligent and automated CRS system is an intelligent latching device which can be adapted for use with an existing CRS 400. The intelligent restraint system could either replace the existing LATCH connectors included with the child car seat or could be designed to go between the existing CRS LATCH connectors and the vehicle attachment anchor points. In either case, much of the same technology described above still applies. The preferred embodiment for the tensioning drive is a ratchet and pawl system with a manual override for releasing tension on the webbing (see FIG. 14). The system comprises a belt 402 forming a loop for attachment to the CRS 400. A motorized latch and tensioner attachment 404 increases tension on the belt to hold the CRS in place.

More specifically, and with reference to FIGS. 24 through 27, one embodiment of the latch and tensioner attachment 404 includes a spindle 414 turned by a gear train 418 and driven by a motor 420. The motor 420, gear train 418, and spindle 414 are located within the attachment 404 and are encased within a motor/spindle cover 412 and gear train cover 419 respectively. The belt 402 is wound around the spindle 414. Webbing guides 408 located on exterior sides of the motor/spindle cover 412 direct the belt 402 to and from the spindle 414 through slots 410 in the motor/spindle cover 412. The tension on the belt 402 increases as the spindle 414 is wound. The motor 420 may be electrical or of any other suitable type such as hydraulic. A spindle end 416 extends beyond the motor/spindle cover 412 and can be turned manually by a user to adjust the tension of the belt 402.

Figure 23:
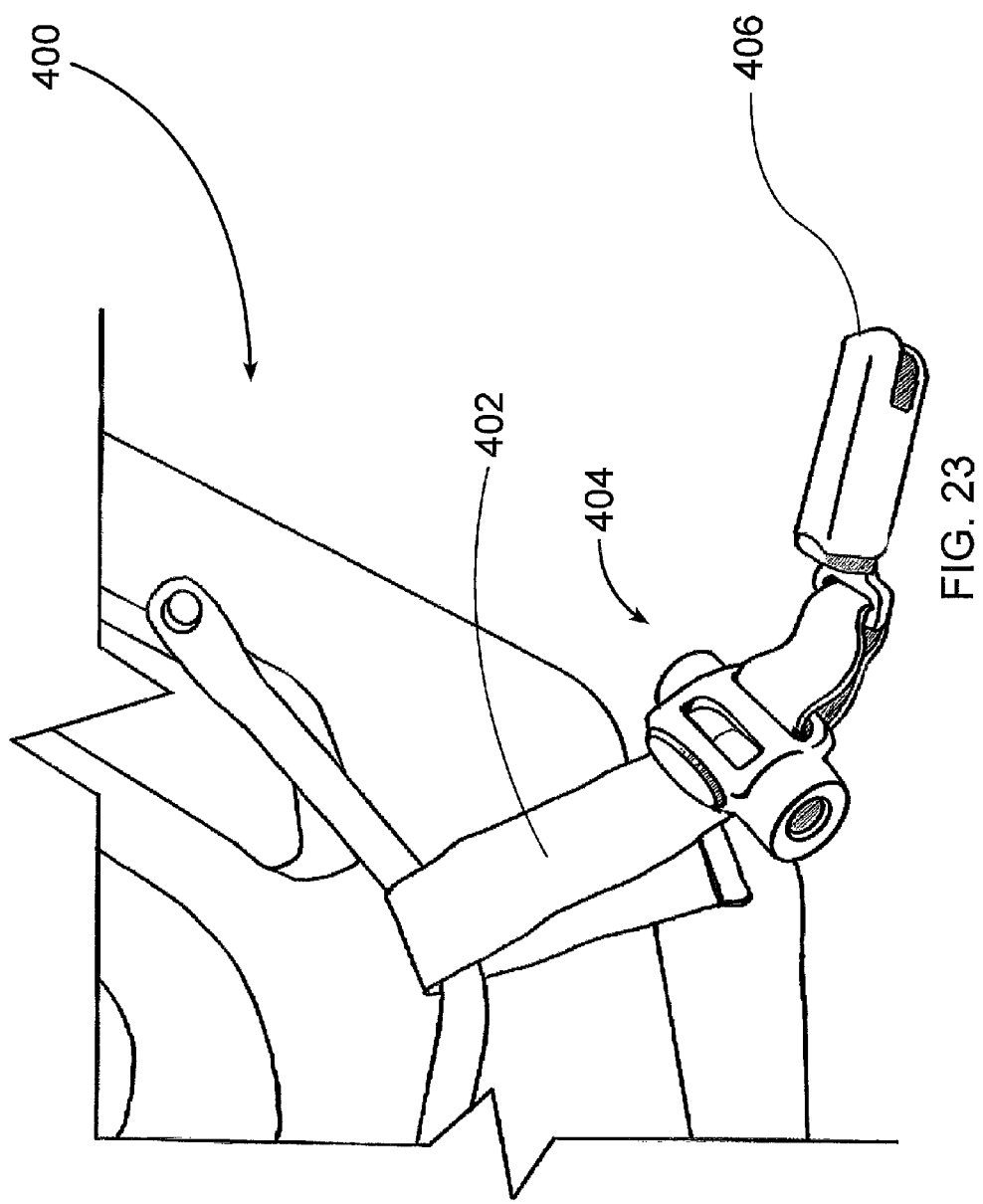
FIG. 23 is a perspective view of an intelligent latching device having a latch and tensioner mechanism and connectors for attachment to a LATCH system.
Figure 27:
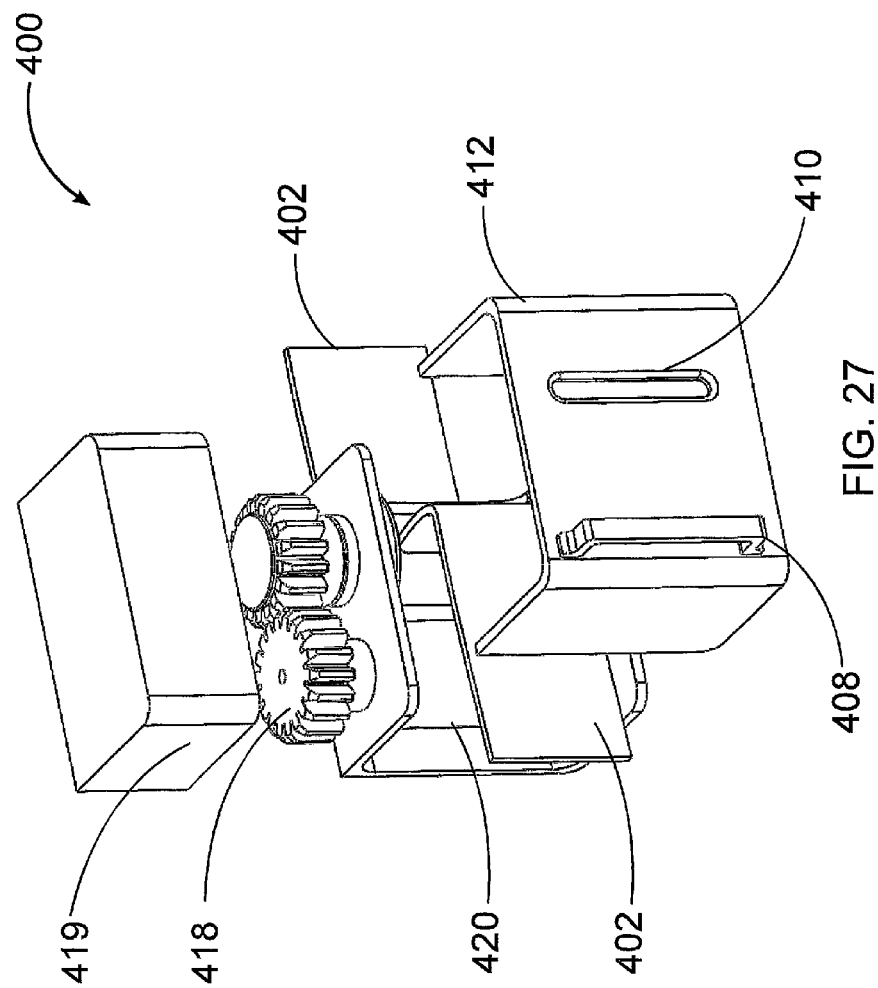
FIG. 27 is an exploded view of the latch and tensioner mechanism of FIG. 23.

As shown in FIG. 23, a connector 406 is connected to the motorized latch and tensioner attachment 404. The connector 406 is adapted for attachment to the CRS LATCH system. Sensors such as strain gauges could determine when connectors located on each side of the CRS are tightened to the correct tension. The left and right sides should preferably be coupled together electronically so that they can be synchronized during the installation process. There may be optionally a user interface to provide feedback including that the latches are engaged with the vehicle anchors, that tension in the belts is correct, battery level, etc. The user interface may also optionally guide the user through the installation process by soliciting metadata and providing audio or visual instructions. As with the power mechanism for the full CRS described above, the latching device could be self-powered by a generator powered by the motion of the vehicle.

Figure 28:
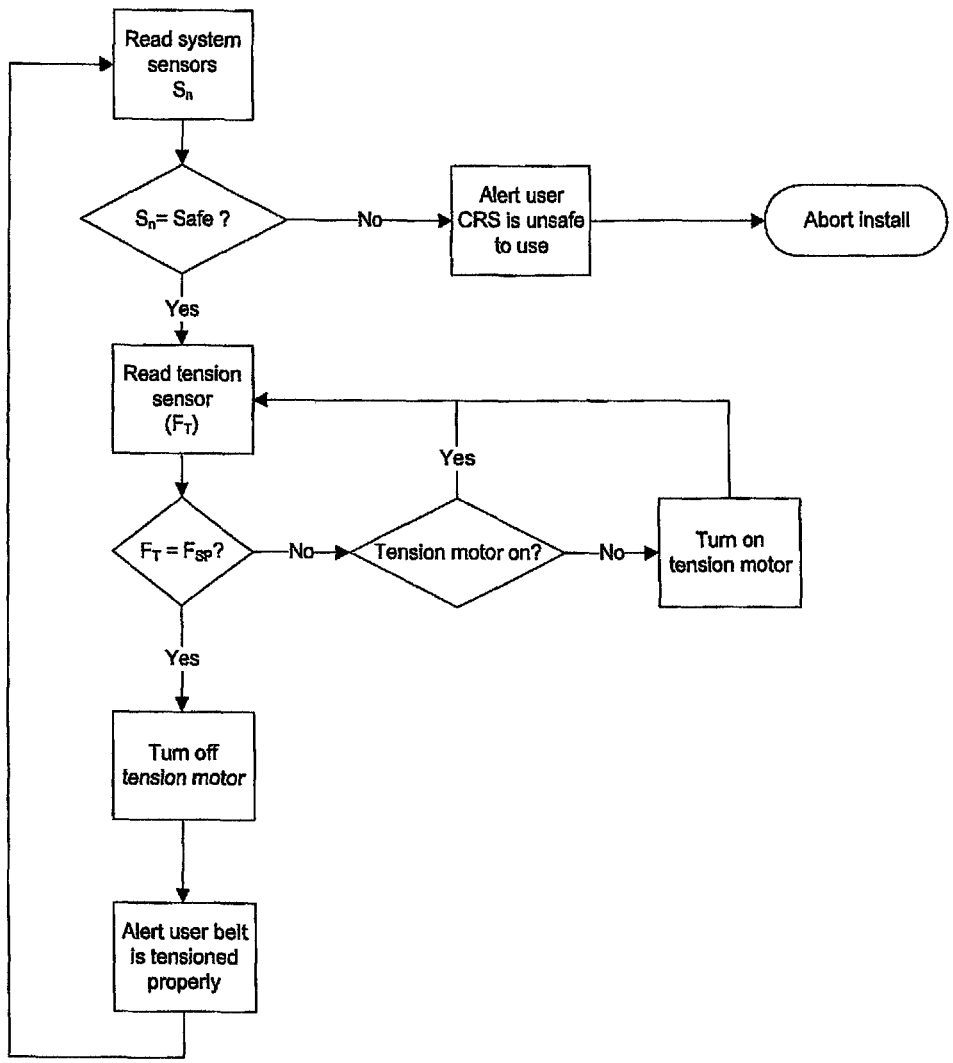
FIG. 28 is a flow chart depicting the process for increasing the tension of a belt for use with the intelligent latching device of FIG. 23.

FIG. 28 is a flow chart depicting the steps followed by the intelligent latching device for increasing the tension of the belt 402. As in other algorithms used with the CRS, data from the plurality of sensors is acquired to determine whether the CRS can be safely installed (e.g., vehicle is within an acceptable range of level, CRS is structurally sound, and connectors are latched to LATCH system or a seat belt). If the CRS is safe ($S_N$=yes) a reading from the tension sensor on the belt is obtained. If the tension ($F_T$) is less than the desired tension ($F_{SP}$) then the tension motor is turned. The motor remains on until $F_T$ is equal to (or within an acceptable range) of $F_{SP}$. At that point, the tension motor is turned off. The user is alerted that the belt tension is correct.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A child seat configured to be secured to a seat of a vehicle comprising:
    a seat base secured to the seat of the vehicle;
    a child receiving portion supported by the seat base;
    a belt tensioning system incorporated into the seat base for receiving at least one belt that couples the seat base to the seat of the vehicle; and
    a controller operatively connected to the belt tensioning system and configured to automatically actuate the belt tensioning system,
    wherein the belt tensioning system is operable in a non-backdriveable state in which belt pay-out is prevented and in a backdriveable state in which belt pay-out is premitted.

2. The child seat of claim 1, wherein the belt tensioning system is configured to drive the belt in a pay-in direction to apply tension to the at least one belt.

3. The child seat of claim 1, wherein the belt tensioning system further comprises at least one drive system, a spindle connected to the belt and rotatable in the pay-in direction or in a payout direction, and a clutch configured to transfer torque generated by the drive system to the spindle to drive the spindle in the pay-in direction.

4. The child seat of claim 3, wherein the at least one drive system comprises one or more electric motors, one or more hydraulic motors, or combinations thereof.

5. The child seat of claim 3, wherein the clutch is configured to transition between an engaged position, in which the clutch is engaged to the spindle allowing the drive system to drive the spindle in the pay-in direction, and a disengaged position, in which the clutch disengages from the spindle, thereby allowing the spindle to rotate free from the drive system in either the pay-in direction or the payout direction.

6. The child seat of claim 5, wherein the belt tensioning system further comprises a clutch motor, the clutch motor being configured to transition the clutch between the engaged position and the disengaged position.

7. The child seat of claim 3, wherein the belt tensioning system further comprises a ratchet and pawl mechanism comprising a pawl configured to selectively engage the spindle to prevent rotation of the spindle in the payout direction.

8. The child seat of claim 7 wherein the belt tensioning system further comprises a manual override mechanism selectively coupled to the pawl that allows a user to manually disengage the pawl from the spindle.

9. The child seat of claim 8, wherein the manual override mechanism comprises an override clutch configured to automatically disengage from the pawl when the child receiving portion is connected to the seat base, thereby preventing the user from manually disengaging the pawl from the spindle with the manual override mechanism when the child receiving portion is connected to the base.

10. The child seat of claim 1, wherein the belt tensioning system comprises a belt retractor configured to apply a preload to the at least one belt prior to application of a full torque of the belt tensioning system.

11. The child seat of claim 1, wherein the child receiving portion comprises a rear-facing infant carrier, a forward facing infant carrier, a forward facing convertible child seat, a rear facing convertible child seat, a combination seat, or a booster seat.

12. The child seat of claim 1, further comprising at least one sensor connected to or associated with the child seat and operatively connected to the controller,
    wherein the controller is configured to process data from the at least one sensor to determine tension of the belt.

13. The child seat of claim 1, wherein the controller is configured to actuate the belt tensioning system to increase tension of the at least one belt if the tension of the at least one belt is determined to be below a threshold value.

14. The child seat of claim 1, wherein the controller is configured to stop the belt tensioning system if the tension of the at least one belt exceeds a threshold value.

15. The child seat of claim 1, further comprising:
    a battery for supplying power to the belt tensioning system and controller; and
    a battery monitor for determining a power level of the battery,
    wherein the battery monitor is configured to prevent the controller from installing the seat base to the seat of the vehicle when the power level is below a predetermined level.

16. The child seat of claim 1, further comprising at least one user interface device.

17. The child seat of claim 16, wherein the controller is configured to provide installation instructions via the user interface device, and wherein the controller selects a specific installation instruction based on feedback from at least one sensor or a user.

18. The child seat of claim 1, further comprising a leveling system comprising an automated drive system incorporated into the child seat for automatically leveling the child receiving portion relative to the seat of the vehicle.

19. The child seat of claim 18, wherein the leveling system further comprises a manual adjustment mechanism separate from the automated drive system, the manual adjustment mechanism being configured to allow a user to level the child receiving portion without actuating the automated drive system.

20. The child seat of claim 18, wherein the leveling system further comprises a telescoping foot extending from the seat base, and wherein the automated drive system is coupled to the telescoping foot and is configured to retract or extend the telescoping foot to adjust the height of the seat base.

21. The child seat of claim 1, wherein the child receiving portion is releasably connected to the seat base.

22. A method for securing a child to a vehicle seat, the method comprising:
 providing a child seat comprising:
  a seat base secured to the seat of the vehicle,
  a child receiving portion supported by the seat base,
  at least one sensor,
  a belt tensioning system incorporated into the seat base for receiving at least one belt that couples the seat base to the seat of the vehicle, and
  a controller operatively connected to the belt tensioning system and configured to automatically actuate the belt tensioning system; and
 actuating the belt tensioning system in backdriveable state in which belt pay-out is permitted.

23. The method of claim 22 further comprising providing at least one of installation instructions and installation status via at least one user interface device connected to the child seat.

* * * * *

UNITED STATES PATENT AND TRADEMARK OFFICE
CERTIFICATE OF CORRECTION

| | | |
|---|---|---|
| PATENT NO. | : 9,751,433 B2 | Page 1 of 1 |
| APPLICATION NO. | : 14/514280 | |
| DATED | : September 5, 2017 | |
| INVENTOR(S) | : Richard P. Juchniewicz et al. | |

It is certified that error appears in the above-identified patent and that said Letters Patent is hereby corrected as shown below:

Column 27, Line 45, Claim 1, delete "pay-out" and insert -- payout --

Column 27, Line 47, Claim 1, delete "pay-out" and insert -- payout --

Column 27, Line 47, Claim 1, delete "premitted." and insert -- permitted. --

Column 29, Line 21, Claim 22, after "in" insert -- a --

Column 29, Line 22, Claim 22, delete "pay-out" and insert -- payout --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*